US012353965B2

(12) United States Patent
Ronagh et al.

(10) Patent No.: US 12,353,965 B2
(45) Date of Patent: Jul. 8, 2025

(54) ARTIFICIAL INTELLIGENCE-DRIVEN QUANTUM COMPUTING

(71) Applicant: 1QB Information Technologies Inc., Vancouver (CA)

(72) Inventors: Pooya Ronagh, Vancouver (CA); Shunji Matsuura, Vancouver (CA); Kyle Ian Mills, Ajax (CA); Arthur Chalom Pesah, Waterloo (CA)

(73) Assignee: 1QB Information Technologies Inc., North Vancouver (CA)

( * ) Notice: Subject to any disclaimer, the term of this patent is extended or adjusted under 35 U.S.C. 154(b) by 1058 days.

(21) Appl. No.: 17/317,644

(22) Filed: May 11, 2021

(65) Prior Publication Data

US 2021/0374611 A1    Dec. 2, 2021

Related U.S. Application Data

(63) Continuation of application No. PCT/CA2019/051752, filed on Dec. 5, 2019.

(60) Provisional application No. 62/776,183, filed on Dec. 6, 2018, provisional application No. 62/872,601, filed on Jul. 10, 2019.

(51) Int. Cl.
*G06N 20/00* (2019.01)
*G06F 15/16* (2006.01)
*G06N 5/01* (2023.01)
*G06N 10/60* (2022.01)

(52) U.S. Cl.
CPC .......... *G06N 20/00* (2019.01); *G06F 15/16* (2013.01); *G06N 5/01* (2023.01); *G06N 10/60* (2022.01)

(58) Field of Classification Search
CPC .......... G06N 20/00; G06N 10/00; G06N 5/01; G06F 15/16
See application file for complete search history.

(56) References Cited

U.S. PATENT DOCUMENTS

| | | | |
|---|---|---|---|
| 6,221,592 | B1 | 4/2001 | Schwartz et al. |
| 7,113,967 | B2 | 9/2006 | Cleve et al. |
| 7,135,701 | B2 | 11/2006 | Amin et al. |
| 7,234,144 | B2 | 6/2007 | Wilt et al. |

(Continued)

FOREIGN PATENT DOCUMENTS

| | | |
|---|---|---|
| CA | 2840958 A1 | 1/2013 |
| CA | 2881033 A1 | 4/2015 |

(Continued)

OTHER PUBLICATIONS

Aharonov, et al. Adiabatic quantum state generation and statistical zero knowledge. Proceedings of the thirty-fifth annual ACM symposium on Theory of computing. 2003. https://arxiv.org/abs/quant-ph/0301023.

(Continued)

*Primary Examiner* — David E Choi
(74) *Attorney, Agent, or Firm* — Wilson Sonsini Goodrich & Rosati

(57) ABSTRACT

The present disclosure provides methods and systems for using one or more artificial intelligence (AI) procedures (such as one or more machine learning (ML) or reinforcement learning (RL) procedures) implemented on a classical computer to perform a heuristic through interaction with a computation performed using a classical or non-classical computer (such as a quantum computer).

14 Claims, 14 Drawing Sheets

(56) References Cited

U.S. PATENT DOCUMENTS

| | | |
|---|---|---|
| 7,418,283 B2 | 8/2008 | Amin et al. |
| 7,533,068 B2 | 5/2009 | Maassen van den Brink et al. |
| 7,619,437 B2 | 11/2009 | Thom et al. |
| 7,639,035 B2 | 12/2009 | Berkley |
| 7,660,533 B1 | 2/2010 | Meyers et al. |
| 7,805,079 B1 | 9/2010 | Meyers et al. |
| 7,877,333 B2 | 1/2011 | Macready |
| 7,898,282 B2 | 3/2011 | Harris et al. |
| 7,984,012 B2 | 7/2011 | Coury et al. |
| 8,008,942 B2 | 8/2011 | Van Den Brink et al. |
| 8,126,649 B2 | 2/2012 | Frasch et al. |
| 8,175,995 B2 | 5/2012 | Amin |
| 8,195,596 B2 | 6/2012 | Rose et al. |
| 8,195,726 B2 | 6/2012 | Macready et al. |
| 8,219,605 B2 | 7/2012 | Cowlishaw et al. |
| 8,230,432 B2 | 7/2012 | Bryant et al. |
| 8,244,504 B1 | 8/2012 | Jacobs |
| 8,244,662 B2 | 8/2012 | Coury et al. |
| 8,283,943 B2 | 10/2012 | Van Den Brink et al. |
| 8,374,828 B1 | 2/2013 | Jacobs et al. |
| 8,421,053 B2 | 4/2013 | Bunyk et al. |
| 8,503,885 B2 | 8/2013 | Meyers et al. |
| 8,655,828 B2 | 2/2014 | Rose |
| 8,832,165 B2 | 9/2014 | Allen et al. |
| 9,537,953 B1 | 1/2017 | Dadashikelayeh et al. |
| 9,660,859 B1 | 5/2017 | Dadashikelayeh et al. |
| 9,727,824 B2 | 8/2017 | Rose et al. |
| 9,870,273 B2 | 1/2018 | Dadashikelayeh et al. |
| 9,881,256 B2 | 1/2018 | Hamze et al. |
| 10,044,638 B2 | 8/2018 | Dadashikelayeh et al. |
| 10,152,358 B2 | 12/2018 | Dadashikelayeh et al. |
| 10,223,084 B1 | 3/2019 | Dunn |
| 10,325,218 B1 | 6/2019 | Zeng et al. |
| 10,339,466 B1 | 7/2019 | Ding et al. |
| 10,346,748 B2 | 7/2019 | Aspuru-Guzik et al. |
| 10,469,087 B1* | 11/2019 | Granade ............... G06N 7/01 |
| 10,484,479 B2 | 11/2019 | Johnson et al. |
| 10,558,932 B1 | 2/2020 | Neven et al. |
| 10,614,370 B2 | 4/2020 | Johnson et al. |
| 10,713,582 B2 | 7/2020 | Dadashikelayeh |
| 10,824,478 B2 | 11/2020 | Dadashikelayeh et al. |
| 10,826,845 B2 | 11/2020 | Dadashikelayeh et al. |
| 10,929,294 B2 | 2/2021 | Brahm et al. |
| 11,017,289 B2 | 5/2021 | Crawford et al. |
| 11,196,775 B1 | 12/2021 | Badawy et al. |
| 11,205,275 B2 | 12/2021 | Oami et al. |
| 11,514,134 B2 | 11/2022 | Ronagh et al. |
| 11,797,641 B2 | 10/2023 | Ronagh et al. |
| 2003/0005068 A1 | 1/2003 | Nickel et al. |
| 2003/0023707 A1* | 1/2003 | Ryan ............... G06F 9/4411 |
| | | 718/101 |
| 2003/0121028 A1 | 6/2003 | Coury et al. |
| 2004/0254735 A1 | 12/2004 | Horn et al. |
| 2004/0267916 A1 | 12/2004 | Chambliss et al. |
| 2005/0027458 A1 | 2/2005 | Merz, Jr. et al. |
| 2005/0182614 A1 | 8/2005 | Meredith |
| 2005/0187844 A1 | 8/2005 | Chalermkraivuth et al. |
| 2005/0250651 A1 | 11/2005 | Amin et al. |
| 2005/0273306 A1 | 12/2005 | Hilton et al. |
| 2006/0221978 A1 | 10/2006 | Venkatachalam |
| 2006/0225165 A1 | 10/2006 | Maassen van den Brink et al. |
| 2007/0177634 A1 | 8/2007 | Beausoleil et al. |
| 2007/0180586 A1 | 8/2007 | Amin |
| 2007/0215862 A1 | 9/2007 | Beausoleil et al. |
| 2007/0239366 A1 | 10/2007 | Hilton et al. |
| 2008/0059547 A1 | 3/2008 | Taylor |
| 2008/0065573 A1 | 3/2008 | Macready |
| 2008/0186918 A1 | 8/2008 | Tinnakornsrisuphap et al. |
| 2008/0215850 A1 | 9/2008 | Berkley et al. |
| 2008/0218519 A1 | 9/2008 | Coury et al. |
| 2008/0262990 A1 | 10/2008 | Kapoor et al. |
| 2008/0313430 A1 | 12/2008 | Bunyk |
| 2009/0050357 A1 | 2/2009 | Suzuki |
| 2009/0070402 A1 | 3/2009 | Rose et al. |
| 2009/0078932 A1 | 3/2009 | Amin |
| 2009/0164435 A1 | 6/2009 | Routt |
| 2009/0182542 A9 | 7/2009 | Hilton et al. |
| 2009/0203449 A1* | 8/2009 | Douceur ............... A63F 13/30 |
| | | 463/42 |
| 2009/0306902 A1 | 12/2009 | Lemmen et al. |
| 2009/0325694 A1 | 12/2009 | Beckman et al. |
| 2010/0076913 A1 | 3/2010 | Yang et al. |
| 2010/0261481 A1 | 10/2010 | Resende et al. |
| 2010/0306142 A1 | 12/2010 | Amin |
| 2011/0047201 A1 | 2/2011 | Macready et al. |
| 2011/0231462 A1 | 9/2011 | Macready et al. |
| 2011/0238378 A1 | 9/2011 | Allen et al. |
| 2011/0238855 A1 | 9/2011 | Korsunsky et al. |
| 2011/0296229 A1 | 12/2011 | Cowlishaw et al. |
| 2012/0072579 A1 | 3/2012 | Teather |
| 2012/0084242 A1 | 4/2012 | Levin |
| 2012/0159506 A1 | 6/2012 | Barham et al. |
| 2012/0215821 A1 | 8/2012 | Macready et al. |
| 2012/0240185 A1 | 9/2012 | Kapoor et al. |
| 2012/0253926 A1 | 10/2012 | Chen et al. |
| 2012/0254586 A1 | 10/2012 | Amin et al. |
| 2012/0278374 A1 | 11/2012 | Cowlishaw et al. |
| 2012/0326720 A1 | 12/2012 | Gambetta et al. |
| 2013/0026183 A1 | 1/2013 | Foster |
| 2013/0144925 A1 | 6/2013 | Macready et al. |
| 2013/0263131 A1 | 10/2013 | Beda, III et al. |
| 2013/0308956 A1 | 11/2013 | Meyers et al. |
| 2013/0336472 A1 | 12/2013 | Fahlgren et al. |
| 2014/0025606 A1 | 1/2014 | Macready |
| 2014/0067342 A1 | 3/2014 | Calderon |
| 2014/0067808 A1 | 3/2014 | Narang et al. |
| 2014/0122702 A1 | 5/2014 | Jung et al. |
| 2014/0123325 A1 | 5/2014 | Jung et al. |
| 2014/0187427 A1 | 7/2014 | Macready et al. |
| 2014/0214257 A1 | 7/2014 | Williams et al. |
| 2014/0237276 A1* | 8/2014 | Machnicki ............ G06F 1/3296 |
| | | 713/323 |
| 2014/0250288 A1 | 9/2014 | Roy |
| 2014/0258730 A1 | 9/2014 | Stecher |
| 2014/0324933 A1 | 10/2014 | Macready et al. |
| 2014/0337612 A1 | 11/2014 | Williams |
| 2014/0344322 A1 | 11/2014 | Ranjbar |
| 2014/0365843 A1 | 12/2014 | Ashikhmin |
| 2014/0379924 A1 | 12/2014 | Das et al. |
| 2015/0006443 A1 | 1/2015 | Rose et al. |
| 2015/0032991 A1 | 1/2015 | Lanting et al. |
| 2015/0032993 A1 | 1/2015 | Amin et al. |
| 2015/0055961 A1 | 2/2015 | Meyers et al. |
| 2015/0106413 A1 | 4/2015 | Ronagh |
| 2015/0111754 A1 | 4/2015 | Harris et al. |
| 2015/0120551 A1 | 4/2015 | Jung et al. |
| 2015/0120555 A1 | 4/2015 | Jung et al. |
| 2015/0142398 A1 | 5/2015 | Miller, III et al. |
| 2015/0169746 A1 | 6/2015 | Hatami-Hanza |
| 2015/0178349 A1 | 6/2015 | Niewodniczanski et al. |
| 2015/0193692 A1 | 7/2015 | Israel |
| 2015/0205759 A1 | 7/2015 | Israel et al. |
| 2015/0220852 A1 | 8/2015 | Hatami-Hanza |
| 2015/0227559 A1 | 8/2015 | Hatami-Hanza |
| 2015/0262074 A1 | 9/2015 | Bruestle et al. |
| 2015/0269124 A1 | 9/2015 | Hamze et al. |
| 2015/0269243 A1 | 9/2015 | Kobayashi |
| 2015/0332994 A1 | 11/2015 | Mallik et al. |
| 2015/0349960 A1 | 12/2015 | Bagley |
| 2015/0358251 A1 | 12/2015 | Varga et al. |
| 2015/0363358 A1 | 12/2015 | Ronagh et al. |
| 2015/0363708 A1 | 12/2015 | Amin et al. |
| 2016/0026183 A1 | 1/2016 | Williams et al. |
| 2016/0071021 A1 | 3/2016 | Raymond |
| 2016/0112066 A1* | 4/2016 | Ashikhmin ......... H03M 13/154 |
| | | 714/785 |
| 2016/0132785 A1 | 5/2016 | Amin et al. |
| 2016/0162798 A1 | 6/2016 | Marandi et al. |
| 2016/0171368 A1 | 6/2016 | Aspuru-Guzik et al. |
| 2016/0217759 A1* | 7/2016 | Morita ............... G09G 3/20 |
| 2016/0224515 A1 | 8/2016 | Ronagh et al. |
| 2016/0321559 A1 | 11/2016 | Rose et al. |
| 2016/0328253 A1 | 11/2016 | Majumdar |
| 2016/0328659 A1 | 11/2016 | Mohseni et al. |

(56) References Cited

U.S. PATENT DOCUMENTS

| | | |
|---|---|---|
| 2016/0338075 A1 | 11/2016 | McKibben |
| 2016/0342891 A1 | 11/2016 | Ross et al. |
| 2017/0011305 A1 | 1/2017 | Williams |
| 2017/0017894 A1 | 1/2017 | Lanting et al. |
| 2017/0060642 A1 | 3/2017 | Castellano et al. |
| 2017/0109605 A1 | 4/2017 | Ahn |
| 2017/0147303 A1 | 5/2017 | Amy et al. |
| 2017/0147695 A1 | 5/2017 | Shih |
| 2017/0214701 A1 | 7/2017 | Hasan |
| 2017/0223143 A1 | 8/2017 | Johnson et al. |
| 2017/0242824 A1 | 8/2017 | Karimi et al. |
| 2017/0255592 A1 | 9/2017 | Karimi et al. |
| 2017/0255629 A1 | 9/2017 | Thom et al. |
| 2017/0255872 A1 | 9/2017 | Hamze et al. |
| 2017/0286852 A1 | 10/2017 | Rezaie et al. |
| 2017/0286858 A1 | 10/2017 | La Cour et al. |
| 2017/0300808 A1 | 10/2017 | Ronagh et al. |
| 2017/0323195 A1 | 11/2017 | Crawford et al. |
| 2017/0344898 A1 | 11/2017 | Karimi et al. |
| 2017/0351974 A1 | 12/2017 | Rose et al. |
| 2017/0372427 A1 | 12/2017 | Johnson et al. |
| 2017/0373940 A1 | 12/2017 | Shahab et al. |
| 2018/0014970 A1 | 1/2018 | Conde De Paiva et al. |
| 2018/0039903 A1 | 2/2018 | Mosca et al. |
| 2018/0091440 A1 | 3/2018 | Dadashikelayeh et al. |
| 2018/0096085 A1 | 4/2018 | Rubin |
| 2018/0107526 A1 | 4/2018 | Dadashikelayeh et al. |
| 2018/0114138 A1 | 4/2018 | Monroe et al. |
| 2018/0204126 A1 | 7/2018 | Galle |
| 2018/0218279 A1 | 8/2018 | Lechner et al. |
| 2018/0218281 A1 | 8/2018 | Reinhardt et al. |
| 2018/0232649 A1* | 8/2018 | Wiebe .................. G06F 17/16 |
| 2018/0246851 A1 | 8/2018 | Zaribafiyan et al. |
| 2018/0260730 A1 | 9/2018 | Reagor et al. |
| 2018/0267937 A1 | 9/2018 | Pelc et al. |
| 2018/0308000 A1 | 10/2018 | Dukatz et al. |
| 2018/0308007 A1 | 10/2018 | Amin et al. |
| 2018/0314970 A1 | 11/2018 | Harris et al. |
| 2019/0009581 A1 | 1/2019 | Schalk et al. |
| 2019/0095811 A1 | 3/2019 | Antonio et al. |
| 2019/0179871 A1* | 6/2019 | Granade .................. G06N 10/00 |
| 2019/0205790 A1 | 7/2019 | Dukatz et al. |
| 2019/0251213 A1 | 8/2019 | Bishop et al. |
| 2019/0370680 A1 | 12/2019 | Novotny |
| 2019/0378047 A1 | 12/2019 | Pistoia et al. |
| 2020/0005186 A1 | 1/2020 | Romero et al. |
| 2020/0057957 A1 | 2/2020 | Johnson et al. |
| 2020/0090072 A1 | 3/2020 | Troyer et al. |
| 2020/0104740 A1 | 4/2020 | Cao |
| 2020/0125568 A1 | 4/2020 | Idicula et al. |
| 2020/0143910 A1 | 5/2020 | Noori et al. |
| 2020/0191943 A1 | 6/2020 | Wu et al. |
| 2020/0272683 A1 | 8/2020 | Ronagh et al. |
| 2020/0272684 A1 | 8/2020 | Karimi et al. |
| 2020/0279187 A1 | 9/2020 | Huang et al. |
| 2020/0364597 A1 | 11/2020 | Friedlander et al. |
| 2020/0364601 A1 | 11/2020 | Yamazaki et al. |
| 2020/0394537 A1 | 12/2020 | Wang et al. |
| 2020/0401920 A1 | 12/2020 | Killoran et al. |
| 2020/0410343 A1 | 12/2020 | Niu et al. |
| 2021/0103847 A1 | 4/2021 | Akzam |
| 2021/0125094 A1 | 4/2021 | Chamberland et al. |
| 2021/0166133 A1 | 6/2021 | Ronagh et al. |
| 2021/0166148 A1 | 6/2021 | Matsuura et al. |
| 2021/0279260 A1 | 9/2021 | Oberoi et al. |
| 2021/0287124 A1 | 9/2021 | Ronagh et al. |
| 2021/0289020 A1 | 9/2021 | Rolfe et al. |
| 2021/0304052 A1 | 9/2021 | Pant |
| 2022/0101172 A1 | 3/2022 | Lee et al. |
| 2022/0107927 A1 | 4/2022 | Vedaie et al. |
| 2022/0366314 A1 | 11/2022 | Vall-Llosera et al. |
| 2023/0077665 A1 | 3/2023 | Kuttimalai et al. |
| 2023/0104058 A1 | 4/2023 | Hopfmueller et al. |
| 2023/0222173 A1 | 7/2023 | Ronagh et al. |
| 2023/0259385 A1 | 8/2023 | Rosenberg et al. |
| 2023/0334115 A1 | 10/2023 | Yildiz et al. |

FOREIGN PATENT DOCUMENTS

| | | |
|---|---|---|
| CA | 2902015 A1 | 1/2016 |
| CA | 2921711 A1 | 8/2017 |
| CA | 3026824 A1 | 12/2017 |
| CN | 106874506 A | 6/2017 |
| CN | 110069348 A | 7/2019 |
| CN | 112034842 A | 12/2020 |
| EP | 3113084 A1 | 1/2017 |
| JP | 2004503011 A | 1/2004 |
| JP | 2006061926 A | 3/2006 |
| JP | 2008525873 A | 7/2008 |
| JP | 2013114366 A | 6/2013 |
| JP | 2016206795 A | 12/2016 |
| WO | WO-2005122052 A1 | 12/2005 |
| WO | WO-2006026985 A2 | 3/2006 |
| WO | WO-2007089674 A2 | 8/2007 |
| WO | WO-2007147243 A1 | 12/2007 |
| WO | WO-2010148120 A2 | 12/2010 |
| WO | WO-2013006836 A1 | 1/2013 |
| WO | WO-2014210368 A1 | 12/2014 |
| WO | WO-2015006494 A1 | 1/2015 |
| WO | WO-2015060915 A2 | 4/2015 |
| WO | WO-2015121619 A2 | 8/2015 |
| WO | WO-2016029172 A1 | 2/2016 |
| WO | WO-2017033326 A1 | 3/2017 |
| WO | WO-2017068228 A1 | 4/2017 |
| WO | WO-2017111937 A1 | 6/2017 |
| WO | WO-2017131081 A1 | 8/2017 |
| WO | WO-2017145086 A1 | 8/2017 |
| WO | WO-2017149491 A1 | 9/2017 |
| WO | WO-2017152289 A1 | 9/2017 |
| WO | WO-2017168865 A1 | 10/2017 |
| WO | WO-2017201626 A1 | 11/2017 |
| WO | WO-2017209791 A1 | 12/2017 |
| WO | WO-2017214717 A1 | 12/2017 |
| WO | WO-2018058061 A1 | 3/2018 |
| WO | WO-2018119522 A1 | 7/2018 |
| WO | WO-2018160599 A1 | 9/2018 |
| WO | WO-2019104440 A1 | 6/2019 |
| WO | WO-2019104443 A1 | 6/2019 |
| WO | WO-2019152020 A1 | 8/2019 |
| WO | WO-2019157228 A1 | 8/2019 |
| WO | WO-2019222748 A1 | 11/2019 |
| WO | WO-2019241879 A1 | 12/2019 |
| WO | WO-2019244105 A1 | 12/2019 |
| WO | WO-2020113339 A1 | 6/2020 |
| WO | WO-2020223718 A1 | 11/2020 |
| WO | WO-2020227825 A1 | 11/2020 |
| WO | WO-2020255076 A1 | 12/2020 |
| WO | WO-2021055000 A1 | 3/2021 |
| WO | WO-2021111368 A1 | 6/2021 |
| WO | WO-2021181281 A1 | 9/2021 |
| WO | WO-2021207847 A1 | 10/2021 |
| WO | WO-2021237350 A1 | 12/2021 |
| WO | WO-2021243454 A1 | 12/2021 |
| WO | WO-2022079640 A1 | 4/2022 |
| WO | WO-2022123494 A1 | 6/2022 |
| WO | WO-2022224143 A1 | 10/2022 |
| WO | WO-2023275825 A1 | 1/2023 |
| WO | WO-2023053035 A1 | 4/2023 |
| WO | WO-2023242744 A1 | 12/2023 |

OTHER PUBLICATIONS

An et al., "Quantum linear system solver based on time-optimal adiabatic quantum computing and quantum approximate optimization algorithm," 2019, arXiv preprint arXiv:1909.05500.

Boixo, et al., "Fast quantum algorithms for traversing paths of eigenstates," 2010, arXiv preprint arXiv:1005.3034, 36 pgs.

Boixo et al., "Quantum state preparation by phase randomization," 2009, arXiv preprint arXiv:0903.1652.

(56) References Cited

OTHER PUBLICATIONS

Bombin, et al. Topological quantum distillation. Phys Rev Lett. Nov. 3, 2006;97(18):180501. doi: 10.1103/PhysRevLett.97.180501. Epub Oct. 30, 2006.

Brassard, et al., "An exact quantum polynomial-time algorithm for Simon's problem," Proceedings of the Fifth Israeli Symposium on Theory of Computing and Systems, IEEE, 1997; 12 pgs.

Butenko, S., Maximum Independent Set and Related Problems, With Applications, A Dissertation Presented to the Graduate School of the University of Florida in Partial Fulfillment of the Requirements for the Degree of Doctor of Philosophy University of Florida, 167 pages (2003).

Chamberland et al, Triangular color codes on trivalent graphs with flag qubits. New J. Phys. Feb. 2020. vol. 22 023019. 24 pages. https://doi.org/10.1088/1367-2630/ab68fd.

Das et al, A Scalable Decoder Micro-architecture for Fault-Tolerant Quantum Computing. arXiv preprint arXiv:2001.06598 (2020).

Delfosse et al, Almost-linear time decoding algorithm for topological codes. Quantum 5 (2021): 595.

Delfosse et al, Toward a Union-Find decoder for quantum LDPC codes. IEEE Transactions on Information Theory 68.5 (2022): 3187-3199.

Eidenbenz et al. Quantum Algorithm Implementations for Beginners. https://arxiv.org/abs/1804.03719, arXiv:1804.03719v1 [cs.ET], Apr. 10, 2018, pp. 1-75) (Year: 2018).

Fan, et al. Robust Optimization of Graph Partitioning and Critical Node Detection in Analyzing Networks. In Combinatorial Optimization and Applications—4th International Conference, COCOA 2010, Proceedings (Part 1 ed., pp. 170-183). (Year: 2010).

Fan, et al. Robust optimization of graph partitioning involving interval uncertainty. Theoretical Computer Science. 447 (2012): 53-61.

Fowler, A.G. Minimum weight perfect matching in O (1) parallel time. arXiv 1307 (2013).

Gheorghiu, V. Standard form of qudit stabilizer groups. arXiv preprint arXiv:1101.1519 (2011).

Gibbons, L.E. et al., Continuous Characterizations of the Maximum Clique Problem, DIMACS Technical Report 96-09, Center for Applied Optimization Dept of Industrial and Systems Engineering University of Florida, Gainesville, FL 32611, 19 pages (Apr. 1996).

Gibbons, L.E. et al., Continuous Characterizations of the Maximum Clique Problem, Mathematics of Operational Research 22(3):754-768 (Aug. 1997).

Glover et al. Tabu Search. Handbook of Combinatorial Optimization, Du DZ., Pardalos P.M. (eds), Springer, Boston, MA, 1998; 94 pgs.

Gottesman, D. An Introduction to Quantum Error Correction and Fault-Tolerant Quantum Computation. arXiv preprint arXiv:0904.2557 (2009).

Han et al., "Approximate computing: An emerging paradigm for energy-efficient design," 18th IEEE European Test Symposium (ETS), IEEE, 2013; https://ieeexplore.ieee.org/document/6569370.

Hennessy, et al. Computer Architecture: A Quantitative Approach. Elsevier Science & Technology, 2014. ProQuest Ebook Central, https://ebookcentral.proquest.com/lib/uspto-ebooks/detail.action?docID=404052. (Year: 2014).

Huang et al, Fault-tolerant weighted union-find decoding on the toric code. Physical Review A 102.1 (2020): 012419.

Imamoglu, et al. Quantum information processing using quantum dot spins and cavity-QED. arXiv preprint quant-ph/9904096 (1999).

Inagaki, T., Combinatorial optimization using optical oscillator networks, J-Stage 33(5):586-591 (2018).

Jiang, et al. Simulated annealing based influence maximization in social networks. Twenty-fifth AAAI conference on artificial intelligence (AAAI'11). AAAI Press, 127-132. (Year: 2011).

Kako, S. et al., Coherent Ising Machines with Error Correction Feedback, Advanced Quantum Technologies 3(2000045):14 pages (2020).

Karimi, et al. Practical integer-to-binary mapping for quantum annealers. Quantum Information Processing, vol. 18, No. 4, 94 (2019) DOI: 10.1007/s11128-019-2213-x.

Knill, et al. Resilient Quantum Computation: Error Models and Thresholds. Proceedings of the Royal Society of London. Series A: Mathematical, Physical and Engineering Sciences 454.1969 (1998): 365-384.

Krol et al., "Efficient decomposition of unitary matrices in quantum circuit compilers," 2021, arXiv preprint arXiv:2101.02993, 13 pgs.

Kubica et al, Efficient color code decoders in $d = 2$ dimensions from toric code decoders. arXiv preprint arXiv:1905.07393 (2019).

Lamb, I.D.C. et al., An FPGA-based Instrumentation Platform for use at Deep Cryogenic Temperatures, arXiv:1509.06809 [physics.ins-det]: 1-8 (2015).

Lavnikevich, N., (1, k)-Swap Local Search for Maximum Clique Problem, arXiv:1704.00908 [math.OC], 14 pages, submitted on Apr. 4, 2017, abstract, 3 pages.

Mao, et al. Artificial neural networks for feature extraction and multivariate data projection. IEEE Transactions on Neural Networks. vol. 6, No. 2, pp. 296-317, Mar. 1995, doi: 10.1109/72.363467.

Matsubara, et al. Ising-Model Optimizer with Parallel-Trial Bit-Sieve Engine. Complex, Intelligent, and Software Intensive Systems: Proceedings of the 11th International Conference on Complex, Intelligent, and Software Intensive Systems (CISIS-2017), pp. 432-438, 2018.

McCaskey, et al. Hybrid Programming for Near-term Quantum Computing Systems. 2018 IEEE international conference on rebooting computing (ICRC). 2018. pp. 1-12.

Membrives, E.J. Machine-Learning for Optimization of Software Parameters. Technical Disclosure Commons. Defensive Publication Series. Dec. 7, 2017. pp. 1-35. https://www.tdcommons.org/dpubs_series/898.

Nielsen, et al. Quantum Computation and Quantum Information. Chapter 10: Quantum error-correction. Cambridge University Press. pp. 425-499. (2010).

Pardalos, P.M. et al., The Maximum Clique Problem, Journal of Global Optimization 4:301-328 (1994).

Parekh, et al. Benchmarking adiabatic quantum optimization for complex network analysis. arXiv preprint arXiv:1604.00319 (2016). (Year: 2016).

PCT/IB2021/059421 International Search Report and Written Opinion dated Dec. 20, 2021.

PCT/IB2021/061527 International Search Report and Written Opinion dated Apr. 8, 2022.

PCT/IB2022/053658 International Search Report and Written Opinion dated Jun. 27, 2022.

PCT/IB2022/056124 International Search Report and Written Opinion dated Sep. 16, 2022.

PCT/IB2022/059253 International Search Report and Written Opinion dated Jan. 27, 2023.

PCT/IB2023/054723 International Search Report and Written Opinion dated Jul. 19, 2023.

Pedram, et al. Layout Optimization for Quantum Circuits with Linear Nearest Neighbor Architectures. IEEE Circuits and Systems Magazine 16 (2016): 62-74.

Pedregosa, F. Hyperparameter optimization with approximate gradient. International conference on machine learning. PMLR, 2016.

Pillutla, et al. A Smoother Way to Train Structured Prediction Models. NIPS'18: Proceedings of the 32nd International Conference on Neural Information Processing Systems. Dec. 3, 2018. doi:10.48550/arxiv.1902.03228 Retrieved from the Internet: https://dl.acm.org/doi/pdf/10.5555/3327345.3327386.

Rappe, et al. UFF, a Full Periodic Table Force Field for Molecular Mechanics and Molecular Dynamics Simulations. J. Am. Chem. Soc. 1992, 114, 25, 10024-10035. https://doi.org/10.1021/ja00051a040.

Resende, et al. GRASP with path-relinking: Recent advances and applications. Metaheuristics: progress as real problem solvers (2005): 29-63.

Sakaguchi, et al. Boltzmann Sampling by Degenerate Optical Parametric Oscillator Network for Structure-Based Virtual Screening. Entropy. 2016; 18(10):365. https://doi.org/10.3390/e18100365.

(56) References Cited

OTHER PUBLICATIONS

Sarma, Abhijat, et al. Quantum Unsupervised and Supervised Learning on Superconducting Processors. ArXiv, 2019, /abs/1909.04226 (2019).
Sefi, et al. How to decompose arbitrary continuous-variable quantum operations. Physical review letters 107.17 (2011): 170501.
Sepehry, et al. Smooth Structured Prediction Using Quantum and Classical Gibbs Samplers. Oct. 1, 2018 (Oct. 1, 2018) Retrieved from the Internet: URL: https://arxiv.org/pdf/1809.04091v2.pdf [retrieved on Sep. 5, 2022].
U.S. Appl. No. 15/900,643 Office Action dated Apr. 14, 2022.
U.S. Appl. No. 16/671,767 Office Action dated Aug. 30, 2022.
U.S. Appl. No. 16/811,479 Office Action dated Apr. 8, 2022.
U.S. Appl. No. 16/811,479 Office Action dated Feb. 14, 2023.
U.S. Appl. No. 16/811,479 Office Action dated Sep. 22, 2022.
U.S. Appl. No. 16/888,419 Office Action dated Aug. 24, 2023.
U.S. Appl. No. 16/888,419 Office Action dated Feb. 3, 2023.
U.S. Appl. No. 17/110,729 Office Action dated May 9, 2023.
U.S. Appl. No. 17/110,729 Office Action dated Sep. 29, 2023.
U.S. Appl. No. 17/254,661 Office Action dated Mar. 18, 2022.
U.S. Appl. No. 17/254,661 Office Action dated Mar. 22, 2023.
U.S. Appl. No. 17/254,661 Office Action dated Sep. 14, 2022.
U.S. Appl. No. 17/254,661 Office Action dated Sep. 18, 2023.
U.S. Appl. No. 17/553,551 Notice of Allowance dated Dec. 1, 2023.
U.S. Appl. No. 17/553,551 Office Action dated Jul. 17, 2023.
U.S. Appl. No. 18/047,882 Office Action dated Jul. 3, 2023.
U.S. Appl. No. 18/047,981 Corrected Notice of Allowance dated Aug. 18, 2023.
U.S. Appl. No. 18/047,981 Office Action dated Jan. 11, 2023.
Ushijima-Mwesigwa, et al. Graph Partitioning using Quantum Annealing on the D-Wave System. Proceedings of the Second International Workshop on Post Moores Era Supercomputing. 2017. (Year: 2017).
Wah, et al. Simulated Annealing with Asymptotic Convergence for Nonlinear Constrained Global Optimization. Principles and Practice of Constraint Programming—CP'99: 5th International Conference, CP'99, Alexandria, VA, USA, Oct. 11-14, 1999. Proceedings 5. Springer Berlin Heidelberg, 1999.
Wikipedia. Automatic Differentiation. Article from Nov. 23, 2016. https://en.wikipedia.org/w/index.php?title=Automatic_differentiation&oldid=751071969. Accessed Jan. 29, 2023. (Year: 2016).
Yanagimoto, et al. Engineering a Kerr-based Deterministic Cubic Phase Gate via Gaussian Operations. Physical Review Letters 124.24 (2020): 240503.
Zhu, et al. Training of quantum circuits on a hybrid quantum computer. Sci Adv. Oct. 2019; 5(10): eaaw9918. Published online Oct. 18, 2019. doi: 10.1126/sciadv.aaw9918.
Booth, K.E.C. et al., Comparing and Integrating Constraint Programming and Temporal Planning for Quantum Circuit Compilation, Twenty-Eighth International Conference on Automated Planning and Scheduling (ICAPS 2018), pp. 366-374 (2018).
Herbert, S. et al., Using Reinforcement Learning to find Efficient Qubit Routing Policies for Deployment in Near-term Quantum Computers, arXiv:1812.11619, pp. 1-13 (Dec. 30, 2018).
PCT/IB2023/056105 International Search Report and Written Opinion dated Oct. 16, 2023.
PCT/IB2023/060066 International Search Report and Written Opinion dated Dec. 20, 2023.
Sinha, A. et al., Qubit Routing using Graph Neural Network aided Monte Carlo Tree Search, arXiv:2104:01992v1, pp. 1-10 (Apr. 1, 2021).
Aggarwal et al.: Evolutionary network analysis: A survey. ACM Computing Surveys 47(1):10:1-10:36 (2014).
Amelio et al.: Community mining in signed networks: A multiobjective approach. ASONAM 2013: Proceedings of the 2013 IEEE/ACM International Conference on Advances in Social Networks Analysis and Mining, pp. 95-99 https://doi.org/10.1145/2492517.2492641 (2013).
Anchuri et al.: Communities and balance in signed networks: A spectral approach. In Proceedings of the 2012 International Conference on Advances in Social Networks Analysis and Mining (ASONAM 2012), ASONAM 2012, pp. 235-242, Washington, DC, USA (2012).
Bhagat et al.: Node Classification in Social Networks. arXiv:1101.3291v1 Social Network Data Analytics, pp. 115-148 (2011).
Bojchevski et al.: Deep Gaussian Embedding of Graphs: Unsupervised Inductive Learning via Ranking. arXiv.org, Cornell University, arXiv:1707.03815v4 [stat.ML], pp. 1-13 (2018).
Bromley et al.: Applications of near-term photonic quantum computers: software and algorithms. Quantum Science and Technology 5:034010DOI:10.1088/2058-9565/ab8504 arXiv:1912.07634 [1-36] (2019).
Cai et al.: A survey on network community detection based on evolutionary computation. International Journal of Bio-Inspired Computation 8(2):84-98 (2016).
Cao et al.: Advances in Knowledge Discovery and Data Mining. Springer International, pp. 82-95 (2015).
Carleo et al.: Constructing exact representations of quantum many-body systems with deep neural networks. Nat Commun. 9(1):5322, pp. 1-11 doi:10.1038/s41467-018-07520-3 (2018).
Carleo et al.: Solving the quantum many-body problem with artificial neural networks. pre-print arXiv:1606.02318 Science 355(6325):602-606 doi:10.1126/science.aag2302 (2016).
Carrasquilla et al.: Reconstructing quantum states with generative models. arXiv:1810.10584 Nature Machine Intelligence 1(3):155-161 arXiv:1810.10584 (2019).
Chen et al.: Community Detection via Maximization of Modularity and Its Variants. IEEE Transactions on Computational Social Systems 1(1):46-65 DOI:10.1109/TCSS.2014.2307458 (2014).
Chen et al.: Epidemic spreading on networks with overlapping community structure. Physica A: Statistical Mechanics and its Applications 391(4):1848-1854 (2012).
Chiang et al.: Exploiting longer cycles for link prediction in signed networks. In Proceedings of the 20th ACM International Conference on Information and Knowledge Management, CIKM 2011, pp. 1157-1162, New York, NY, USA [1-6] (2011).
Chowdhury et al.: Quantum algorithms for Gibbs sampling and hitting-time estimation. arXiv:1603.02940 Quant. Inf. Comp. 17(1-2):41-64 (2017).
Chuang et al.: Experimental implementation of fast quantum searching. Physical Review Letters 80(15):3408-3411 DOI:10.1103/PhysRevLett.80.3408 (1998).
Conforti et al.: Integer Programming: Graduate Texts in Mathematics 271. Springer [1-466] (2014).
Debnath et al.: Demonstration of a small programmable quantum computer with atomic qubits. arXiv:1603.04512 Nature 536(7614):63-66 doi:10.1038/nature18648 (2016).
Elvira et al.: Efficient Multiple Importance Sampling Estimators. pre-print arxiv.org/pdf/1505.05391, pp. 1-7 (2015).
Esmailian et al.: Mesoscopic analysis of online social networks: The role of negative ties. arXiv:1411.6057v1 Phys. Rev. E90:042817, pp. 1-13 (2014).
Ferrara et al.: Detecting criminal organizations in mobile phone networks. arXiv:1404.1295v1 Expert Systems with Applications 41(13):5733-5750 (2014).
Fortunato: Community detection in graphs. arXiv.org, Cornell University, arXiv:0906.0612v1 [physics.soc-ph], pp. 1-89 (2009).
Gelman et al.: Simulating normalizing constants: from importance sampling to bridge sampling to path sampling. Statist. Sci. 13(2):163-185 DOI:10.1214/ss/1028905934 (1998).
Glover et al.: Tabu Search: Modern Heuristic Techniques for Combinatorial Problems. Colin R. Reeves (Ed.) Black Scientific Publications, Oxford [1-62] (1993).
Glover: Tabu search—part II. ORSA Journal on computing 2(1):4-32.1 4-32 DOI:10.1287/ijoc.2.1.4 (1990).
Hamilton et al.: Representation Learning on Graphs: Methods and Applications. arXiv.org, Cornell University, arXiv:1709.05584v3 [cs.SI], pp. 1-24 (2018).
He et al.: MISAGA: An Algorithm for Mining Interesting Subgraphs in Attributed Graphs. IEEE Transactions on Cybernetics 48(5):1369-1382 (2018).
Heider: Attitudes and cognitive organization. The Journal of Psychology 21(1):107-112 (1946).

(56) References Cited

OTHER PUBLICATIONS

Huang et al.: Predicting many properties of a quantum system from very few measurements. Nature Physics 16(10)1050-1057 doi:arxiv.org/abs/2002.08953 [1-40](2020).
Humble et al.: Software Systems for High-performance Quantum Computing. IEEE Xplore doi:10.1109/HPEC.2016.7761628 [1-8](2016).
Jones et al.: Implementation of a quantum algorithm to solve Deutsch's problem on a nuclear magnetic resonance quantum computer. arXiv:quant-ph/9801027v2 the Journal of chemical physics, 109(5):1648-1653 DOI:10.1063/1.476739 (1998).
Kassal et al.: Simulating chemistry using quantum computers. Annu Rev Phys Chem. 62:185-207 (2011).
Kochenberger et al.: The unconstrained binary quadratic programming problem: A survey. J Comb Optim. 28(1)58-81 DOI:10.1007/s10878-014-9734-0 (2014).
Kunegis et al.: The slashdot zoo: Mining a social network with negative edges. In Proceedings of the 18th International 20 Conference on World Wide Web, WWWW 2009, pp. 741-750, New York, NY, USA DOI:10.1145/1526709.1526809 (2009).
Lenstra: Integer programming with a fixed No. of variables. 8(4):538-548 URL: https://doi.org/10.1287/moor.8.4.538 (1983).
Leskovec et al.: Empirical Comparison of Algorithms for Network Community Detection. Proceedings of International World Wide Web Conference 2010, Raleigh, North Carolina, USA, pp. 1-10 (2010).
Leskovec et al.: Predicting positive and negative links in online social networks. In Proceedings of the 19th International Conference on World Wide Web, WWW 2010, pp. 1-10, New York, NY, USA (2010).
Liben-Nowell et al.: The link prediction problem for social networks. In Proceedings of the Twelfth International Conference on Information and Knowledge Management, CIKM 2003, pp. 556-559, New York, NY, USA [1-19](2004).
Lin et al.: Understanding community effects on information diffusion. Advances in Knowledge Discovery and Data Mining, pp. 82-95 DOI:10.1007/978-3-319-18038-0_7 (2015).
Low et al.: Hamiltonian simulation by Qubitization. arXiv: 1610.06546v3 Quantum 3:163 URL:https://doi.org/10.22331/q-2019-07-12-163 [1-23] (2019).
Lu et al.: Demonstration of Shor's quantum factoring algorithm using photonic qubits. arXiv:0705.1684v3 Physical Review Letters 99(25):250504 DOI:10.1103/PhysRevLett.99.250504 [1-5] (2007).
Lu et al.: KKT Solution and Conic Relaxation for Solving Quadratically Constrained Quadratic Programming Problem. SIAM J. Optim. 21(4):1475-1490 DOI:10.1137/100793955 (2011).
Massa et al.: Controversial users demand local trust metrics: An experimental study on Epinions.com community. In Proceedings of the 20th National Conference on Artificial Intelligence AAA Press vol. 1, AAAI-05:121-126 (2005).
Medus et al.: Detection of community structures in networks via global optimization. Physica A: Statistical Mechanics and its Applications 358(2-4):593-604 DOI:10.1016/j.physa.2005.04.022 (2005).
Melko et al.: Restricted Boltzmann machines in quantum physics. Nature Physics 15(9):887-892 DOI:10.1038/s41567-019-0545-1 (2019).
Monz et al.: Realization of a scalable Shor algorithm. arXiv:1507.08852 Science 351(6277):1068-1070 DOI:10.1126/science.aad9480 (2015).
Motzkin et al.: Maxima for graphs as a new proof of a theorem of Turan. Canadian Journal of Mathematics 17:533-540 DOI:10.4153/CJM-1965-053-6 (1965).
Nagy et al.: Variational quantum Monte Carlo method with a neural-network ansatz for open quantum systems. Phys Rev Letters 122(25):250501 doi:arxiv.org/abs/1902.09483 [1-10](2019).
Nam et al.: Ground-state energy estimation of the water molecule on a trapped ion quantum computer. arXiv preprint arXiv:1902.10171, pp. 1-14 (2019).
Newman et al.: Finding and evaluating community structure in networks. Phys. Rev. E. 69:026113, pp. 1-16 (2004).
Newman: Modularity and community structure in networks. PNAS 103(23):8577-8582 (2006).
Olsson et al.: Solving Large Scale Binary Quadratic Problems: Spectral Methods vs. Semidefinite Programming. IEEE Conference on Computer Vision and Pattern Recognition, pp. 1-8, doi:10.1109/CVPR.2007.383202 (2007).
Papamakarios: Comparison of Modern Stochastic Optimization Algorithms. Scholar article. [1-13] (2014) www.richtarik.org/papers/Papamakarios.pdf.
PCT/CA2021/050709 International Search Report and Written Opinion dated Aug. 3, 2021.
PCT/CA2021/050750 International Search Report and Written Opinion dated Aug. 6, 2021.
PCT/IB2019/055226 International Search Report and Written Opinion dated Nov. 26, 2019.
PCT/IB2020/055801 International Search Report and Written Opinion dated Oct. 30, 2020.
PCT/IB2020/061464 International Search Report and Written Opinion dated Mar. 4, 2021.
PCT/IB2021/051965 International Search Report and Written Opinion dated May 31, 2021.
Pizzuti: A multi-objective genetic algorithm for community detection in networks. IEEE International Conference on Tools with Artificial Intelligence, pp. 379-386 DOI:10.1109/ICTAI.2009.58 (2009).
Poulin et al.: Sampling from the thermal quantum Gibbs state and evaluating partition functions with a quantum computer. arXiv:0905.2199 Physical Review Letters 103(22), pp. 1-7 DOI:10.1103/PhysRevLett.103.220502 (2009).
Quek et al.: Adaptive Quantum State Tomography with Neural Networks. arXiv.org, Cornell University, arXiv:1812.06693v1 [quant-ph], pp. 1-13 pages (2018).
Reiher et al.: Elucidating reaction mechanisms on quantum computers. PNAS USA 114(29):7555-7560 (2017).
Rubin: A Hybrid Classical/Quantum Approach for Large-Scale Studies of Quantum Systems with Density Matrix Embedding Theory. Cornell University Library, Ithaca, NY arXiv doi:arxiv.org/abs/1610.06910 [1-10](2016).
Salathe et al.: Dynamics and control of diseases in networks with community structure. PLOS Computational Biology 6(4):e1000736, pp. 1-11 (2010).
Schuld et al., "Quantum machine learning in feature Hilbert spaces", Phys. Rev. Lett.; Feb. 1, 2019, vol. 122, pp. 040504-1-12.
Schwabl: Quantum Mechanics. Springer, 4th Ed. [1-425] (2007).
Shen et al.: Quantum implementation of the unitary coupled cluster for simulating molecular electronic structure. Phys. Rev. A 95, 020501(R) doi:10.1103/PhysRevA.95.020501 [1-6] (2017).
Srinivas et al.: Muiltiobjective optimization using non-dominated sorting in genetic algorithms. Evolutionary Computation 2(3):221-248 (1994).
Tang et al.: A Survey of Signed Network Mining in Social Media. ACM Computing Surveys 9(4):pp. 39:1 to 39:38, arXiv.org, Cornell University, arXiv:1511.07569v3 [cs.SI] (2016).
Terhal et al.: The problem of equilibration and the computation of correlation functions on a quantum computer. arXiv:quant-ph/9810063 Phys.Rev. A61:22301, pp. 1-35 DOI:10.1103/PhysRevA.61.022301 (2000).
Torlai et al.: Neural-network quantum state tomography. pre-print arXiv:1703.05334v2 Nature Physics 14:447-450 DOI:10.1038/s41567-018-0048-5 (2017).
U.S. Appl. No. 16/811,479 Non-Final Office Action dated Aug. 30, 2021.
Veis et al.: Quantum computing applied to calculations of molecular energies: CH2 benchmark. J Chem Phys. 133(19):194106 doi:10.1063/1.3503767 [1-29](2010).
Venuti et al.: Adiabaticity in open quantum systems. arXiv: 1508.05558v2 Phys. Rev. A93(3):032118, pp. 1-12 DOI:10.1103/PhysRevA.93.032118 (2016).
Waskiewicz: Friend of a friend influence in terrorist social networks. In Proceedings on the International Conference on Artificial Intelligence (ICAO, pp. 1-5. The Steering Committee of the World Congress in Computer Science, Computer Engineering and Applied Computing (WorldComp) (2012).

(56) References Cited

OTHER PUBLICATIONS

Wendin: Quantum information processing with superconducting circuits: a review. Rep Prog Phys. 80(10):106001 doi:10.1088/1361-6633/aa7e1a [1-50](2017).
Xu et al.: Neural network state estimation for full quantum state tomography. ArXiv preprint doi:arxiv.org/abs/1811.06654 [1-8] (2018).
Zahedinejad et al.: Multi-Community Detection in Signed Graphs Using Quantum Hardware. arXiv.org, 1QBit online research paper, Cornell University, arXiv:1901.04873v1 [quant-ph], pp. 1-10 (2019).
Akama et al. Implementation of divide- and-conquer method including Hartree-Fock exchange interaction. J Comput Chem 28(12):2003-2012 (2007).
Alidaee et al. Solving the maximum edge weight clique problem via unconstrained quadratic programming. European Journal of Operational Research 181(2):592-597 (2007).
Anthony et al. Quadratization of symmetric pseudo-Boolean functions. Discrete Appl. Math. 203:1-12 (2016).
Aspuru-Guzik et al. Simulated Quantum Computation of Molecular Energies. Science 309:1704 (2005).
Assad et al. The quadratic minimum spanning tree problem. Naval Research Logistics 39:399-417(1992).
Babbush et al. Resource Efficient Gadgets for Compiling Adiabatic Quantum Optimization Problems. arXiv:1307.8041v1 [quant-ph] (pp. 1-11) (Jul. 2013) Retrieved from the Internet: (https://arxiv.org/pdf/1307.8041.pdf5).
Babbush. Towards Viable Quantum Computation for Chemistry, 2015, [Retrieved on Feb. 27, 2020]. Retrieved from the internet:< url:< a=""0 href="https://pdfs.sennanticscholar.org/aff0/5ecf5f58c2206c923b767d76bed7f43b2a66.pdf">https://pdfs.sennanticscholar.org/aff0/5ecf5f58c2206c923b767d76bed7f43b2a66.pdf? ga= 2.2412147.276222377.1582743768639821531.1551220934 376 Pages (1376) (2015)</url:>.
Barends et al. Digitized adiabatic quantum computing with a superconducting circuit. Nature 534(7606):222-226 (2016).
Bartak et al. Constraint Satisfaction Techniques for Planning and Scheduling Problems (Coplas-15), Jul. 6, 2015. Retrieved on Nov. 17, 2019 at https://www.cs.bgu.ac.il/-icapsl5/workshops/Proceedings%2000PLAS%202015.pdf (pp. 1-41) (2015).
Beasley. Integer programming solution methods. Available at URL: http://people.brunel.ac.uk/-mastjb/jeb/natcor_ip_rest.pdf (20 pgs.) (2011).
Berry et al. Simulating Hamiltonian dynamics with a truncated Taylor series. Phys Rev Lett 114(9):090502 (2015).
Bertoni et al. Quantum logic gates based on coherent electron transport in quantum wires. Physical Review Letters 84(25):5912 (2000).
Bian et al. The Ising model: teaching an old problem new tricks. D-Wave Systems 2 (32 pgs.) (2010).
Boros et al. On quadratization of pseudo-Boolean functions. arXiv:1404.6538v1 [math.OC] (11 pgs.) (2014).
Boros et al. Pseudo-boolean optimization. Discrete Applied Mathematics 123(1):155-225 (2002).
Bravyi et al. Fermionic quantum computation. arXiv:quant-ph/0003137 (2000).
Burell: An Introduction to Quantum Computing using Cavity QED concepts. arXiv preprint arXiv:1210.6512 (2012).
Byrnes et al. Macroscopic quantum computation using Bose-Einstein condensates. arXiv preprint quantum-ph/1103.5512 (2011).
Cai et al. A practical heuristic for finding graph minors.arXiv:1406.2741 [quant-ph] (16 pgs) (2014).
CarrasquillA. Machine learning for quantum matter. https://arxiv.org/pdf/2003.11040.pdf (2020).
Choi. Minor-embedding in adiabatic quantum computation: I. The parameter setting problem. Quantum Information Processing 7(5):193-209 (2008).
Clarke et al. Superconducting quantum bits. Nature 453(7198):1031 (2008).
Conway et al. An FPGA-based instrumentation platform for use at deep cryogenic temperatures. arxiv.org/abs/1509.06809 (2015).
Cory et al. Nuclear magnetic resonance spectroscopy: An experimentally accessible paradigm for quantum computing. arXiv preprint quant-ph/97090 01(1997).
Cowtan et al. On the qubit routing problem. arXiv:1902.08091v2 (2019).
Cramer et al. Efficient quantum state tomography, Nature Communications 1:149 (2010).
Deutsch et al. Quantum computing with neutral atoms in an optical lattice. arXiv preprint quant-ph/0003022 (2000).
Durr et al. A Quantum Algorithm for Finding the Minimum. arXiv:quant-ph/9607014 (1996).
Dwave, Reverse Quantum Annealing for Local Refinement of Solutions, D-Wave Whitepaper Series, Nov. 9, 20179. Retrieved online on Aug. 14, 2019 from https://www.dwavesys.com/sites/default/files/14-1018A-A_Reverse_Quantum_Annealing_for_Local_Refinement_Of_Solutions.pdf (2 pgs.).
EP17812349.3 Third Party Observations dated Oct. 29, 2020.
Farhi et al. A Quantum Approximate Optimization Algorithm. arXiv:1411.4028 (2014).
Farhi et al. Quantum Adiabatic Evolution Algorithms versus Simulated Annealing.arXiv.org:quant ph/0201031 pp. 1-16 (2002).
Farhi et al. Quantum computation by adiabatic evolution. arXiv preprint quant-ph/0001106 (24 pgs) (2000).
Fedichkin et al. Novel coherent quantum bit using spatial quantization levels in semiconductor quantum dot. arXiv preprint quant-ph/0006097 (2000).
Fedorov et al. Exploring chemistry with the fragment molecular orbital method. Physical Chemistry Chemical Physics 14:7562-7577 (2012).
Freund. Applied Lagrange Duality for Constrained Optimization. Massachusetts Institute of Technology (pp. 1-35) (2004).
Geoffrion. Lagrangean relaxation for integer programming. Mathematics Programming Study 2, North-Holland Publishing Company (pp. 1-34) (1974).
Glover et al. Polynomial unconstrained binary optimisation Part 1, 2011, [Retrieved on Feb. 27, 2020]. Retrieved from the internet:< url:< a=""href="http://leedsfaculty.colorado.edu/glover/fred%20pubs/424%20%20%20Polynonnial">http://leedsfaculty.colorado.edu/glover/fred%20pubs/424%20%20%20Polynonnial 25 Pages (231256) (2011)</url:>.
Greene et al. Simulated annealing without rejected moves. IEEE Transactions on Computer-Aided Design of Integrated Circuits and Systems 5(1):221-228 (1986).
Grover. A fast quantum mechanical algorithm for database search. Proceedings of the 28th Annual ACM Symposium on the Theory of Computing (pp. 212-219) (1996).
Harneit. Spin Quantum Computing with Endohedral Fullerenes. arXiv preprint arXiv:1708.09298 (2017).
Hukushima et al. Exchange Monte Carlo Method and Application to Spin Glass Simulations. Journal of the Physical Society of Japan 65:1604 (1996).
Imamog et al. Quantum information processing using quantum dot spins and cavity QED. arXiv preprint quant-ph/9904096 (1999).
Ishikawa. Transformation of General Binary MRF Minimization to the First-Order Case. IEEE Transactions on Pattern Analysis and Machine Intelligence. 33(6):1234-1249 (2011).
Johnson et al. Quantum annealing with manufactured spins. Nature 473(7346):194-198 (2011).
Jordan. Fast Quantum Algorithm for Numerical Gradient Estimation. Physical Review Letters 95:050501 (2015).
Kane. A silicon-based nuclear spin quantum computer. Nature 393(6681):133 (1998).
Karimi et al. A subgradient approach for constrained binary programming via quantum adiabatic evolution. arXiv preprint arXiv:1605.09462 (16 pgs.) (2016).
Karimi et al. Boosting quantum annealer performance via quantum persistence. Online publication eprint arXiv:1606.07797 (Jun. 27, 2027 and updated Aug. 30, 2016). Accessed May 17, 2017 and available from https://www.arxiv.org/pdf/1606.07797.pdf (25 pgs).
Katzgraber et al. Seeking quantum speedup through spin glasses: the good, the bad, and the ugly. Physical Review 5(3):031026 (2015).
Kellerer et al. Knapsack Problems. Springer (15 pgs.) (2004).

(56) References Cited

OTHER PUBLICATIONS

Kielpinski et al. Architecture for a large-scale ion-trap quantum computer. Nature 417(6890):709 (2002).
Kirkpatrick et al. Optimization by simulated annealing. Science 220:671-680 (1983).
Kitaura et al. Fragment molecular orbital method: an approximate computational method for large molecules. Chemical Physics Letters 313(3-4):701-706 (1999).
Knill et al. Efficient linear optics quantum computation. arXiv preprint quant-ph/0006088 (2000).
Knizia et al. Density Matrix Embedding: A Simple Alternative to Dynamical Mean-Field Theory. Phys Rev Lett 109:186404 (2012).
Kobayashi et al. Chapter 5: Divide- and-conquer approaches to quantum chemistry: Theory and implementation, in Linear-Scaling Techniques in Computational Chemistry and Physics: Methods and Applications, edited by Zalesny et al. (Springer Netherlands, Dordrecht, 2011) pp. 97-127.
Kokail et al. Self-verifying variational quantum simulation of lattice models. Nature 569(7756):355-360 (2019).
Konda et al. Actor-Critic Algorithms. Advances in Neural Information Processing Systems. pp. 1008-1014 (2000).
Leuenberger et al. Quantum computing in molecular magnets. arXiv preprint cond-mat/0011415 (2001).
Levit et al. Free energy-based reinforcement learning using a quantum processor. Available at https://arxiv.org/pdf/1706.00074.pdf (May 2017) (8 pgs.).
Leyffer. Deterministic Methods for Mixed Integer Nonlinear Programming. University of Dundee (pp. 1-60 and pp. 1-58) (1993).
Li et al. Nonlinear Integer Programming. New York, NY (pp. 1-452) (2006).
Li. Tackling the Qubit Mapping Problem for NISQ-Era Quantum Devices. arXiv:1809.02573v2 Proceedings of the Twenty-Fourth International Conference on Architectural Support for Programming Languages and Operating Systems. (2019).
Lu et al., Quantum chemistry simulation on quantum computers: theories and experiments. Physical Chemistry Chemical Physics 14(26):9411-9420 (2012).
Lyon. Spin-based quantum computing using electrons on liquid helium. arXiv preprint cond-mat/030158 1 (2006).
Martinis et al. Rabi oscillations in a large Josephson-junction qubit. Physical Review Letters 89:117901 (2002).
Marx et al. Chapter 1. Setting the stage: why ab initio molecular dynamics? In Ab Initio Molecular Dynamics: Basic Theory and Advanced Methods. Cambridge, UK Cambridge University Press (pp. 1-8) (2009).
Matsuura et al. VanQver: The Variational and Adiabatically Navigated Quantum Eigensolver. New Journal of Physics 22:053023 (2020).
McClean et al. The Theory of Variational Hybrid Quantum-Classical Algorithms, Institute of Physics. New Journal of Physics 18:023023. Retrieved online on Aug. 14, 2019 from https://iopscience.iop.org/article/10.1088/1367-2630/18/2/023023/ampdf (21 pgs) (2016).
McGeoch et al. Experimental Evaluation of an Adiabatic Quantum System for Combinatorial Optimization. Computing Frontiers. Proceeding CF '13 Proceedings of the ACM International Conference on Computing Frontiers. Article No. 23. Available at http://www.cs.amherst.edu/ccm/cf14-mcgeoch.pdf (11 pgs) (May 14-16, 2013).
McKiernan et al. Automated quantum programming via reinforcement learning for combinatorial optimization. Quantum Physics. arXiv.org quant-ph arXiv:1908.08054 (2019).
Metz. IBM Is Now Letting Anyone Play With Its Quantum Computer. Wired. (5 pgs.) (May 2016).
Mnih et al. Asynchronous Methods for Deep Reinforcement Learning, in International Conference on Machine Learning, pp. 1928-1937 (2016).
Mnih et al. Playing Atari with Deep Reinforcement Learning. arXiv:1312.5602 (2013).
Moll et al., Optimizing qubit resources for quantum chemistry simulations in second quantization on quantum computer. Journal of Physics A: Mathematical and Theoretical 49(29):295301 (2016).
Montanaro. Quantum walk speedup of backtracking algorithms. arXiv:1509.02374v2 [quant-ph] (23 pgs) (2015).
Nafradi et al. Room temperature manipulation of long lifetime spins in metallic-like carbon nanospheres. Nat Commun 7:12232 (2016).
Niklasson et al., Fast method for quantum mechanical molecular dynamics. Physical Review B 86(17):174308 (2012).
Nishikawa et al. Quantum Chemistry Grid/Gaussian Portal, Journal of the twenty second Annual Research Society, Japan Simulation Society, Jun. 18, 2003, pp. 369 to 372 (English Abstract).
Nizovtsev et al. A quantum computer based on NV centers in diamond: optically detected nutations of single electron and nuclear spins. Optics and spectroscopy 99(2):233-244 (2005).
O'Gorman et al. Compiling planning into quantum optimization problems: a comparative study. Proc. of the Workshop on Constraint Satisfaction Techniques for Planning and Scheduling Problems (COPLAS-15) (pp. 11-20) (Jun. 2015) Retrieved from the Internet:<https://www.cs.bgu.acilt--icaps15/workshops/Proceedings%2000PLAS%202015.pdf>.
Ohlsson et al. Quantum computer hardware based on rare-earth-ion-doped inorganic crystals. Optics Communications 201(1-3):71-77 (2002).
O'Malley et al. Scalable Quantum Simulation of Molecular Energies. Phys. Rev. X 6:031007 (2016).
Orus. Tensor networks for complex quantum systems. Nature Reviews Physics 1:538 (2019).
PCT/CA2017/050320 International Search Report and Written Opinion dated Jun. 27, 2017.
PCT/CA2017/050637 International Search Report and Written Opinion dated Aug. 25, 2017.
PCT/CA2017/050709 International Search Report and Written Opinion dated Sep. 19, 2017.
PCT/CA2017/051610 International Search Report and Written Opinion dated Mar. 21, 2018.
PCT/CA2018/051531 International Search Report and Written Opinion dated Feb. 20, 2019.
PCT/CA2018/051534 International Search Report and Written Opinion dated Feb. 21, 2019.
PCT/CA2019/050852 International Search Report and Written Opinion dated Aug. 15, 2019.
PCT/CA2019/051752 International Search Report and Written Opinion dated Mar. 17, 2020.
PCT/CA2020/050641 International Search Report and Written Opinion dated Jul. 21, 2020.
PCT/IB2017/051038 International Search Report dated May 16, 2017.
PCT/IB2017/051224 International Search Report dated May 18, 2017.
Peruzzo et al. A variational eigenvalue solver on a quantum processor. arXiv:1304.3061 (2013).
Preskill. Quantum Computing in the NISQ era and beyond. Quantum 2:79 arXiv:1801.00862 (2018).
Ronagh et al. Solving constrained quadratic binary problems via quantum adiabatic evolution. arXiv preprint arXiv:1509.05001 (20 pgs.) (2015).
Rosenberg et al. Building an iterative heuristic solver for a quantum annealer. Computational Optimization and Applications 65:845 (2016).
Schmidt et al. General Atomic and Molecular Electronic Structure System. Journal of Computational Chemistry 14:1347-1363 (1993).
Schollwock. The density-matrix renormalization group. Review of Modern Physics 77:259 arxiv.org:cond-mat/0409292 (2004).
Schulman et al. Proximal Policy Optimization Algorithms. arXiv:1707.06347 (2017).
Sepehry et al. Smooth Structured Prediction Using Quantum and Classical Gibbs Samplers. Available at https://1qbit.com/wp-content/uploads/2018/09/1QBit-Research-Paper-Smooth_Structured-Prediction-Using-Quantum-And_classical-Giobbs-Samplers.pdf (Accessed Feb. 20, 2018) (32 pgs).
Shapiro et al. A survey of Lagrangean techniques for discrete optimization. Operations Research Center, Massachusetts Institute of Technology, Cambridge, Massachusetts (pp. 1-18 and pp. 1-29) (May 1977).

(56) References Cited

OTHER PUBLICATIONS

Siraichi et al. Qubit Allocation. CGO 2018—International Symposium on Code Generation and Optimization, Feb. 2018, Vienna, Austria (12 pgs) (2018). pp.1-12.

Sloss et al. Evolutionary Algorithms Review, arXiv:1906.08870 (2019).

Sun et al. A single-photon switch and transistor enabled by a solid-state quantum memory. arXiv preprint quant-ph/1805.01964 (2018).

Suzuki. Fractal decomposition of exponential operators with applications to many-body theories and Monte Carlo simulations. Physics Letters A 146(6):319-323 (1990).

Svore et al. Toward a Software Architecture for Quantum Computing Design Tools. QPL 2004, pp. 127-144, Retrieved from the Internet: URL:https://www.microsoft.com/en-us/research/wp-content/uploads/2016/02/10Svore-Cros s-Aho-Chuang-Markov.pdf.

SymPy Python. Internals of the Polynomial Manupulation Module. Available online at http://docs.sympy.org/latest/modules/polys/internals.html (Accessed Jun. 2016) (136 pgs).

Tavares et al. New algorithms for Quadratic Unconstrained Binary Optimization (QUBO) with applications in engineering and social sciences. Rutgers University Community Repository. Dissertation—Retrieved from the Internet< URL: https://rucorelibrariessutgers.edu/rutgers-lib/25771/> on Feb. 2, 2018 (460 pgs) ( May 2008).

The D-Wave 2X™ Quantum Computer Technology Overview (12 pgs) (2015).

The D-Wave Quantum Computer. Brochure. D-Wave Systems Inc. 2016. http://www.dwavesys.com.

Tran et al. A hybrid quantum-classical approach to solving scheduling problems. AAAI Publications, Ninth Annual Symposium on Combinatorial Search. pp. 98-106 (SoCS 2016) .

Tran et al. Explorations of Quantum-Classical Approaches to Scheduling a MarsLander Activity Problem. The Workshops of the Thirtieth AAAI Conference on Artificial Intelligence Planning for Hybrid Systems: Technical Report WS-16-12, p. 641-649, published on Mar. 29, 2016.

Trotter. On the product of semi-groups of operators. Proceedings of the American Mathematical Society 10(4):545-551 (1959).

U.S. Appl. No. 15/014,576 Office Action dated Dec. 26, 2017.
U.S. Appl. No. 15/014,576 Office Action dated Jul. 10, 2017.
U.S. Appl. No. 15/051,271 Office Action dated Mar. 13, 2018.
U.S. Appl. No. 15/051,271 Office Action dated Nov. 24, 2017.
U.S. Appl. No. 15/165,655 1st Action Interview dated Feb. 24, 2017.
U.S. Appl. No. 15/165,655 1st Action Interview dated Oct. 25, 2016.
U.S. Appl. No. 15/165,655 Office Action dated Jun. 2, 2017.
U.S. Appl. No. 15/486,960 Office Action dated Jun. 22, 2017.
U.S. Appl. No. 15/830,953 Office Action dated Feb. 14, 2018.
U.S. Appl. No. 15/831,967 Office Action dated Feb. 27, 2018.
U.S. Appl. No. 15/900,643 Miscellaneous Communication re: Third Party Submission dated Dec. 14, 2018.
U.S. Appl. No. 16/010,244 Miscellaneous Communication re: Third Party Submission dated Apr. 23, 2019.
U.S. Appl. No. 16/010,244 Office Action dated Dec. 2, 2019.
U.S. Appl. No. 16/010,244 Office Action dated Jun. 10, 2019.
U.S. Appl. No. 16/124,083 Miscellaneous Communication re: Third Party Submission dated Jul. 11, 2019.
U.S. Appl. No. 16/124,083 Office Action dated Jul. 18, 2019.
U.S. Appl. No. 16/124,083 Office Action dated Nov. 21, 2019.
U.S. Appl. No. 16/162,249 Miscellaneous Communication re: Third Party Submission dated May 2, 2019.
U.S. Appl. No. 16/162,249 Office Action dated Dec. 2, 2019.
U.S. Appl. No. 16/162,249 Office Action dated Jun. 12, 2019.
U.S. Appl. No. 16/888,446 3rd Party Submission dated Apr. 7, 2021.

Van Dam et al. How powerful is adiabatic quantum computation Proceedings 42nd IEEE Symposium on Foundations of Computer Science (pp. 279-287) (Oct. 2001).

Vinci et al. Quantum annealing correction with minor embedding. Physical Review A 92.4 (34 pgs) (Jul. 2015).

Wang et al. Population Annealing: Theory and Application in Spin Glasses. Physics Review E 92:961 (2015).

White. Density Matrix Formulation for Quantum Renormalization Groups. Physical Review Letters 69:286 (1992).

Whitfield et al., Simulation of electronic structure Hamiltonians using quantum computers. Molecular Physics 109(5):735-750 (2011).

Wigner et al. Paulische equivalence ban. Magazine for physics 47:631 (1928) (English Abstract).

Wooters et al. The no-cloning theorem. Physics Today 62(2):76-77 (2009).

Wouters et al. A Practical Guide to Density Matrix Embedding Theory in Quantum Chemistry. J Chem Theory Comput. 12(6):2706-19 (2016).

Yang. Direct calculation of electron density in density-functional theory: Implementation for benzene and a tetrapeptide, Physical Review A 44:(11):7823-7826 (1991).

Zimmerman et al. Strong Correlation in Incremental Full Configuration Interaction. Journal of Chemical Physics 146:224104 (2017).

Zulehner et al. Efficient mapping of quantum circuits to the IBM Qx architectures. In Design, Automation & Test in Europe Conference & Exhibition 2018 38(7):1226-1236 (2018).

Amin et al.: Quantum Boltzmann Machine. Phys. Rev. X8, 021050 [arXiv:1601.02036 1-11] (2018).

Gwennap: Groq Rocks Neural Networks. The Linley Group Microprocessor Report https://groq.com/groq-tsp-leads-in-inference-performance/ [1-5] (2020).

Izmaylov et al.: Revising the measurement process in the variational quantum eigensolver: is it possible to reduce the No. of separately measured operators? Chem Sci. 10(13):3746-3755 (2019).

Kaminsky et al.: Scalable architecture for adiabatic quantum computing of NP-hard problems. Quantum Computing & Quantum Bits in Mesoscopic Systems, pp. 229-236 DOI:10.1007/978-1-4419-9092-1_25 [arXiv:quant-ph/0211152 1-10] (2004).

Kempe et al.: The Complexity of the Local Hamiltonian Problem. SIAM Journal of Computing. 35(5): 1070-1097 Rev.2008 DOI: arXiv:quant-ph/0406180v2 [1-30] (2005).

Lemieux et al.: Efficient Quantum Walk Circuits for Metropolis-Hastings Algorithm. Quantum 4:287 [1-15] (2020).

Lemieux et al.: Resource estimate for quantum many-body ground-state preparation on a quantum computer. Physical Review A 103(5)052408 DOI:10.1103/PhysRevA.103.052408 [1-9] (2021).

Moll et al.: Quantum optimization using variational algorithms on near-term quantum devices. Quantum Sci. Technol. 3 030503 [1-17] (2018).

PCT/CA2021/050513 International Search Report and Written Opinion dated Jul. 14, 2021.

Temme et al.: Quantum metropolis sampling. Nature 471(7336):87-90 (2011).

Vartiainen: Unitary Transformations for Quantum Computing. Doctoral Dissertation. Helsinki University of Technology TKK dissertations. DOI: aaltodoc.aalto.fi/handle/123456789/2551 [1-56] (2005).

Bennewitz, Elizabeth R. et al. Neural Error Mitigation of Near-Term Quantum Simulations. arXiv (with supplemental information): pp. 1-20 (2023).

Bougrain, Laurent. Practical Introductions to Artificial Neural Networks. IFAC Publications 37(15):347-352 (2003).

Co-pending U.S. Appl. No. 18/053,080, inventor Dadashikelayeh; Majid, filed Nov. 7, 2022.

Haner, Thomas et al. High Performance Emulation of Quantum Circuits. SC'16: Proceedings of the International Conference for High Performance Computing, Networking, Storage and Analysis. IEEE:866-874 (2016).

Jia, Zhih-Ahn et al. Quantum Neural Network States. arXiv : pp. 1-18 (2018).

Pilch, Jakub, and Jacek Dlugopolski. An FPGA-based real quantum computer emulator. Journal of Computational Electronics 18(1):329-342 (2019).

Torlai, Giacomo et al. Neural-network quantum state tomography. Nature Physics 14(5):447-450 (2018).

U.S. Appl. No. 16/888,419 Office Action dated Aug. 16, 2024.
U.S. Appl. No. 17/110,729 Notice of Allowance dated Jun. 21, 2024.

(56) References Cited

OTHER PUBLICATIONS

U.S. Appl. No. 17/110,729 Notice of Allowance dated Mar. 14, 2024.
U.S. Appl. No. 18/047,882 Notice of Allowance dated Jan. 18, 2024.
Wikipedia. Softmax Function. ; [retrieved on Aug. 19, 2024]. Available at URL:https://en.wikipedia.org/w/index.php?title=Softmax_function&oldid=797231698 pp. 1-3.
Yang, Li. et al. Deep learning-enhanced variational Monte Carlo method for quantum many-body physics. Physical Review Research 2(1): 012039, 1-6 (2020).
Zhou, Leo, et al., Quantum Approximate Optimization Algorithm: Performance, Mechanism, and Implementation on Near-Term Devices. arXiv 1-19 (2018).

\* cited by examiner

ARTIFICIAL INTELLIGENCE-DRIVEN QUANTUM COMPUTING

CROSS-REFERENCE

This application is a continuation of International Application No. PCT/CA2019/051752, filed on Dec. 5, 2019, which claims the benefit of U.S. Provisional Application Ser. No. 62/776,183, filed on Dec. 6, 2018 and U.S. Provisional Application Ser. No. 62/872,601, filed on Jul. 10, 2019, each of which is entirely incorporated herein by reference for all purposes.

BACKGROUND

Many challenging problems may be solved by heuristics implemented using classical computers. It may therefore be important to use heuristic strategies in the realm of non-classical computing (e.g., quantum computing) to extend the computational capabilities of non-classical devices (e.g., quantum devices) and to extend the applicability of such devices to real-world computational challenges. While non-classical computational (e.g., quantum computational) procedures may in principle comprise tunable parameters (such as the strength of a transverse field in quantum annealing of a transverse field Ising model, the strength of XX, XY, and other couplers in quantum annealing, adiabatic quantum computation of various quantum systems, recovery operations in quantum error correction, fault-tolerant quantum computation and quantum memories (QRAMs), navigator Hamiltonians in VanQver, and the like), heuristics in non-classical computation may face challenges.

In classical computation, tunable parameters of the classical heuristic can be initiated, calculated, and updated according to a path taken by the procedure (such as the history and current information stored in memory, user-defined schedules, and previous values of the tunable parameters). When attempts are made to apply such principles to non-classical computers (e.g., quantum computers), however, measurement (read-out) of the non-classical information (e.g., quantum information) under manipulation by the non-classical computational procedure may result in a so-called collapse of the wavefunction, which may be detrimental to non-classical information and may not allow for the non-classical procedure to continue or converge. As a result, the instantaneous state or the history of non-classical computation registers may not be available during implementation of a non-classical or quantum heuristic.

Many classical physics-inspired procedures including procedures such as simulated annealing, simulated quantum annealing, parallel tempering, parallel tempering with Iso-energetic cluster moves, diffusion Monte Carlo, population annealing and quantum Monte Carlo can benefit from methods and systems described herein as well.

SUMMARY

Recognized herein is the need for methods and systems to overcome limitations of heuristics and/or other computational procedures in non-classical or quantum computing. For instance, provided herein are systems and methods for improving the computational efficiency and/or accuracy of non-classical computations (e.g., quantum computations). Systems and methods provided herein may utilize non-classical computers (e.g., quantum computers) comprising a first non-classical or quantum subsystem (referred to herein as a "computation subsystem") for performing a non-classical or quantum computation and a second non-classical or quantum subsystem (referred to herein as a "syndrome subsystem") that is quantum mechanically entangled with the computation subsystem. During a non-classical or quantum computation, the syndrome subsystem may be measured while the computation subsystem is allowed to evolve to carry out the non-classical or quantum computation. Systems and methods provided herein may further allow measurement of the syndrome subsystem during the implementation of the non-classical or quantum computation to provide partial observations about the computation subsystem. Such observations may then be provided to an artificial intelligence (AI) module, such as a machine learning (ML) module or a reinforcement learning (RL) module which may be trained during or prior to the computation to determine next best choices for tunable parameters during or prior to the non-classical or quantum computation. The choice of tunable parameters may pertain to initial, intermediate or final segments of the non-classical or quantum computation.

Systems and methods provided herein, therefore allow the AI module to change the course of the computation as it happens. For example, the tunable parameters may represent the quantum gates applied on a circuit model quantum computation and their change during the runtime of the nonclassical computation will change the gates. In another example, the tunable parameters may represent the evolution path of an adiabatic quantum computation or a quantum annealing procedure. The changes on the tunable parameters by the AI module may change the evolution path of the non-classical computation as the computation is carried out.

In an aspect, a system for performing a computation using artificial intelligence (AI), may comprise: (a) at least one computer configured to perform a computation comprising one or more tunable parameters and one or more non-tunable parameters and output a report indicative of the computation, the computer comprising: (i) one or more registers, wherein the one or more registers are configured to perform the computation; (ii) a measurement unit configured to measure a state of at least one of the one or more registers to determine a representation of the state of the one or more registers, thereby determining a representation of the computation; and (b) at least one AI control unit configured to control the computation, to perform at least one AI procedure to determine one or more tunable parameters corresponding to the computation, and to direct the tunable parameters to the computer, wherein the at least one artificial intelligence (AI) control unit comprises one or more AI control unit parameters. The computer may comprise a hybrid computing system comprising: (a) at least one non-classical computer configured to perform the computation, comprising: (i) the one or more registers; and (ii) the measurement unit; and (b) the AI control unit. The at least one non-classical computer may comprise at least one quantum computer; wherein the one or more registers comprises one or more qubits, the one or more qubits configured to perform the computation; wherein the measurement unit is configured to measure a state of at least one of the one or more qubits to determine a representation of the state of the at least one of the one or more qubits, thereby determining a representation of the computation; wherein the measurement unit is further configured to provide the representation of the computation to the AI control unit. The measurement unit may be configured to measure the state of at least one of the one or more qubits to obtain syndrome data representative of partial information about a current state of the computation and to provide the syndrome data to the AI control unit. The one or more registers may comprise computation registers and syndrome registers; wherein the computation registers comprise one or more computation qubits, the one or more computation qubits configured to perform the computation; wherein the syndrome registers comprise one or more syndrome qubits different from the one or more computation qubits, wherein the one or more syndrome qubits are quantum mechanically entangled with the one or more computation qubits and wherein the one or more syndrome qubits are not for performing the computation; and wherein the measurement unit is configured to measure a state of the one or more syndrome qubits to determine a representation of a state of the one or more computation qubits, thereby determining the representation of the computation. The computation may comprise quantum computation. The quantum computation may comprise adiabatic quantum computation. The quantum computation may comprise quantum approximate optimization algorithm (QAOA). The quantum computation may comprise variational quantum algorithm. The quantum computation may comprise error correction on a quantum register. The quantum computation may comprise a fault tolerant quantum computation gadget. The computation may comprise classical computation. The computation may comprise at least one member selected from the group consisting of: simulated annealing, simulated quantum annealing, parallel tempering, parallel tempering with Isoenergetic cluster moves, diffusion Monte Carlo, population annealing and quantum Monte Carlo. The at least one quantum computer may be configured to perform one or more quantum operations comprising at least one member selected from the group consisting of: preparation of initial states of the one or more qubits; implementation of one or more single qubit quantum gates on the one or more qubits; implementation of one or more multi-qubit quantum gates on the one or more qubits; and adiabatic evolution from an initial to a final Hamiltonian using one or more qubits. The representation of the state of the one or more computation qubits may be correlated with the state of the one or more syndrome qubits. The measurement unit may be configured to measure the state of the one or more syndrome qubits during an evolution of the one or more computation qubits during the computation. The at least one non-classical computer may comprise an integrated photonic coherent Ising machine computer. The at least one non-classical computer may comprise a network of optic parametric pulses. The at least one AI procedure may comprise at least one machine learning (ML) procedure. The at least one ML procedure may comprise at least one ML training procedure. The at least one ML procedure may comprise at least one ML inference procedure. The at least one AI procedure may comprise at least one reinforcement learning (RL) procedure. The at least one AI procedure may be configured to modify the tunable parameters during the computation, thereby providing one or more modified tunable parameters. The one or more modified tunable parameters may be configured to modify the computation during a course of the computation. The at least one AI control unit may comprise at least one member selected from the group consisting of: a tensor processing unit (TPU), a graphical processing unit (GPU), a field-programmable gate array (FPGA), and an application-specific integrated circuit (ASIC). The at least one computer may comprise at least one member selected from the group consisting of: a field-programmable gate array (FPGA) and an application-specific integrated circuit (ASIC). The at least one AI control unit may be in communication with the at least one computer over a network. The at least one AI control unit may be in communication with the at least computer over a cloud network. The at least one AI control unit may be integrated as a classical processing system operating at deep cryogenic temperatures within a refrigerator system. The one or more tunable parameters and one or more non-tunable parameters may define a next segment of the computation comprising an instruction set from a current representation of the computation. The one or more tunable parameters may comprise an initial temperature of the computation. The one or more tunable parameters may comprise a temperature schedule of the computation. The one or more tunable parameters may comprise a final temperature of the computation. The one or more tunable parameters may comprise a schedule of pumping energy of the network. The one or more tunable parameters may comprise an indication of quantum gates for a segment of the quantum computation. The one or more tunable parameters may comprise an indication of a local operations and classical communication (LOCC) channel for a segment of the quantum computation. The AI control unit may comprise a neural network and wherein the one or more AI control unit parameters comprise neural network weights corresponding to the neural network.

In another aspect, a method for training an artificial intelligence (AI) control unit may comprise: (a) obtaining one or more instances of one or more non-tunable parameters and obtaining one or more tunable parameters and AI control unit parameters; (b) configuring the AI control unit using the AI control unit parameters; (c) selecting at least one instance of the one or more non-tunable parameters; (d) configuring a computer using the at least one instance of the one or more non-tunable parameters and the one or more tunable parameters, wherein a value(s) of the one or more tunable parameters are directed by the AI control unit, and wherein said computer comprises one or more registers; (e) performing a segment of a computation using said one or more registers of the computer; (0 performing one or more measurements of at least one of the one or more registers to obtain a representation of the segment of the computation; (g) repeating (c)-(f) a plurality of times; (h) outputting a report indicative of each the computation performed the plurality of times; (i) reconfiguring the AI control unit based on the report by modifying the AI control unit parameters; and (j) repeating (c)-(i) until a stopping criterion is met. The AI control unit and the computer may comprise a system for performing the computation, wherein the system further comprises the system of any aspect or embodiment. The performing one or more measurements of the at least one of the one or more registers to obtain the representation of the segment of the computation may comprise: (a) if the segment is not a last segment for the computation, the one or more measurements comprise syndrome data; (b) if the segment is the last segment for the computation, the one or more measurements comprise computation data.

In another aspect, a method for performing a computation using a system comprising a computer and an artificial intelligence (AI) control unit may comprise: (a) obtaining one or more non-tunable parameters; (b) configuring the computer using the one or more non-tunable parameters; (c) configuring the computer using the one or more tunable parameters, wherein the one or more tunable parameters are directed by the AI control unit; (d) performing a segment of the computation using one or more registers of the computer; (e) performing one or more measurements of at least one of the one or more registers to obtain a representation of the segment of the computation; (f) repeating (c), (d), and (e) until a stopping criterion is met; and (g) outputting a report indicative of the computation. The AI control unit and the computer may comprise a system for performing the computation, wherein the system further comprises the system of any aspect or embodiment.

In another aspect, a method for performing a computation may comprise: (a) obtaining one or more non-tunable parameters from a user; (b) directing a value(s) of one or more tunable parameters to a computer using an artificial intelligence (AI) control unit, wherein the computer comprises one or more registers; (c) using said one or more registers to perform the computation, which computation comprises using the one or more non-tunable parameters and the one or more tunable parameters; (d) performing one or more measurements of the one or more registers to obtain a representation of the computation; and (e) outputting a report indicative of the computation. The AI control unit and the computer may comprise a system for performing the computation, wherein the system further comprises the system of any aspect or embodiment.

In another aspect, a method for training a hybrid computer comprising at least one artificial intelligence (AI) control unit and at least one non-classical computer to perform a computation, may comprise: (a) using the AI control unit to: (i) obtain a training set comprising a plurality of instances of the computation; (ii) obtain and initialize AI control unit parameters and one or more tunable parameters; (iii) select an instance of the plurality of instances; (iv) initialize the at least one non-classical computer; and (v) obtain and initialize a state-action epoch schedule comprising a plurality of state-action epochs; (b) using the at least one non-classical computer to: (i) perform the instance up to a next state-action epoch of the plurality of state-action epochs; (ii) perform one or more measurements of the syndrome register to obtain an instantaneous reward corresponding to the selected instance; and (iii) provide an indication of the instantaneous reward to the AI control unit and thereby update the AI control unit parameters based on the instantaneous reward; (c) using the AI control unit to provide a set of tunable parameters from the one or more tunable parameters; (d) repeating (b) until a first stopping criterion is met; and (e) repeating (a)(iii)-(d) until a second stopping criterion is met.

In another aspect, a method for performing a computation using a hybrid computer comprising at least one artificial intelligence (AI) control unit and at least one non-classical computer, may comprise: (a) using the AI control unit to: (i) obtain a set of instructions representative of the computation, the instructions comprising a tunable instruction set comprising a plurality of tunable instructions; (ii) obtain a trained policy and a state-action epoch schedule comprising a plurality of state-action epochs; (iii) initialize the at least one non-classical computer; and (iv) initialize the plurality of state-action epochs and the tunable instruction set; (b) using the at least one quantum computer to: (i) perform the computation up to a next state-action epoch of the plurality of state-action epochs; (ii) perform one or more measurements of one or more registers to obtain a representation of the computation; and (iii) obtain a next plurality of tunable instructions; and (c) repeating (a)-(b) until a stopping criterion is met.

In another aspect, a method for training an AI control unit, may comprise: (a) obtaining one or more non-tunable parameters, one or more tunable parameters and AI control unit parameters; (b) configuring the AI control unit using the AI control unit parameters; (c) configuring a computer using the one or more non-tunable parameters and the one or more tunable parameters, wherein values of the one or more tunable parameters are directed by the AI control unit; (d) performing a computation using the computer; (e) performing one or more measurements to obtain a representation of the computation; (f) outputting a report indicative of the computation; (g) reconfiguring the AI control unit based on the report by modifying the AI control unit parameters.

In another aspect, a system for performing a computation using artificial intelligence (AI) may comprise: (a) at least one computer configured to perform a computation and output a report indicative of the computation, the computer comprising: (i) one or more computation registers, wherein the one or more computation registers are configured to perform the computation; (ii) one or more syndrome registers; and (iii) a measurement unit configured to measure one or more states of the one or more syndrome registers to determine a representation of one or more states of the one or more computation registers, thereby determining a representation of the computation; and (b) at least one AI control unit configured to control the computation and to perform at least one AI procedure to determine one or more tunable parameters corresponding to the computation and to direct the tunable parameters to the computer, wherein the at least one artificial intelligence (AI) control unit comprises one or more AI control unit parameters. The computer may comprise a hybrid computing system comprising: (a) at least one non-classical computer configured to perform the computation, comprising: (i) the one or more computation registers; (ii) the one or more syndrome registers; and (iii) the measurement unit; and (b) the AI control unit. The at least one non-classical computer may comprise at least one quantum computer; wherein the computation register comprises one or more computation qubits, the one or more computation qubits configured to perform the computation; wherein the syndrome register comprises one or more syndrome qubits different from the one or more computation qubits, wherein the one or more syndrome qubits are quantum mechanically entangled with the one or more computation qubits and wherein the one or more syndrome qubits are not for performing the computation; and wherein the measurement unit is configured to measure one or more states of the one or more syndrome qubits to determine a representation of one or more states of the one or more computation qubits, thereby determining a representation of the computation. The computation may comprise a quantum computation. The computation may comprise a quantum-classical computation. The computation may comprise a classical computation. The at least one quantum computer may further comprise a control unit configured to perform one or more quantum operations on the computation qubits or the syndrome qubits. The one or more quantum operations may comprise at least one member selected from the group consisting of: preparation of initial states of the one or more computation qubits or the one or more syndrome qubits; implementation of one or more single qubit quantum gates on the one or more computation qubits or the one or more syndrome qubits; implementation of one or more multi-qubit quantum gates on the one or more computation qubits or the one or more syndrome qubits; and adiabatic evolution on the one or more computation qubits or the one or more syndrome qubits. The control unit may be configured to perform the one or more quantum operations based on the one or more tunable parameters. The at least one quantum computer may comprise a greater number of computation qubits than syndrome qubits. The at least one quantum computer may comprise a lesser number of computation qubits than syndrome qubits. The at least one quantum computer may comprise an equal number of computation qubits and syndrome qubits. The representation of the one or more states of the one or more computation qubits may be correlated with the one or more states of the one or more syndrome qubits. The measurement unit may be configured to measure the one or more states of the one or more syndrome qubits during an evolution of the one or more computation qubits during the computation. The measurement unit may be further configured to measure one or more states of the one or more computation qubits following the evolution of the one or more computation qubits. The at least one non-classical computer may comprise an integrated photonic coherent Ising machine computer. One or more of the syndrome registers may be further configured to perform the computation. The at least one AI procedure may comprise at least one machine learning (ML) procedure. The at least one ML procedure may comprise at least one ML training procedure. The at least one ML procedure may comprise at least one ML inference procedure. The at least one AI procedure may comprise at least one reinforcement learning (RL) procedure. The at least one AI procedure may be configured to modify the tunable parameters during the computation, thereby obtaining one or more modified tunable parameters. The one or more modified tunable parameters may be configured to modify the computation during a course of the computation. The at least one AI control unit may comprise at least one member selected from the group consisting of: a tensor processing unit (TPU), a graphical processing unit (GPU), a field-programmable gate array (FPGA), and an application-specific integrated circuit (ASIC). The at least one computer may comprise at least one member selected from the group consisting of: a field-programmable gate array (FPGA) and an application-specific integrated circuit (ASIC). The computation may comprise at least one member selected from the group consisting of: simulated annealing, simulated quantum annealing, parallel tempering, and quantum Monte Carlo. The at least one AI control unit may be in communication with the at least one computer over a network. The at least one AI control unit may be in communication with the at least computer over a cloud network. The at least one AI control unit may be located within a distance of at most about 1 centimeter (cm) from the computer. The one or more tunable parameters may comprise an initial temperature of the computation. The one or more tunable parameters may comprise a temperature schedule of the computation. The one or more tunable parameters may comprise a final temperature of the computation. The AI control unit may comprise a neural network and the one or more AI control unit parameters may comprise neural network weights corresponding to the neural network. Reconfiguring the AI control unit based on the representation may comprise modifying the tunable parameters.

In another aspect, a method for training the AI control unit may comprise: (a) obtaining the tunable parameters and AI control unit parameters; (b) configuring the AI control unit using the AI control unit parameters; (c) performing the computation using the computer, wherein the tunable parameters are directed by the AI control unit to the computer; (d) performing one or more measurements of the syndrome registers to obtain a representation of the computation; (e) repeating (c)-(d) a plurality of times; (f) outputting a report indicative of the representation; (g) reconfiguring the AI control unit based on the representation by modifying the AI control unit parameters; and (h) repeating (c)-(g) until a stopping criterion is met.

In another aspect, a method for performing a computation using the system may comprise: (a) obtaining non-tunable parameters from a user; (b) directing tunable parameters to the computer; (c) performing the computation using the computer using the non-tunable parameters and the tunable parameters; (d) performing one or more measurements of the computation register to obtain the computation; and (e) outputting a report indicative of the computation.

In another aspect, a method training a hybrid computer comprising at least one artificial intelligence (AI) control unit and at least one quantum computer to perform a computation may comprise: (a) using the AI control unit to: (i) obtain a training set comprising a plurality of instances of the computation; (ii) obtain and initialize AI control unit parameters and tunable parameters; (iii) select an instance of the plurality of instances; (iv) initialize the at least one quantum computer; and (v) initialize the at least one quantum computer; (b) using the at least one quantum computer to: (i) perform the instance up to a next state-action epoch of the plurality of state-action epochs; (ii) perform one or more measurements of the syndrome register to obtain an instantaneous reward corresponding to the selected instance; and (iii) provide an indication of the instantaneous reward to the artificial AI control unit and thereby update the AI control unit parameters based on the instantaneous reward; (c) using the AI control unit to provide a set of tunable parameters from the plurality of tunable parameters; (d) repeating (b) until a first stopping criterion is met; and (e) repeating (a)(iii)-(d) until a second stopping criterion is met.

In another aspect, a method for performing a computation using a hybrid computer comprising at least one artificial intelligence (AI) control unit and at least one quantum computer, may comprise: (a) using the AI control unit to: (i) obtain a set of instructions representative of the computation, the instructions comprising a tunable instruction set comprising a plurality of tunable instructions; (ii) obtain a trained policy and a state-action epoch schedule comprising a plurality of state-action epochs; (iii) initialize the at least one quantum computer; and (iv) initialize the plurality of state-action epochs and the tunable instruction set; (b) using the at least one quantum computer to: (i) perform the computation up to a next state-action epoch of the plurality of state-action epochs; (ii) perform one or more measurements of the syndrome register to obtain a representation of the computation; and (iii) obtain a new sequence of tunable instructions; and (c) repeating (a)-(b) until a stopping criterion is met.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1:
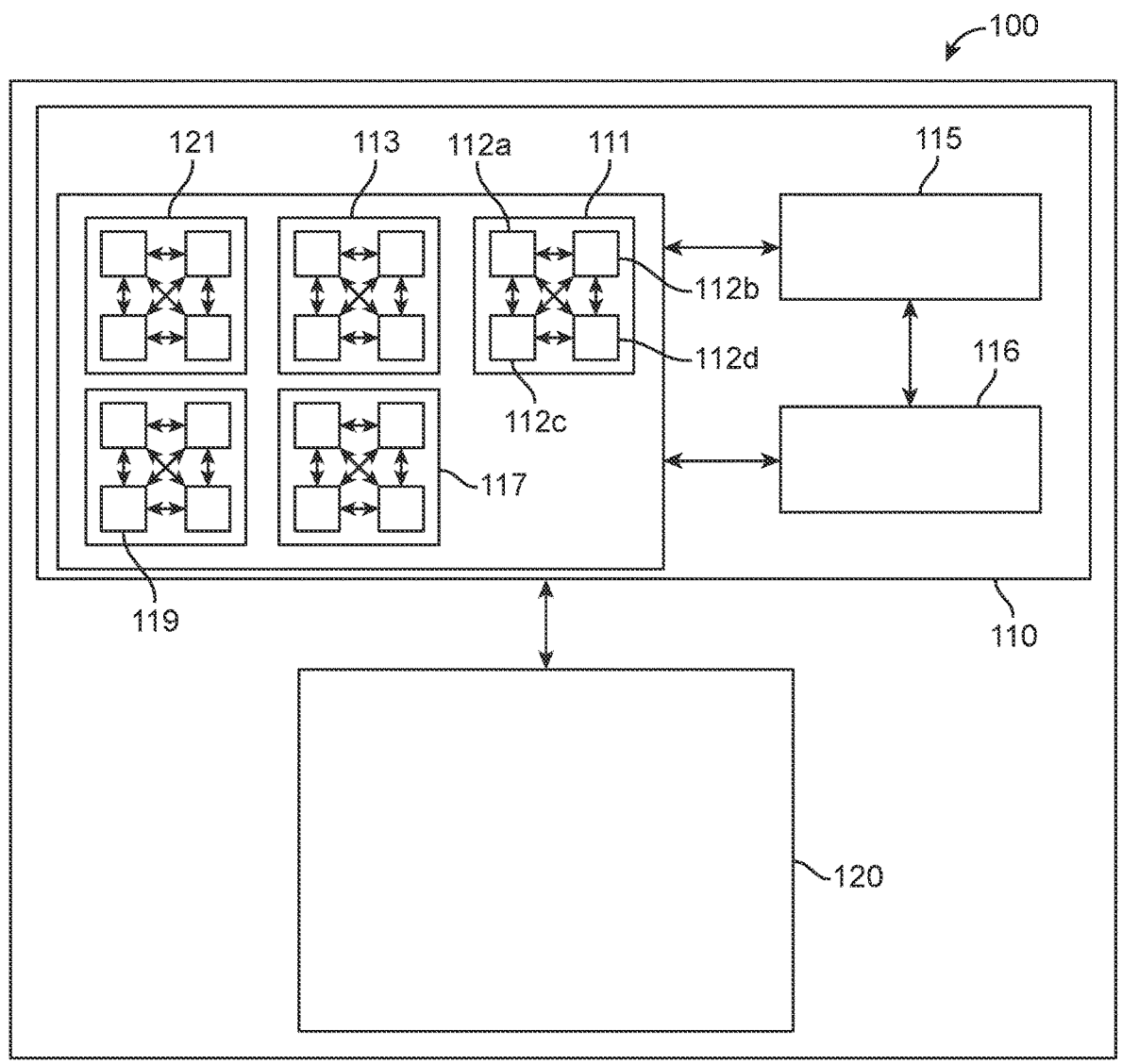
FIG. 1 shows a schematic for an example of a system for performing a computation, in accordance with some embodiments disclosed herein.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

As used herein, the term "heuristic" generally refers to any computational procedure (such as a non-classical (e.g., quantum mechanical) computation) that may depend on a choice of "tunable parameters" (such as weights in a neural network) that may not have known best values, that may have best values that may not be calculated efficiently, or that are stochastic in nature, such that implementation of the heuristic with different initial values may produce different results. Examples of heuristics may include local heuristic search methods in optimization, physics-inspired and/or nature-inspired algorithms, such as simulated annealing, genetic algorithms, particle-swarm optimization, gradient-based methods, gradient-free methods, artificial intelligence (AI), machine learning (ML), reinforcement learning (RL), neural information processing, statistical learning, representational learning, and the like.

As used herein, the terms "artificial intelligence," "artificial intelligence procedure", and "artificial intelligence operation" generally refer to any system or computational procedure that takes one or more actions that may enhance or maximize a chance of successfully achieving a goal. The term "artificial intelligence" may include "machine learning" (ML) and/or "reinforcement learning" (RL).

As used herein, the terms "machine learning," "machine learning procedure," and "machine learning operation" generally refer to any system or analytical and/or statistical procedure that progressively improves computer performance of a task. Machine learning may include a machine learning algorithm. The machine learning algorithm may be a trained algorithm. Machine learning (ML) may comprise one or more supervised, semi-supervised, or unsupervised machine learning techniques. For example, an ML algorithm may be a trained algorithm that is trained through supervised learning (e.g., and various parameters are determined as weights or scaling factors). ML may comprise one or more of regression analysis, regularization, classification, dimensionality reduction, ensemble learning, meta learning, association rule learning, cluster analysis, anomaly detection, deep learning, or ultra-deep learning. ML may comprise, but is not limited to: k-means, k-means clustering, k-nearest neighbors, learning vector quantization, linear regression, non-linear regression, least squares regression, partial least squares regression, logistic regression, stepwise regression, multivariate adaptive regression splines, ridge regression, principle component regression, least absolute shrinkage and selection operation, least angle regression, canonical correlation analysis, factor analysis, independent component analysis, linear discriminant analysis, multidimensional scaling, non-negative matrix factorization, principal components analysis, principal coordinates analysis, projection pursuit, Sammon mapping, t-distributed stochastic neighbor embedding, AdaBoosting, boosting, gradient boosting, bootstrap aggregation, ensemble averaging, decision trees, conditional decision trees, boosted decision trees, gradient boosted decision trees, random forests, stacked generalization, Bayesian networks, Bayesian belief networks, naïve Bayes, Gaussian naïve Bayes, multinomial naïve Bayes, hidden Markov models, hierarchical hidden Markov models, support vector machines, encoders, decoders, auto-encoders, stacked auto-encoders, perceptrons, multi-layer perceptrons, artificial neural networks, feedforward neural networks, convolutional neural networks, recurrent neural networks, long short-term memory, deep belief networks, deep Boltzmann machines, deep convolutional neural networks, deep recurrent neural networks, or generative adversarial networks.

As used herein, the terms "reinforcement learning," "reinforcement learning procedure," and "reinforcement learning operation" generally refer to any system or computational procedure that takes one or more actions to enhance or maximize some notion of a cumulative reward to its interaction with an environment. The agent performing the reinforcement learning (RL) procedure (such as a classical, non-classical, or quantum computer) may receive positive or negative reinforcements, called an "instantaneous reward", from taking one or more actions in the environment and therefore placing itself and the environment in various new states.

A goal of the agent may be to enhance or maximize some notion of cumulative reward. For instance, the goal of the agent may be to enhance or maximize a "discounted reward function" or an "average reward function." A "Q-function" may represent the maximum cumulative reward obtainable from a state and an action taken at that state. A "value function" and a "generalized advantage estimator" may represent the maximum cumulative reward obtainable from a state given an optimal or best choice of actions. RL may utilize any one of more of such notions of cumulative reward. As used herein, any such function may be referred to as a "cumulative reward function." Therefore, computing a best or optimal cumulative reward function may be equivalent to finding a best or optimal policy for the agent. A goal of the computation may be to lower a value of one or more eigenvalues of a Hamiltonian implemented on the non-classical computer. A goal of the computation may be to find a global minimum of a value of one or more eigenvalues of a Hamiltonian implemented on the non-classical computer. A goal of the agent may be to find an optimal policy for the computation. An optimal policy may comprise finding values of tunable parameters to choose for a step of the computation.

The agent and its interaction with the environment may be formulated as one or more Markov Decision Processes (MDPs). The RL procedure may not assume knowledge of an exact mathematical model of the MDPs. The MDPs may be completely unknown, partially known, or completely known to the agent. The RL procedure may sit in a spectrum between the two extents of "model-based" or "model-free" with respect to prior knowledge of the MDPs. As such, the RL procedure may target large MDPs where exact methods may be infeasible or unavailable due to an unknown or stochastic nature of the MDPs.

A learning procedure may be implemented using a digital processing unit such as any classical computer described herein. A learning procedure may comprise an RL procedure. The RL procedure may be implemented using a digital processing unit such as any classical computer described herein. The digital processing unit may utilize an agent that trains, stores, and later on deploys a "policy" to enhance or maximize the cumulative reward. The policy may be sought (for instance, searched for) for a period of time that is as long as possible or desired. Such an optimization problem may be solved by storing an approximation of an optimal policy, by storing an approximation of the cumulative reward function, or both. In some cases, RL procedures may store one or more tables of approximate values for such functions. In other cases, RL procedure may utilize one or more "function approximators."

Examples of function approximators may include neural networks (such as deep neural networks) and probabilistic graphical models (e.g. Boltzmann machines, Helmholtz machines, and Hopfield networks). A function approximator may create a parameterization of an approximation of the cumulative reward function. Optimization of the function approximator with respect to its parameterization may consist of perturbing the parameters in a direction that enhances or maximizes the cumulative rewards and therefore enhances or optimizes the policy (such as in a policy gradient method), or by perturbing the function approximator to get closer to satisfy Bellman's optimality criteria (such as in a temporal difference method).

During training, the agent may take actions in the environment to obtain more information about the environment and about good or best choices of policies for survival or better utility. The actions of the agent may be randomly generated (for instance, especially in early stages of training) or may be prescribed by another machine learning paradigm (such as supervised learning, imitation learning, or any other machine learning procedure described herein). The actions of the agent may be refined by selecting actions closer to the agent's perception of what an enhanced or optimal policy is. Various training strategies may sit in a spectrum between the two extents of off-policy and on-policy methods with respect to choices between exploration and exploitation.

In some cases, a policy may comprise a path of one or more tunable parameters in an optimization space of the non-classical computation. In a simple example, a policy may comprise a temperature schedule of the computation. A policy may comprise a schedule of pumping energy of the network of optic parametric pulses. A policy may comprise a schedule of an indication of quantum gates for a segment of the quantum computation. For example, a policy may comprise an order of gates. For example, a policy may comprise a speed of rotation of one or more rotation gates. A policy may comprise a phase evolution of one or more gates. A policy may solve a control problem for the quantum computer. A policy may comprise a schedule of an indication of local operations and classical communication (LOCC) channel for a segment of the quantum computation.

RL procedures may comprise deep reinforcement learning (DRL) procedures, such as those disclosed in [Mnih et al., Playing Atari with Deep Reinforcement Learning, arXiv: 1312.5602 (2013)], [Schulman et al., Proximal Policy Optimization Algorithms, arXiv:1707.06347 (2017)], [Konda et al., Actor-Critic Algorithms, in *Advances in Neural Information Processing Systems*, pp. 1008-1014 (2000)], and [Mihn et al., Asynchronous Methods for Deep Reinforcement Learning, in *International Conference on Machine Learning*, pp. 1928-1937 (2016)], each of which is incorporated herein by reference in its entirety.

RL procedures may also be referred to as "approximate dynamic programming" or "neuro-dynamic programming."

The present disclosure provides methods and systems for overcoming limitations of heuristics and/or other computational procedures in non-classical or quantum computing. For instance, provided herein are systems and methods for improving the computational efficiency and/or accuracy of non-classical or quantum computations. Systems and methods provided herein may utilize non-classical or quantum computers comprising a first non-classical or quantum subsystem (referred to herein as a "computation subsystem") for performing a non-classical or quantum computation and a second non-classical or quantum subsystem (referred to herein as a "syndrome subsystem") that is quantum mechanically entangled with the computation subsystem. During a non-classical or quantum computation, the syndrome subsystem may be measured while the computation subsystem is allowed to evolve to carry out the non-classical or quantum computation. Systems and methods provided herein may further allow measurement of the syndrome subsystem during the implementation of the non-classical or quantum computation to provide partial observations about the computation subsystem. Such observations may then be provided to an artificial intelligence (AI) control unit, such as a machine learning (ML) module or a reinforcement learning (RL) module which may be trained during or prior to the computation to determine next best choices for tunable parameters during or prior to the non-classical or quantum computation. The choice of tunable parameters may pertain to initial, intermediate or final segments of the non-classical or quantum computation.

AI-Enabled Quantum Computing

As applied to a non-classical computation (such as a quantum computation), the environment may be the total Hilbert space comprising all possible instantaneous states of quantum computer. A classical AI control unit may be trained by several runs of segments of the quantum computation on several instances of problems. The measurements in a subsystem of the Hilbert space may account for a partially observable environment for the AI control unit. In the language of deep learning, each measurement may be viewed as feature extraction from the state of the quantum system. In some example, each syndrome measurement may be viewed as feature extraction from the state of the quantum subsystem; however, in other cases, any measurement may be used.

Hybrid Computing

In some embodiments, a classical computer may be configured to perform one or more classical algorithms. A classical algorithm (or classical computational task) may comprise an algorithm (or computational task) that is able to be executed by one or more classical computers without the use of a quantum computer, a quantum-ready computing service, or a quantum-enabled computing service. A classical algorithm may comprise a non-quantum algorithm. A classical computer may comprise a computer which does not comprise a quantum computer, a quantum-ready computing service, or a quantum-enabled computer. A classical computer may process or store data represented by digital bits (e.g., zeroes ("0") and ones ("1")) rather than quantum bits (qubits). Examples of classical computers include, but are not limited to, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles.

The hybrid computing system may comprise a classical computer and quantum computer. The quantum computer may be configured to perform one or more quantum algorithms for solving a computational problem. The one or more quantum algorithms may be executed using a quantum computer, a quantum-ready computing service, or a quantum-enabled computing service. For instance, the one or more quantum algorithms may be executed using the systems or methods described in U.S. Patent Publication No. 2018/0107526, entitled "METHODS AND SYSTEMS FOR QUANTUM READY AND QUANTUM ENABLED COMPUTATIONS", which is incorporated herein by reference in its entirety. The classical computer may comprise at least one classical processor and computer memory and may be configured to perform one or more classical algorithms for solving a computational problem (e.g., at least a portion of a quantum chemistry simulation). The digital computer may comprise at least one computer processor and computer memory, wherein the digital computer may include a computer program with instructions executable by the at least one computer processor to render an application. The application may facilitate use of the quantum computer and/or the classical computer by a user.

Some implementations may use quantum computers along with classical computers operating on bits, such as personal desktops, laptops, supercomputers, distributed computing, clusters, cloud-based computing resources, smartphones, or tablets.

The system may comprise an interface for a user. In some embodiments, the interface may comprise an application programming interface (API). The interface may provide a programmatic model that abstracts away (e.g., by hiding from the user) the internal details (e.g., architecture and operations) of the quantum computer. In some embodiments, the interface may minimize a need to update the application programs in response to changing quantum hardware. In some embodiments, the interface may remain unchanged when the quantum computer has a change in internal structure.

The present disclosure provides systems and methods that may include quantum computing or use of quantum computing. Quantum computers may be able to solve certain classes of computational tasks more efficiently than classical computers. However, quantum computation resources may be rare and expensive, and may involve a certain level of expertise to be used efficiently or effectively (e.g., cost-efficiently or cost-effectively). A number of parameters may be tuned in order for a quantum computer to deliver its potential computational power.

Quantum computers (or other types of non-classical computers) may be able to work alongside classical computers as co-processors. A hybrid architecture (e.g., computing system) comprising a classical computer and a quantum computer can be very efficient for addressing complex computational tasks. Although the present disclosure has made reference to quantum computers, methods and systems of the present disclosure may be employed for use with other types of computers, which may be non-classical computers. Such non-classical computers may comprise quantum computers, hybrid quantum computers, quantum-type computers, or other computers that are not classical computers. Examples of non-classical computers may include, but are not limited to, Hitachi Ising solvers, coherent Ising machines based on optical parameters, and other solvers which utilize different physical phenomena to obtain more efficiency in solving particular classes of problems.

Non-Classical Computers and Computations

Non-classical computation (e.g., quantum computation) may comprise performing certain quantum operations (such as unitary transformations or completely positive trace-preserving (CPTP) maps on quantum channels) on the Hilbert space represented by a quantum device. As such, quantum and classical (or digital) computation may be similar in the following aspect: both computations may comprise sequences of instructions performed on input information to then provide an output. Various paradigms of quantum computation may break the quantum operations down into sequences of basic quantum operations that affect a subset of qubits of the quantum device simultaneously. The quantum operations may be selected based on, for instance, their locality or their ease of physical implementation). A quantum procedure or computation may then consist of a sequence of such instructions that in various applications may represent different quantum evolutions on the quantum device. For example, procedures to compute simulate quantum chemistry may represent the quantum states and the annihilation and creation operators of electron spin-orbitals by using qubits (such as two-level quantum systems) and a universal quantum gate set (such as the Hadamard, controlled-not (CNOT), and π/8 rotation) through the so-called Jordan-Wigner transformation [Wigner, E. P., & Jordan, P., Über das Paulische Äquivalenzverbot, Zeitschri für Physik 5, 11 (1928)] or Bravyi-Kitaev transformation [Bravyi, S. B., & Kitaev, A. Yu, Fermionic quantum computation, arXiv:quant-ph/0003137], each of which is incorporated herein by reference in its entirety.

Additional examples of quantum procedures or computations may include procedures for optimization such as quantum approximate optimization algorithm (QAOA) [Farhi et al., A Quantum Approximate Optimization Algorithm, arXiv:1411.4028 (2014)] or quantum minimum finding [Durr et al., A Quantum Algorithm for Finding the Minimum, arXiv:quant-ph/9607014 (1996)], each of which is incorporated herein by reference in its entirety. QAOA may comprise performing rotations of single qubits and entangling gates of multiple qubits. In quantum adiabatic computation, the instructions may carry stoquastic or non-stoquastic paths of evolution of an initial quantum system to a final one.

Quantum-inspired procedures may include simulated annealing, parallel tempering, master equation solver, Monte Carlo procedures and the like.

Quantum-classical or hybrid algorithms may comprise such procedures as variational quantum eigensolver (VQE) [Peruzzo, A., McClean, J., Shadbolt, P., Yung, M.-H., Zhou, X.-Q., Love, P. J., Aspuru-Guzik, A., & O'Brien, J. L., A variational eigenvalue solver on a quantum processor, arXiv: 1304.3061] and the variational and adiabatically navigated quantum eigensolver (VanQver) [Matsuura et al., VanQver: The Variational and Adiabatically Navigated Quantum Eigensolver, arXiv:1810.11511 (2018)], each of which is incorporated herein by reference in its entirety. Quantum-classical or hybrid algorithms may comprise simulated quantum annealing or quantum Monte Carlo. Such hybrid algorithms may be especially suitable for near-term noisy quantum devices where there may be a restriction (and in some cases, a severe restriction) in the available quantum computational power due to short coherence times and/or a limitation in the number of available qubits.

A quantum computer may comprise one or more adiabatic quantum computers, quantum gate arrays, one-way quantum computers, topological quantum computers, quantum Turing machines, superconductor-based quantum computers, trapped ion quantum computers, trapped neutral atom quantum computers, trapped atom quantum computers, optical lattices, quantum dot computers, spin-based quantum computers, spatial-based quantum computers, Loss-DiVincenzo quantum computers, nuclear magnetic resonance (NMR) based quantum computers, solution-state NMR quantum computers, solid-state NMR quantum computers, solid-state NMR Kane quantum computers, electrons-on-helium quantum computers, cavity-quantum-electrodynamics based quantum computers, molecular magnet quantum computers, fullerene-based quantum computers, linear optical quantum computers, diamond-based quantum computers, nitrogen vacancy (NV) diamond-based quantum computers, Bose-Einstein condensate-based quantum computers, transistor-based quantum computers, and rare-earth-metal-ion-doped inorganic crystal based quantum computers. A quantum computer may comprise one or more of: quantum annealers, and gate models of quantum computing. A non-classical computer may further comprise one or more of: an Ising solvers and optical parametric oscillators (OPOs).

In some cases, a classical simulator of the quantum circuit can be used which can run on a classical computer like a MacBook Pro laptop, a Windows laptop, or a Linux laptop. In some embodiments, the classical simulator can run on a cloud computing platform having access to multiple computing nodes in a parallel or distributed manner. In some embodiments, the total quantum mechanical energy and/or electronic structure calculation for a subset of fragments can be performed using the classical simulator and the total quantum mechanical energy and/or electronic structure calculation for the remainder of the fragments can be performed using the quantum hardware.

Classical Computers

In some embodiments, the systems, media, networks, and methods described herein comprise a classical computer, or use of the same. For instance, the systems, media, networks, and methods described herein may comprise a computer as described herein with respect to FIG. 6 or use of the same. In some embodiments, the classical computer includes one or more hardware central processing units (CPUs) that carry out the classical computer's functions. In some embodiments, the classical computer further comprises an operating system (OS) configured to perform executable instructions. In some embodiments, the classical computer is connected to a computer network. In some embodiments, the classical computer is connected to the Internet such that it accesses the World Wide Web. In some embodiments, the classical computer is connected to a cloud computing infrastructure. In some embodiments, the classical computer is connected to an intranet. In some embodiments, the classical computer is connected to a data storage device.

In accordance with the description herein, suitable classical computers may include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Smartphones may be suitable for use with methods and systems described herein. Select televisions, video players, and digital music players, in some cases with computer network connectivity, may be suitable for use in the systems and methods described herein. Suitable tablet computers may include those with booklet, slate, and convertible configurations.

In some embodiments, the classical computer includes an operating system configured to perform executable instructions. The operating system may be, for example, software, including programs and data, which manages the device's hardware and provides services for execution of applications. Suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Suitable personal computer operating systems may include, by way of non-limiting examples, Microsoft® Windows®, Apple® Mac OS X®, UNIX®, and UNIX-like operating systems such as GNU/Linux®. In some embodiments, the operating system is provided by cloud computing. Suitable mobile smart phone operating systems may include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Suitable media streaming device operating systems may include, by way of non-limiting examples, Apple TV®, Roku®, Boxee®, Google TV®, Google Chromecast®, Amazon Fire®, and Samsung® HomeSync®. Suitable video game console operating systems may include, by way of non-limiting examples, Sony® PS3®, Sony® PS4®, Microsoft® Xbox 360®, Microsoft Xbox One, Nintendo® Wii®, Nintendo® Wii U®, and Ouya®.

In some embodiments, the classical computer includes a storage and/or memory device. In some embodiments, the storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the classical computer is not powered. In some embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In some embodiments, the storage and/or memory device is a combination of devices such as those disclosed herein.

In some embodiments, the classical computer includes a display to send visual information to a user. In some embodiments, the display is a cathode ray tube (CRT). In some embodiments, the display is a liquid crystal display (LCD). In some embodiments, the display is a thin film transistor liquid crystal display (TFT-LCD). In some embodiments, the display is an organic light emitting diode (OLED) display. In some embodiments, on OLED display is a passive-matrix OLED (PMOLED) or active-matrix OLED (AMOLED) display. In some embodiments, the display is a plasma display. In other embodiments, the display is a video projector. In some embodiments, the display is a combination of devices such as those disclosed herein.

In some embodiments, the classical computer includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In some embodiments, the input device is a microphone to capture voice or other sound input. In some embodiments, the input device is a video camera or other sensor to capture motion or visual input. In some embodiments, the input device is a Kinect, Leap Motion, or the like. In some embodiments, the input device is a combination of devices such as those disclosed herein.

The classical computer may comprise a classical processing unit. In some embodiments, the classical computer may comprise dedicated hardware configured to implement an AI procedure such as any AI procedure described herein. The classical computer may comprise any semiconductor device configured to implement an AI procedure. For instance, the classical computer may comprise one or more members selected from the group consisting of: a tensor processing unit (TPU), a graphical processing unit (GPU), a field-programmable gate array (FPGA), and an application-specific integrated circuit (ASIC). The classical computer may wholly or partially comprise any one or more of the TPU, GPU, FPGA, or ASIC.

Non-Transitory Computer Readable Storage Medium

In some embodiments, the systems and methods described herein include one or more non-transitory computer readable storage media encoded with a program including instructions executable by the operating system of an optionally networked digital processing device. In some embodiments, a computer readable storage medium is a tangible component of a classical computer. In some embodiments, a computer readable storage medium is optionally removable from a classical computer. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Embodiments of the disclosed systems and method for performing a computation are described below.

Systems and Methods for Performing a Computation

In an aspect, the present disclosure provides a system for performing a computation using artificial intelligence (AI). The system may comprise at least one computer configured to perform a computation comprising one or more tunable parameters and one or more non-tunable parameters and output a report indicative of the computation and at least AI control unit. The computer may comprise: (i) one or more registers, wherein the one or more registers are configured to perform the computation; and (ii) a measurement unit configured to measure a state of at least one of the one or more registers to determine a representation of a state of the one or more registers, thereby determining a representation of the computation. The AI control unit may be configured to control the computation and to perform at least one AI procedure to determine one or more tunable parameters corresponding to the computation and to direct the one or more tunable parameters to the computer. The AI control unit may comprise one or more AI control unit parameters.

FIG. 1 shows a schematic for an example of a system 100 for performing a computation using AI. The system may be a hybrid computing system. A hybrid computing system may comprise at least one classical computing system and at least one non-classical computing system. A non-classical computing system may comprise a quantum computer. The computation may comprise a quantum computation. The quantum computation may comprise an adiabatic quantum computation. The quantum computation may further comprise a quantum approximate optimization algorithm (QAOA). The quantum computation may further comprise a variational quantum algorithm. The quantum computation may further comprise an error correction on a quantum register. The quantum computation may further comprise a fault tolerant quantum computation gadget. The computation may comprise a classical computation. The classical computation may further comprise at least one member selected from the group consisting of: simulated annealing, simulated quantum annealing, parallel tempering, parallel tempering with Isoenergetic cluster moves, diffusion Monte Carlo, population annealing and quantum Monte Carlo.

The computation may be comprising one or more tunable parameters and one or more non-tunable parameters. The non-tunable parameters may comprise the parameters defining the family of instances of computations. In one embodiment, the non-tunable parameters may comprise the form of problem Hamiltonian. The tunable parameters may comprise parameters defining an instance of the computation. The tunable parameters may comprise an initial temperature of computation. The tunable parameters may comprise a temperature schedule of the computation. The tunable parameters may comprise a final temperature of the computation. The tunable parameters may comprise a schedule of pumping energy of the network of optic parametric pulses. The tunable parameters may comprise an indication of quantum gates for a segment of the quantum computation. The tunable parameters may comprise an indication of a local operations and classical communication (LOCC) channel for a segment of the quantum computation. The one or more tunable parameters and one or more non-tunable parameters may define a next segment of the computation comprising an instruction set from the current representation of the computation.

As shown in FIG. 1, the computing system may comprise at least one computer 110 and at least one AI control unit 120. The computer 110 may be configured to perform a computation and to output a report indicative of the computation. The computer 110 may comprise a classical computer. The computer 110 may comprise a non-classical computer. The computer 110 may comprise any non-classical computer. The computer 110 may comprise at least one member selected from the group consisting of: a field-programmable gate array (FPGA) and an application-specific integrated circuit (ASIC). The computer 110 may comprise any non-classical computer described herein. In an embodiment, the non-classical computer may comprise an integrated photonic integrated photonic coherent Ising machine computer. U.S. Publication No. 20180267937, which is entirely incorporated herein by reference. In another embodiment, the non-classical computer may comprise a network of optic parametric pulses. See U.S. Pat. No. 10,139,703, which is entirely incorporated herein by reference. In yet another embodiment, the non-classical computer may comprise a quantum computer.

The computer may comprise one or more registers. The computer may comprise a first register 111. The one or more registers may be configured to perform the computation. The computer 110 may comprise second register 113, third register 117, fourth register 119, and fifth register 121. Though depicted as comprising five registers in FIG. 1, the computer 110 may comprise any number of registers, such as at least about 1, 2, 3, 4, 5, 6, 7, 8, 9, 10, 15, 20, 25, 30, 35, 40, 45, 50, 55, 60, 65, 70, 75, 80, 85, 90, 95, 100, or more register(s), at most about 100, 95, 90, 85, 80, 75, 70, 65, 60, 55, 50, 45, 40, 35, 30, 25, 20, 15, 10, 9, 8, 7, 6, 5, 4, 3, 2, or 1 register(s), or a number of registers that is within a range defined by any two of the preceding values.

The register may comprise one or more qubits. For example, the register may comprise any number of qubits, such as at least about 1, 2, 3, 4, 5, 6, 7, 8, 9, 10, 15, 20, 25, 30, 35, 40, 45, 50, 55, 60, 65, 70, 75, 80, 85, 90, 95, 100, or more qubits, at most about 100, 95, 90, 85, 80, 75, 70, 65, 60, 55, 50, 45, 40, 35, 30, 25, 20, 15, 10, 9, 8, 7, 6, 5, 4, 3, 2, or 1 registers, or a number of qubits that is within a range defined by any two of the preceding values. In some embodiments, the register 111 may comprise first qubit 112$a$, second qubit 112$b$, third qubit 112$c$, and forth qubit 112$d$. A register may be configured to perform the computation using the one or more qubits. The register may be configured to serve as a syndrome register using the one or more qubits. The one or more qubits may be entangled with one another, as indicated by double-headed arrows between the qubits 112$a$, 112$b$, 112$c$, and 112$d$ in FIG. 1. The register may be configured to serve as a syndrome register.

The number of registers configured to perform computation or registers serving as syndrome registers may be changed in response to the requirements of a particular computation or during execution of different operations within a particular computation.

In some embodiments, the register configured to perform computation may be different from those configured to serve as syndrome registers. The qubits included in syndrome registers may be quantum mechanically entangled with qubits included in computational registers.

The measurement unit 115 may be configured to measure one or more states of the one or more registers to determine a representation of the computation. In one embodiment, the measurement unit may be configured to measure a state of at least one of the one or more qubits to obtain syndrome data representative of partial information about the current state of the computation and to provide the syndrome data to the AI control unit 120.

In one embodiment, the measurement unit 115 may be configured to measure a state of the one or more first registers to obtain syndrome data to determine a representation of a state of the one or more second registers, thereby determining a representation of the computation. The first registers may comprise a syndrome subsystem. The second registers may comprise a computation subsystem. A syndrome subsystem may comprise one or more registers. A computation subsystem may comprise one or more registers. In some cases, the measurement unit 115 may be configured to measure a state of the one or more qubits to determine a representation of the computation. The measurement unit may be configured to measure the state of the one or more qubits using any type of measurement, such as one or more of a von Neumann measurement, a projection-value measurement (PVM), a positive-operator valued measurement (POVM), a weak continuous measurement, or the like.

The representation of the state of the one or more second registers may be correlated with the state of the one or more first registers. The representation of the state of the one or more second registers may be correlated with the state of the one or more first registers with a correlation coefficient of at least about 0.5, 0.55, 0.6, 0.65, 0.7, 0.75, 0.8, 0.85, 0.9, 0.95, 0.99, or more. The representation of the state of the one or more second registers may be correlated with the state of the one or more first registers with a correlation coefficient of at most about 0.99, 0.95, 0.9, 0.85, 0.8, 0.75, 0.7, 0.65, 0.6, 0.55, 0.5, or less. The representation of the state of the one or more second registers may be correlated with the state of the one or more first registers with a correlation coefficient that is within a range defined by any two of the preceding values.

Since measurement of the first registers may not affect the computation subsystem, which may comprise one or more second registers different from the first registers, the first registers may be prepared, entangled with the second registers, and have measurements performed upon it iteratively during the computation. Each iteration of measurement may allow an AI control unit 120 (such as the agent of an RL procedure described herein) to gain new knowledge about the state of quantum information stored in the computation qubits of the computation subsystem and to prescribe new sets of tunable parameters for computation. In the language of RL, the new schedule for the tunable parameters may be referred to as the action the agent takes in the environment. Therefore, each measurement of the syndrome subsystem may comprise a new state-action epoch for RL.

The measurement unit may be configured to measure the state of the one or more registers of the syndrome subsystem during an evolution of the one or more registers of the computation systems during the computation. The measurement unit may be further configured to measure a state of the one or more registers of the computation subsystem following the evolution of the one or more registers of the computation subsystem.

In some cases, a non-classical computer described herein may further comprise a control unit 116. The control unit may be configured to perform one or more quantum operations on one or more qubits. The quantum operation may comprise at least one member selected from the group consisting of: preparation of initial states of the one or more qubits; implementation of one or more single qubit quantum gates on the one or more qubits; implementation of one or more multi-qubit quantum gates on the one or more qubits; and adiabatic evolution from an initial to a final Hamiltonian using one or more qubits.

The quantum operations may be dynamic. For instance, the quantum operations may be changed in response to the requirements of a particular computation or during execution of different operations within a particular computation. The control unit may be configured to perform the quantum operation based on the one or more tunable parameters.

The AI control 120 may comprise a classical computer, such as any classical computer or any one or more components of a classical computer described herein. For instance, the classical computer may comprise a digital processing unit. The classical computer may comprise one or more members selected from the group consisting of: a TPU, a GPU, a FPGA, and an ASIC. The AI control unit may be integrated as a classical processing system operating at deep cryogenic temperatures within a refrigerator system. See for example, An FPGA-based Instrumentation Platform for use at Deep Cryogenic Temperatures by I. D. Conway Lamb, J. I. Colless, J. M. Hornibrook, S. J, Pauka, S. J. Waddy, M. K. Frechtling, and D. J. Reilly, arxiv.org/abs/1509.06809, which is incorporated herein by reference. The AI control unit may be configured to perform at least one artificial intelligence (AI) procedure to determine one or more tunable parameters for the computation. The AI control unit may be configured to direct the one or more tunable parameters to the non-classical computer. The AI procedure may comprise any AI procedure described herein. The AI procedure may comprise at least one machine learning (ML) procedure. The ML procedure may comprise any ML procedure described herein. The ML procedure may comprise at least one ML training procedure. The ML procedure may comprise at least one ML inference procedure. The AI procedure may comprise at least one reinforcement learning (RL) procedure. The RL procedure may comprise any RL procedure described herein. For instance, the AI procedure may comprise a training procedure described herein with respect to method 1400 of FIG. 14. In some embodiments, the AI procedure may comprise a training procedure described herein with respect to method 400 of FIG. 4. The AI procedure may comprise an inference procedure described herein with respect to method 500 of FIG. 5. The AI procedure may change tunable parameters of the computation. The changes of the tunable parameters may change the computation during the course of the computation. The AI control unit may be configured to store or execute the AI procedure. The AI control unit may be configured to modify the AI procedure during the computation. The AI control unit may be configured to modify the tunable parameters of the computation. The modification of the tunable parameters may modify the computation during the course of the computation. The AI control unit may be configured to direct the tunable parameters to the computer. The AI control unit may comprise one or more AI control unit parameters. The AI control unit may comprise a neural network comprising a plurality of neural network weights. In this embodiment, the AI control unit parameters comprise neural network weights. The neural network may comprise at least one layer, at least one node at each layer, and a neural network weight associated with each edge. The neural network may comprise any number of layers and any number of nodes at each layer. For instance, the neural network may comprise at least about 1, 2, 3, 4, 5, 6, 7, 8, 9, 10, 20, 30, 40, 50, 60, 70, 80, 90, 100, or more layers, at most about 100, 90, 80, 70, 60, 50, 40, 30, 20, 10, 9, 8, 7, 6, 5, 4, 3, 2, or 1 layers, or a number of layers that is within a range defined by any of the preceding values. The neural network may comprise at least about 1, 2, 3, 4, 5, 6, 7, 8, 9, 10, 20, 30, 40, 50, 60, 70, 80, 90, 100, or more nodes at each layer, at most about 100, 90, 80, 70, 60, 50, 40, 30, 20, 10, 9, 8, 7, 6, 5, 4, 3, 2, or 1 nodes at each layer, or a number of nodes at each layer that is within a range defined by any of the preceding values. The neural network may comprise at least about 1, 2, 3, 4, 5, 6, 7, 8, 9, 10, 20, 30, 40, 50, 60, 70, 80, 90, 100, 200, 300, 400, 500, 600, 700, 800, 900, 1,000, 2,000, 3,000, 4,000, 5,000, 6,000, 7,000, 8,000, 9,000, 10,000, 20,000, 30,000, 40,000, 50,000, 60,000, 70,000, 80,000, 90,000, 100,000, 200,000, 300,000, 400,000, 500,000, 600,000, 700,000, 800,000, 900,000, 1,000,000, or more neural network weights, at most about 1,000,000, 900,000, 800,000, 700,000, 600,000, 500,000, 400,000, 300,000, 200,000, 100,000, 90,000, 80,000, 70,000, 60,000, 50,000, 40,000, 30,000, 20,000, 10,000, 9,000, 8,000, 7,000, 6,000, 5,000, 4,000, 3,000, 2,000, 1,000, 900, 800, 700, 600, 500, 400, 300, 200, 100, 90, 80, 70, 60, 50, 40, 30, 20, 10, 9, 8, 7, 6, 5, 4, 3, 2, or 1 neural network weights, or a number of neural network weights that is within a range defined by any of the preceding values.

The AI control unit 120 may be in communication with the computer 110. The AI control unit may be in communication with the computer over a network. The AI control unit may be in communication with the computer over a cloud network. The AI control unit may be in proximity to the computer. The AI control unit 120 may be remotely located with respect to the computer 110 (e.g., the AI control unit 120 may be at least 0.5 miles, 1 mile, 10 miles, or 100 miles away from the computer 110). In some examples, the AI control unit may be located within a distance of at least about 1 micrometer ($\mu m$), 2 $\mu m$, 3 $\mu m$, 4 $\mu m$, 5 $\mu m$, 6 $\mu m$, 7 $\mu m$, 8 $\mu m$, 9 $\mu m$, 10 $\mu m$, 20 $\mu m$, 30 $\mu m$, 40 $\mu m$, 50 $\mu m$, 60 $\mu m$, 70 $\mu m$, 80 $\mu m$, 90 $\mu m$, 100 $\mu m$, 200 $\mu m$, 300 $\mu m$, 400 $\mu m$, 500 $\mu m$, 600 $\mu m$, 700 $\mu m$, 800 $\mu m$, 900 $\mu m$, 1 centimeter (cm), 2 cm, 3 cm, 4 cm, 5 cm, 6 cm, 7 cm, 8 cm, 9 cm, 10 cm, 100 cm, 200 cm, 300 cm, 400 cm, 500 cm, 600 cm, 700 cm, 800 cm, 900 cm, 1,000 cm, or more of the computer. The AI control unit may be located within a distance of at most about 1,000 cm, 900 cm, 800 cm, 700 cm, 600 cm, 500 cm, 400 cm, 300 cm, 200 cm, 100 cm, 90 cm, 80 cm, 70 cm, 60 cm, 50 cm, 40 cm, 30 cm, 20 cm, 10 cm, 9 cm, 8 cm, 7 cm, 6 cm, 5 cm, 4 cm, 3 cm, 2 cm, 1 cm, 900 $\mu m$, 800 $\mu m$, 700 $\mu m$, 600 $\mu m$, 500 $\mu m$, 400 $\mu m$, 300 $\mu m$, 200 $\mu m$, 100 $\mu m$, 90 $\mu m$, 80 $\mu m$, 70 $\mu m$, 60 $\mu m$, 50 $\mu m$, 40 $\mu m$, 30 $\mu m$, 20 $\mu m$, 10 $\mu m$, 9 $\mu m$, 8 $\mu m$, 7 $\mu m$, 6 $\mu m$, 5 $\mu m$, 4 $\mu m$, 3 $\mu m$, 2 $\mu m$, 1 $\mu m$, or less of the computer. The AI control unit may be located within a distance of the computer that is within a range defined by any two of the preceding values. The AI control unit may be located in proximity of the computer in such a manner as to reduce or minimize communications lags between the AI control unit and the non-classical computer during implementation of a computation. An arrangement with the AI control unit in proximity of the computer may be especially advantageous for near-term non-classical computers that feature significant noise and/or short quantum coherence times.

The AI control unit 120 may further comprise a memory. The memory may comprise instructions for executing the at least one AI procedure.

The system 100 may be used to implement any one or more of the methods described herein, such as any one or more of the methods 200, 300, 400, 500, 1300, and 1400 described herein with respect to FIG. 2, FIG. 3, FIG. 4, FIG. 5, FIG. 13 and FIG. 14 respectively.

In an aspect, the present disclosure provides a method for performing a computation using a trained AI control unit. The method may comprise obtaining one or more non-tunable parameters; configuring computer using the one or more non-tunable parameters and tunable parameters directed by the AI control unit; performing a next segment of the computation using the computer; performing one or more measurements of the at least one or more registers to obtain a representation of the computation; repeating performing a next segment of the computation using the computer and performing one or more measurements of the at least one or more registers to obtain a representation of the computation until the end of the computation; and outputting a report indicative of the computation.

Figure 2:
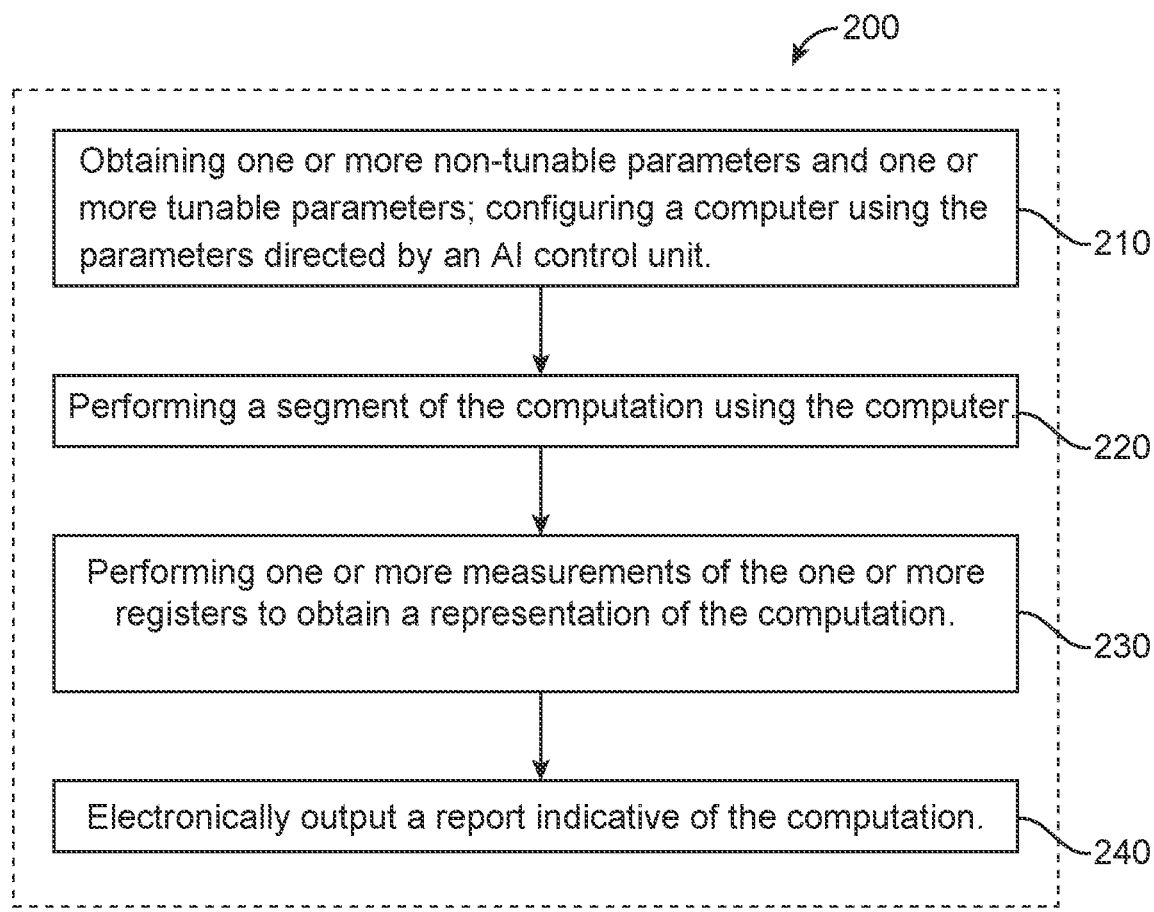
FIG. 2 shows a flowchart for an example of a method for performing a computation, in accordance with some embodiments disclosed herein.

FIG. 2 shows a flowchart for an example of a method 200 for performing a computation using AI. In a first operation 210, the method 200 may comprise obtaining one or more non-tunable parameters and one or more tunable parameters. The operation 210 may additionally comprise configuring a computer using parameters directed by an AI control unit. The AI control unit may be any AI control unit described herein, such as any AI control unit described herein with respect to system 100 of FIG. 1. The AI procedure may be any AI procedure described herein, such any AI procedure described herein with respect to system 100 of FIG. 1. For instance, the AI procedure may comprise a training procedure described herein with respect to method 1400 of FIG. 14. In some embodiments, the AI procedure may comprise a training procedure described herein with respect to method 400 of FIG. 4. The AI procedure may comprise an inference procedure described herein with respect to method 500 of FIG. 5.

In a second operation 220, the method 200 may comprise performing a segment of a computation using a computer.

In a third operation 230, the method 200 may comprise performing one or more measurements of the one or more registers to obtain a representation of the computation. The representation may be any representation described herein, such as any representation described herein with respect to system 100 of FIG. 1.

In a fourth operation 240, the method 200 may comprise electronically outputting a report indicative of the representation of the computation.

The method 200 may further comprise using the AI procedure to change the tunable parameters during the computation. Using the AI procedure to change the tunable parameters may change the computation during the course of the computation. The method 200 may further comprise using the AI control unit to store or execute the AI procedure. The method may further change the AI procedure during the computation. The method may further comprise using the AI control unit to change the tunable parameters during the computation. The change of the tunable parameters may change the computation during the course of the computation.

In an aspect, the present disclosure provides a method for using a hybrid computing system comprising at least one non-classical computer and at least one classical computer to perform a computation. The method may comprise using the at least one classical computer to execute at least one artificial intelligence (AI) procedure to determine one or more tunable parameters for a computation to be implemented by the non-classical computer. Next, the at least one non-classical computer may be used to perform the computation with the one or more tunable parameters to generate a result. Then, the method may comprise electronically outputting the result.

Figure 3:
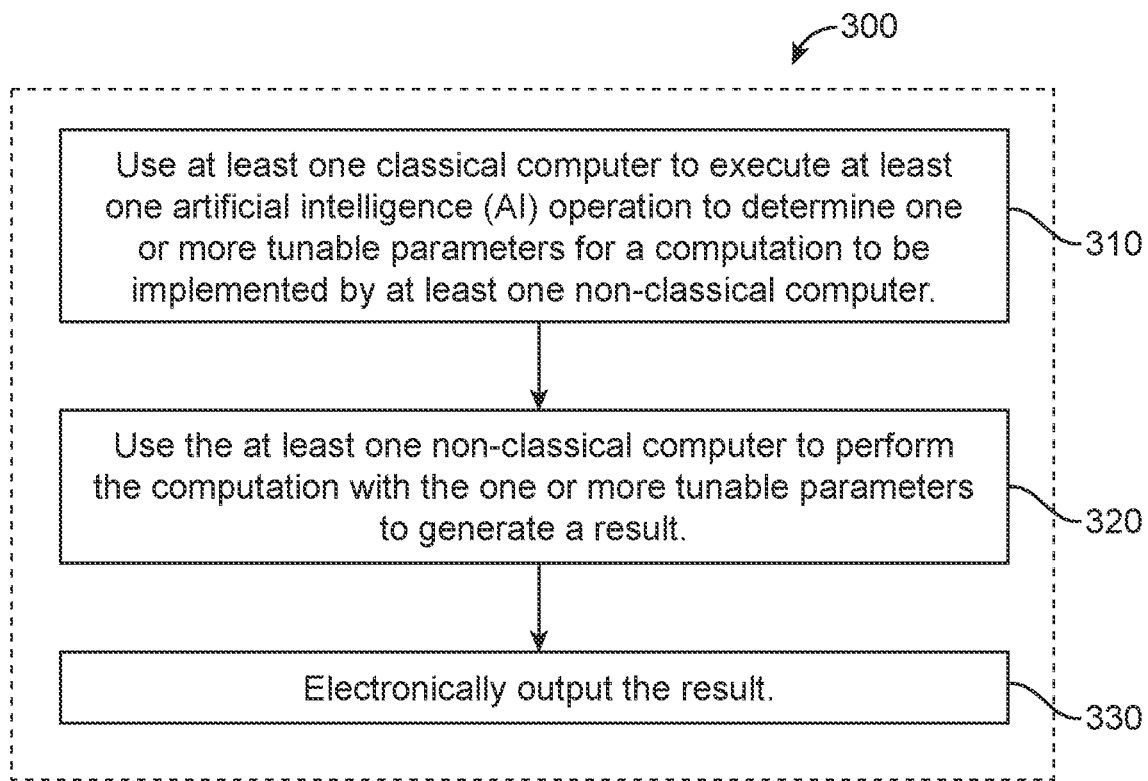
FIG. 3 shows a flowchart for an example of a method for using a hybrid computing system comprising at least one non-classical computer and at least one classical computer to perform a computation, in accordance with some embodiments disclosed herein.

FIG. 3 shows a flowchart for an example of a method 300 for using a hybrid computing system comprising at least one non-classical computer and at least one classical computer to perform a computation.

In a first operation 310, the method 300 may comprise using the at least one classical computer to execute at least one artificial intelligence (AI) procedure to determine one or more tunable parameters for the computation to be implemented by the non-classical computer. The classical computer may be any classical computer described herein, such as any classical computer described herein with respect to system 100 of FIG. 1. The AI procedure may be any AI procedure described herein, such any AI procedure described herein with respect to system 100 of FIG. 1.

Figure 14:
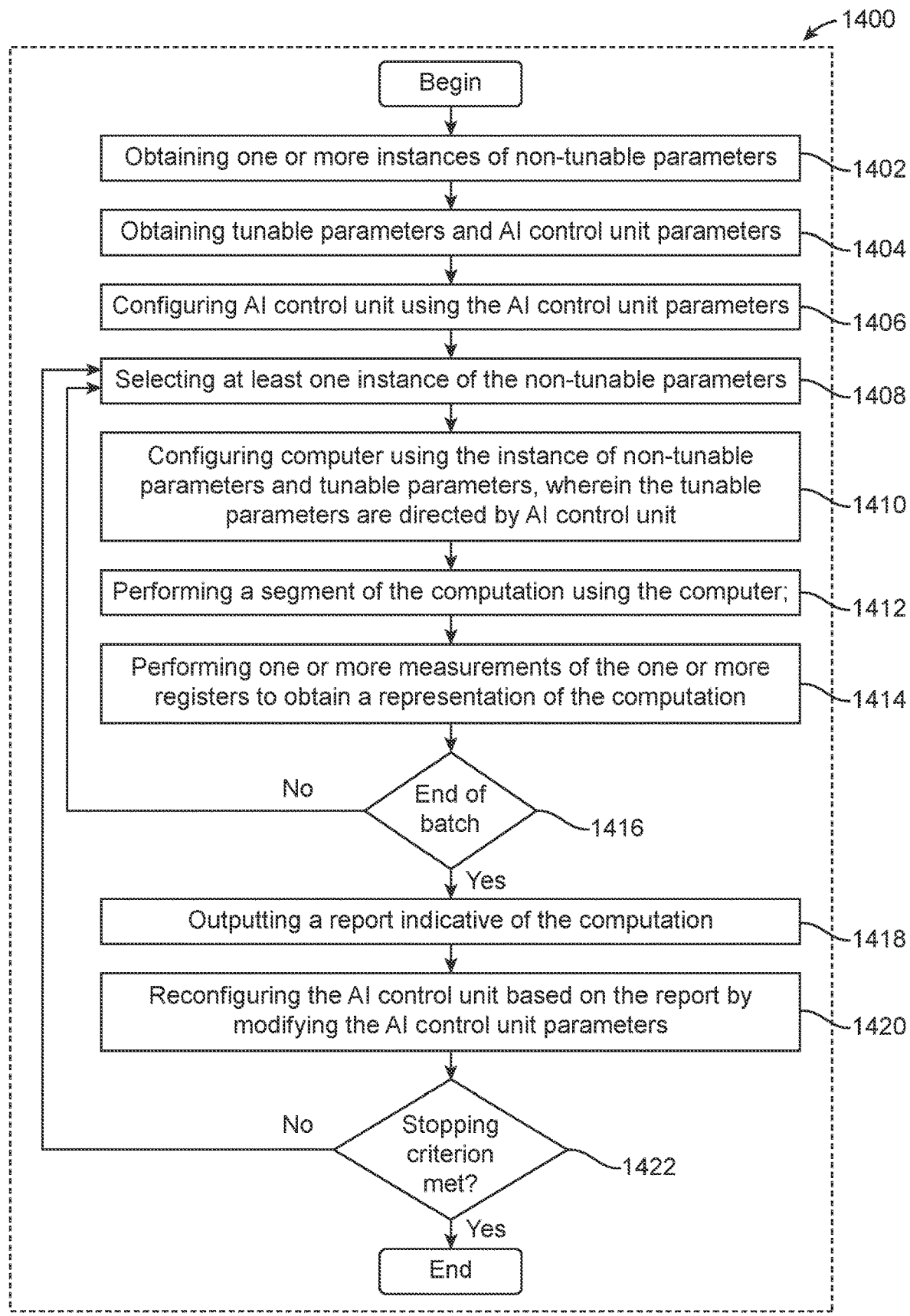
FIG. 14 shows a flowchart for an example of a method for training an AI control unit, in accordance with some embodiments disclosed herein.

For instance, the AI procedure may comprise a training procedure described herein with respect to method 1400 of FIG. 14. In some embodiments, the AI procedure may comprise a training procedure described herein with respect to method 400 of FIG. 4. The AI procedure may comprise an inference procedure described herein with respect to method 500 of FIG. 5. The non-classical computer may be any non-classical computer described herein, such as any non-classical computer described herein with respect to system 100 of FIG. 1.

In a second operation 320, the method 300 may comprise using the at least one non-classical computer to perform the computation with the one or more tunable parameters to generate a result.

In a third operation 330, the method 300 may comprise electronically outputting the result.

The method 300 may comprise any operations described herein with respect to method 200 of FIG. 2.

Training of an AI Control Unit

In a training mode, an AI control unit may enhance its perception of an optimal tunable parameters. To train the AI control unit on a specific computation (such as a specific quantum computation, quantum-classical computation, or classical computation), many instances of inputs represented by non-tunable parameters may be provided (for instance, by different initializations of the computation registers, reprogramming the quantum oracle, and the like) of the computation to the computer. In each run of each instance of the algorithm, initialization and measurements of the registers may be performed in multiple segments of the computation. The AI control unit may receive an indication of the representation of the computation from the measurements performed. In the embodiment wherein the computer is a quantum computer, the AI control unit may receive syndrome data representative of partial information about the current state of the computation. At the end of each run of each instance of the algorithm, the registers may be measured. In the embodiment wherein the computer is a quantum computer, at the end of each run of each instance of the algorithm, the computation registers are measured. The resultant information (such as classical information) may be indicative of how well the procedure or heuristic has solved a desired problem or how well it has implemented the computation. Therefore, the most important segment of the computation for the AI control unit may be at the end of the run of an instance of the computation.

In an aspect, the present disclosure provides a method for training the AI control unit using the system described herein, comprising at least one computer to perform a computation and at least one AI control unit configured to control the computation. The method may comprise obtaining one or more instances of the one or more non-tunable parameters; obtaining the tunable parameters and the AI control unit parameters; configuring the AI control unit using the AI control unit parameters; selecting at least one instance of the one or more non-tunable parameters; configuring the computer using the at least one instance of non-tunable parameters and the tunable parameters, wherein the tunable parameters are directed by the AI control unit; performing a next segment of the computation using the computer; performing one or more measurements of the at least one of the one or more registers to obtain a representation of the computation; repeating the selecting at least one instance of the one or more non-tunable parameters, configuring the computer using the at least one instance of non-tunable parameters and the tunable parameters, wherein the tunable parameters are directed by the AI control unit, performing next segment of the computation using the computer and performing one or more measurements of the at least one of the one or more registers to obtain a representation of the computation a plurality of times; outputting a report indicative of the computations performed the plurality of times; reconfiguring the AI control unit based on the report by modifying the AI control unit parameters; and repeating the processing steps above until a stopping criterion is met.

In an aspect, a method for training an AI control unit, may comprise: (a) obtaining one or more non-tunable parameters, one or more tunable parameters and AI control unit parameters; (b) configuring the AI control unit using the AI control unit parameters; (c) configuring a computer using the one or more non-tunable parameters and the one or more tunable parameters, wherein values of the one or more tunable parameters are directed by the AI control unit; (d) performing a computation using the computer; (e) performing one or more measurements to obtain a representation of the computation; (f) outputting a report indicative of the computation; (g) reconfiguring the AI control unit based on the report by modifying the AI control unit parameters.

The AI control unit and the computer may comprise a system for performing the computation, wherein the system further comprises the system of any aspect or embodiment. The performing one or more measurements of the at least one of the one or more registers to obtain the representation of the segment of the computation may comprise: (a) if the segment is not a last segment for the computation, the one or more measurements comprise syndrome data; (b) if the segment is the last segment for the computation, the one or more measurements comprise computation data.

FIG. 14 shows a flowchart for an example of a method 1400 for training the AI control unit using the system described herein, such as any system described herein with respect to system 100 of FIG. 1.

In a first operation 1402, the method 1400 may comprise obtaining one or more instances of the one or more non-tunable parameters. The computer may be any computer disclosed herein, such as any computer described herein with respect to system 100 of FIG. 1. In some embodiments the computer is a non-classical computer. For instance, the computer may be any quantum computer described herein. The computer may comprise a control unit. The AI control unit may be any AI control unit described herein, such as any AI control unit described herein with respect to system 100 of FIG. 1. The AI control unit is trained. The AI procedure may be any AI procedure described herein, such any AI procedure described herein with respect to system 100 of FIG. 1. For instance, the AI procedure may comprise a training procedure described herein with respect to method 1400 of FIG. 14. In some embodiments, the AI procedure may comprise a training procedure described herein with respect to method 400 of FIG. 4. The AI procedure may comprise an inference procedure described herein with respect to method 500 of FIG. 5. The AI control unit may be configured to direct the one or more tunable parameters to the computer. The computer may comprise one or more registers and a measurement unit.

The measurement unit may be configured to measure a state of at least one of the one or more registers to determine a representation of a state of one or more registers, thereby determining a representation of the computation. The measurement unit may be any measurement unit described herein, such as any measurement unit described herein with respect to system 100 of FIG. 1.

In a second operation 1404, the method 1400 may comprise obtaining tunable parameters and the AI control unit parameters.

In a third operation 1406, the method 1400 may comprise configuring the AI unit using the AI control unit parameters.

In a fourth operation 1408, the method 1400 may comprise selecting at least one instance of the one or more non-tunable parameters.

In a fifth operation 1410, the method 1400 may comprise configuring the computer using the at least one instance of non-tunable parameters and the tunable parameters, wherein the tunable parameters are directed by the AI control unit. In one embodiment, the AI control unit comprises a feed forward neural network. In this embodiment, directing the tunable parameters by the AI control unit comprises running a feedforward calculation on the neural network and providing the values of tunable parameters.

In a sixth operation 1412, the method 1400 may comprise performing next segment of the computation using the computer.

In a seventh operation 1414, the method 1400 may comprise performing one or more measurements of the at least one of the registers to obtain a representation of the computation. If the measurements performed after the last segment computation the measurements comprise computation data. If the measurements performed before the last segment computation and in the embodiment, wherein the computer is a quantum computer, the measurements comprise syndrome data. The syndrome data may be representative of partial information about the current state of the computation.

In an eighth operation 1416, the method 1400 may comprise repeating operations 1408, 1410, 1412 and 1414 a plurality of times.

In a ninth operation 1418, the method 1400 may comprise outputting a report indicative of the computations performed in previous operations.

In a tenth operation 1420, the method 1400 may comprise reconfiguring the AI control unit based on the report by modifying the AI control unit parameters. In one embodiment the AI control unit comprises a neural network. In this embodiment, the AI control unit parameters are the neural network weights. Herein, the modifying the AI control unit parameters comprises updating the neural network weights. The modifying the AI control unit parameters based on the report may follow any machine learning protocol, such as supervised machine learning. The modifying the AI control unit parameters based on the report may comprise backpropagation calculation performed on the neural network.

In an eleventh operation 1422, the method 1400 may comprise repeating operations 1408, 1410, 1412, 1414, 1416, 1418 and 1420 until stopping criterion is met. The stopping criterion may be convergence of the AI control unit parameters. The stopping criterion can be end of the list of instances of one or more non-tunable parameters.

Implementation of an AI-Driven Computation

When using the system disclosed herein for performing a computation with the trained AI control unit, the AI control unit is providing the values of tunable parameters for each segment of computation without updating its AI control unit parameters. As a consequence, the tunable parameters are not updated during the course of computation. The AI control unit directs its best choices of tunable parameters for each segment of computation to the computer to perform computation. The course of computation is changed based on the values of the tunable parameters directed by the trained AI control unit for each segment of the computation.

In an aspect, the present disclosure provides a method for using the system described herein, comprising at least one computer to perform a computation and at least one AI control unit configured to control the computation. The method may comprise obtaining one or more non-tunable parameters; configuring the computer using the obtained non-tunable parameters and tunable parameters directed by the trained AI control unit; performing a next segment of the computation using the computer; performing one or more measurements to obtain a representation of the computation; repeating the performing a next segment of the computation using the computer and performing one or more measurements to obtain a representation of the computation; and outputting a report indicative of the computation.

Figure 13:
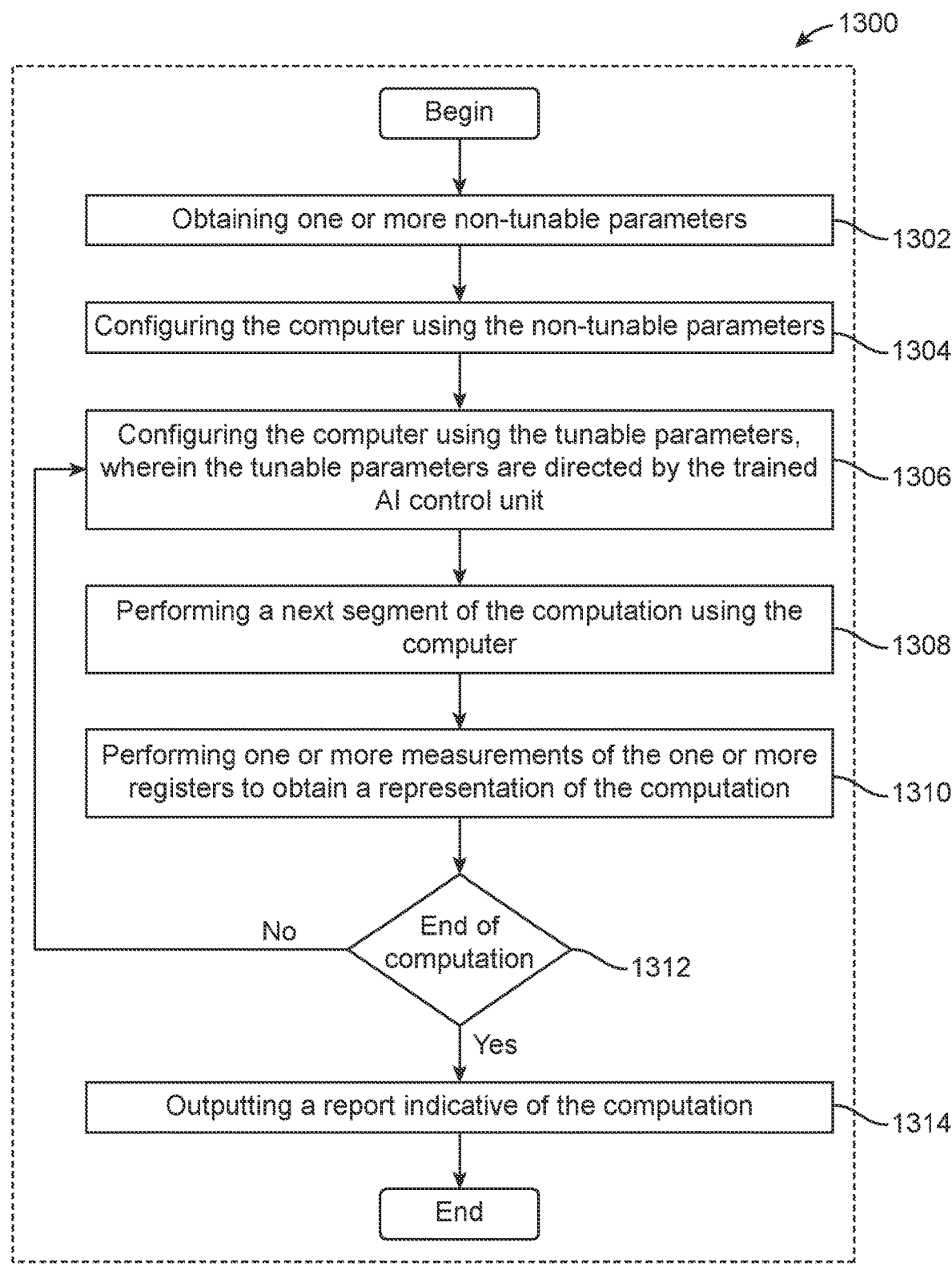
FIG. 13 shows a flowchart for another example of a method for performing a computation, in accordance with some embodiments disclosed herein.

FIG. 13 shows a flowchart for an example of a method 1300 for performing a computation using a computer as described herein.

In a first operation 1302, the method 1300 may comprise obtaining one or more non-tunable parameters. The computer may be any computer disclosed herein, such as any computer described herein with respect to system 100 of FIG. 1. In some embodiments the computer is a non-classical computer. For instance, the computer may be any quantum computer described herein. The computer may comprise a control unit. The AI control unit may be any AI control unit described herein, such as any AI control unit described herein with respect to system 100 of FIG. 1. The AI control unit is trained. The AI procedure may be any AI procedure described herein, such as any AI procedure described herein with respect to system 100 of FIG. 1. For instance, the AI procedure may comprise a training procedure described herein with respect to method 1700 of FIG. 17. In some embodiments, the AI procedure may comprise a training procedure described herein with respect to method 400 of FIG. 4. The AI procedure may comprise an inference procedure described herein with respect to method 500 of FIG. 5. The AI control unit may be configured to direct the one or more tunable parameters to the computer. The computer may comprise one or more registers and a measurement unit.

The measurement unit may be configured to measure a state of at least one or the one or more registers to determine a representation of a state of one or more registers, thereby determining a representation of the computation. The measurement unit may be any measurement unit described herein, such as any measurement unit described herein with respect to system 100 of FIG. 1.

In a second operation 1304, the method 1300 may comprise configuring the computer using the non-tunable parameters and tunable parameters wherein the tunable parameters are directed by the trained AI control unit.

In a third operation 1306, the method 1300 may comprise performing a next segment of the computation using the computer. In an initial segment, a next segment may be an initial segment.

In a fourth operation 1308, the method 1300 may comprise performing one or more measurements of the one or more registers to obtain a representation of the computation. The representation may be any representation described herein, such as any representation described herein with respect to system 100 of FIG. 1.

In a fifth operation 1310, the method 1300 may comprise determining whether a stopping criterion is met.

In a sixth operation 1312, the method 1300 may comprise electronically outputting a report indicative of the representation of the computation.

Training of an RL-Driven Quantum Computation

In a training mode, an AI control unit may enhance its perception of an optimal policy. To train the AI control unit on a specific computation (such as a specific quantum computation, quantum-classical computation, or classical computation), many instances of inputs may be provided (for instance, by different initializations of the computation registers, reprogramming the quantum oracle, and the like) of the procedure to the computation subsystem. In each run of each instance of the algorithm, initialization, entanglement, and measurements of the syndrome subsystem may be performed in multiple state-action epochs. The AI control unit may receive instantaneous rewards from the measurements performed. At the end of each run of each instance of the quantum algorithm, the computation subsystem may be measured. The resultant information (such as classical information) may be indicative of how well the procedure or heuristic has solved a desired problem or how well it has implemented the computation. Therefore, the most important state-action epoch for the AI control unit may be at the end of the run of an instance of the computation wherein an instantaneous reward may be obtained with respect to utility of the results of the computation.

In an aspect, the present disclosure provides a method for training a hybrid computer comprising at least one classical computer and at least one non-classical computer to perform a computation. The method may comprise use the classical computer to: (i) obtain a training set comprising a plurality of instances of the computation; (ii) obtain and initialize an artificial intelligence (AI) module; (iii) select an instance of the plurality of instances, the instance comprising plurality of tunable parameters; (iv) initialize the non-classical computer; and (v) initialize a state-action epoch schedule comprising a plurality of state-action epochs. The non-classical computer may comprise: (1) at least one computation register comprising one or more computation qubits, wherein the computation register is configured to perform the computation using the one or more computation qubits; (2) at least one syndrome register comprising one or more syndrome qubits different from the one or more computation qubits, wherein the one or more syndrome qubits are quantum mechanically entangled with the one or more computation qubits and wherein the one or more syndrome qubits are not for performing the computation; and (3) at least one measurement unit configured to measure one or more states of the one or more syndrome qubits to determine a representation of one or more states of the one or more computation qubits, thereby determining a representation of the computation. Next, the method may comprise using the non-classical computer to: (i) perform the instance up to a next state-action epoch of the plurality of state-action epochs; (ii) perform one or more measurements of the syndrome register to obtain an instantaneous reward corresponding to the selected instance; and (iii) provide an indication of the instantaneous reward to the classical computer and thereby train the AI module based on the instantaneous reward. Next, the AI module may be used to provide a set of tunable parameters from the plurality of tunable parameters. Then, the non-classical computer operations may be repeated until a first stopping criterion is met. Finally, classical and non-classical computer operations may be repeated until a second stopping criterion is met.

In an aspect, a method for training a hybrid computer comprising at least one artificial intelligence (AI) control unit and at least one non-classical computer to perform a computation, may comprise: (a) using the AI control unit to: (i) obtain a training set comprising a plurality of instances of the computation; (ii) obtain and initialize AI control unit parameters and tunable parameters; (iii) select an instance of the plurality of instances; (iv) initialize the at least one non-classical computer; and (v) obtain and initialize a state-action epoch schedule comprising a plurality of state-action epochs; (b) using the at least one non-classical computer to: (i) perform the instance up to a next state-action epoch of the plurality of state-action epochs; (ii) perform one or more measurements of the syndrome register to obtain an instantaneous reward corresponding to the selected instance; and (iii) provide an indication of the instantaneous reward to the AI control unit and thereby update the AI control unit parameters based on the instantaneous reward; (c) using the AI control unit to provide a set of tunable parameters from the plurality of tunable parameters; (d) repeating (b) until a first stopping criterion is met; and (e) repeating (a)(iii)-(d) until a second stopping criterion is met.

Figure 4:
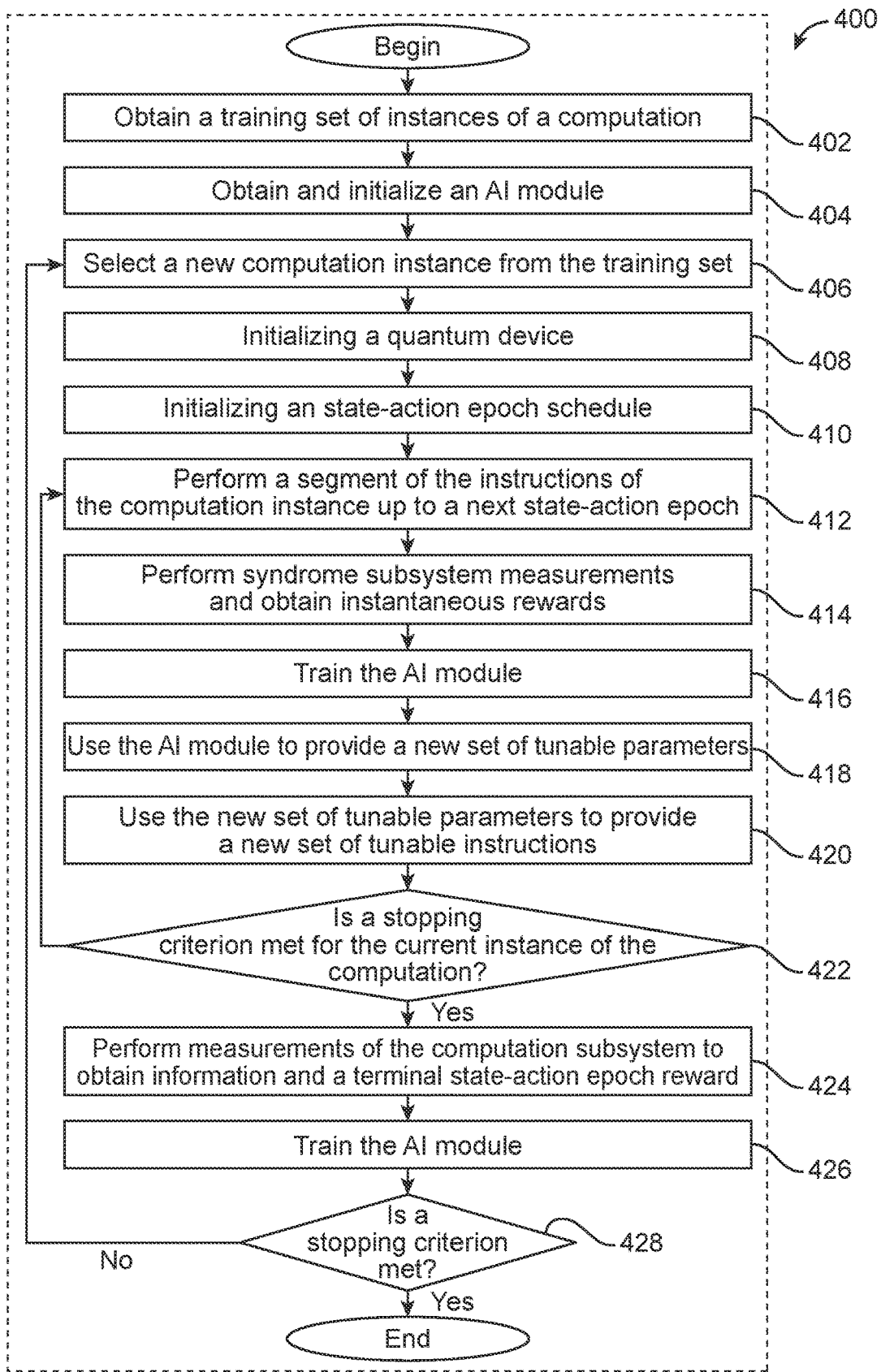
FIG. 4 shows a flowchart for an example of a method for training an AI module for implementing a computation, in accordance with some embodiments disclosed herein.

FIG. 4 shows a flowchart for an example of a method 400 for training an AI module for implementing a computation.

In a first operation 402, the method 400 may comprise obtaining a training set of instances of a computation. The computation may be any computation described herein, such as a quantum computation, a quantum-classical computation, or a classical computation. Each instance of computations in the training set may comprise a set of tunable and untenable (or static) instructions representative of the computation, as well as a reward function representative of intermediate and terminal state-action epochs.

In a second operation 404, the method 400 may comprise obtaining and initializing an AI module comprising a trainable policy and a state-action epoch schedule. The AI module may comprise any AI module described herein, such as an ML module or an RL module.

In a third operation 406, the method 400 may comprise selecting a new computation instance from the training set. The new computation instance may comprise a new quantum computation instance, quantum-classical computation instance, or classical computation instance.

In a fourth operation 408, the method 400 may comprise initializing a non-classical device. The non-classical device may comprise a syndrome subsystem and a computation subsystem. The non-classical device may comprise any quantum device described herein (for instance, with respect to system 100 of FIG. 1). The syndrome subsystem may comprise any syndrome subsystem described herein (for instance, with respect to system 100 of FIG. 1). The computation subsystem may comprise any computation subsystem described herein (for instance, with respect to system 100 of FIG. 1).

In a fifth operation 410, the method 400 may comprise initializing the state-action epoch schedule.

In a sixth operation 412, the method 400 may comprise performing a segment of the instructions of the computation instance up to a next state-action epoch.

In a seventh operation 414, the method 400 may comprise performing syndrome subsystem measurements and obtaining instantaneous rewards. The seventh operation 414 may be implemented upon reaching the next state-action epoch of the sixth operation 412.

In an eighth operation 416, the method 400 may comprise training the AI module further. The AI module may be trained based on the measurement results of the syndrome subsystem, the instantaneous reward, and the current policy of the AI module.

Any, at least a subset of, or all of the sixth, seventh, and eighth operations 412, 414, and 416 may be repeated at least 1, 2, 3, 4, 5, 6, 7, 8, 9, 10, 100 or more times as long as the next state-action epoch for the current instance of the computation is not a terminal state-action epoch.

In a ninth operation 418, the method 400 may comprise using the AI module to provide a new set of tunable parameters for the computation.

In a tenth operation 420, the method 400 may comprise using the new set of tunable parameters to provide a new set of tunable instructions.

In an eleventh operation 422, the method 400 may comprise determining whether a stopping criterion is met for the current instance of the computation. In the event that the stopping criterion is not met, any, at least a subset of, or all of the sixth, seventh, eighth, ninth, and tenth operations 412, 414, 416, 418, and 420, respectively, may be repeated at least 1, 2, 3, 4, 5, 6, 7, 8, 9, 10, 100 or more times until the stopping criterion is met for the current instance of the computation. In the event that the stopping criterion is met, the method 400 may proceed to twelfth operation 424.

In a twelfth operation 424, the method 400 may comprise performing measurements of the computation subsystem to obtain information (such as classical information) and a terminal state-action epoch reward for the current instance of the computation.

In a thirteenth operation 426, the method 400 may comprise training the AI module at the terminal state-action epoch.

In a fourteenth operation 428, the method 400 may comprise determining whether a stopping criterion is met for the training of the AI module. In the event that the stopping criterion is not met, any, at least a subset of, or all of the third, fourth, fifth, sixth, seventh, eighth, ninth, tenth, eleventh, twelfth, and thirteenth operations 406, 408, 410, 412, 414, 416, 418, 420, 422, 424, and 426, respectively, may be repeated at least 1, 2, 3, 4, 5, 6, 7, 8, 9, 10, 100 or more times until the stopping criterion is met. In the event that the stopping criterion is met, the method for training of the AI module may end.

Implementation of an RL-Driven Quantum Computation

In an inference mode, an agent may not be obligated to search for improvements in the policy it has found. Instead, it may only provide its best choices of actions as a function of the measurements of the syndrome subsystem. In some embodiments, one or more classical neural networks may be used as a function approximator to store the optimal policy. Inference may then comprise running a feedforward calculation on the neural network and providing the best action suggested by the activations of the output layer of the neural network.

In an aspect, the present disclosure provides a method for performing a computation using a hybrid computer comprising at least one classical computer and at least one non-classical computer. The method may comprise using the classical computer to: (i) obtain a set of instructions representative of the computation, the instructions comprising a tunable instruction set comprising a plurality of tunable instructions and at least one non-tunable instruction set; (ii) obtain a trained artificial intelligence (AI) module comprising a trained policy and a state-action epoch schedule comprising a plurality of state-action epochs; (iii) initialize the non-classical computer; and (iv) initialize the plurality of state-action epochs and the tunable instruction set.

In an aspect, a method for performing a computation using a hybrid computer comprising at least one artificial intelligence (AI) control unit and at least one non-classical computer, may comprise: (a) using the AI control unit to: (i) obtain a set of instructions representative of the computation, the instructions comprising a tunable instruction set comprising a plurality of tunable instructions; (ii) obtain a trained policy and a state-action epoch schedule comprising a plurality of state-action epochs; (iii) initialize the at least one non-classical computer; and (iv) initialize the plurality of state-action epochs and the tunable instruction set; (b) using the at least one quantum computer to: (i) perform the computation up to a next state-action epoch of the plurality of state-action epochs; (ii) perform one or more measurements of one or more registers to obtain a representation of the computation; and (iii) obtain a next plurality of tunable instructions; and (c) repeating (a)-(b) until a stopping criterion is met.

Figure 5:
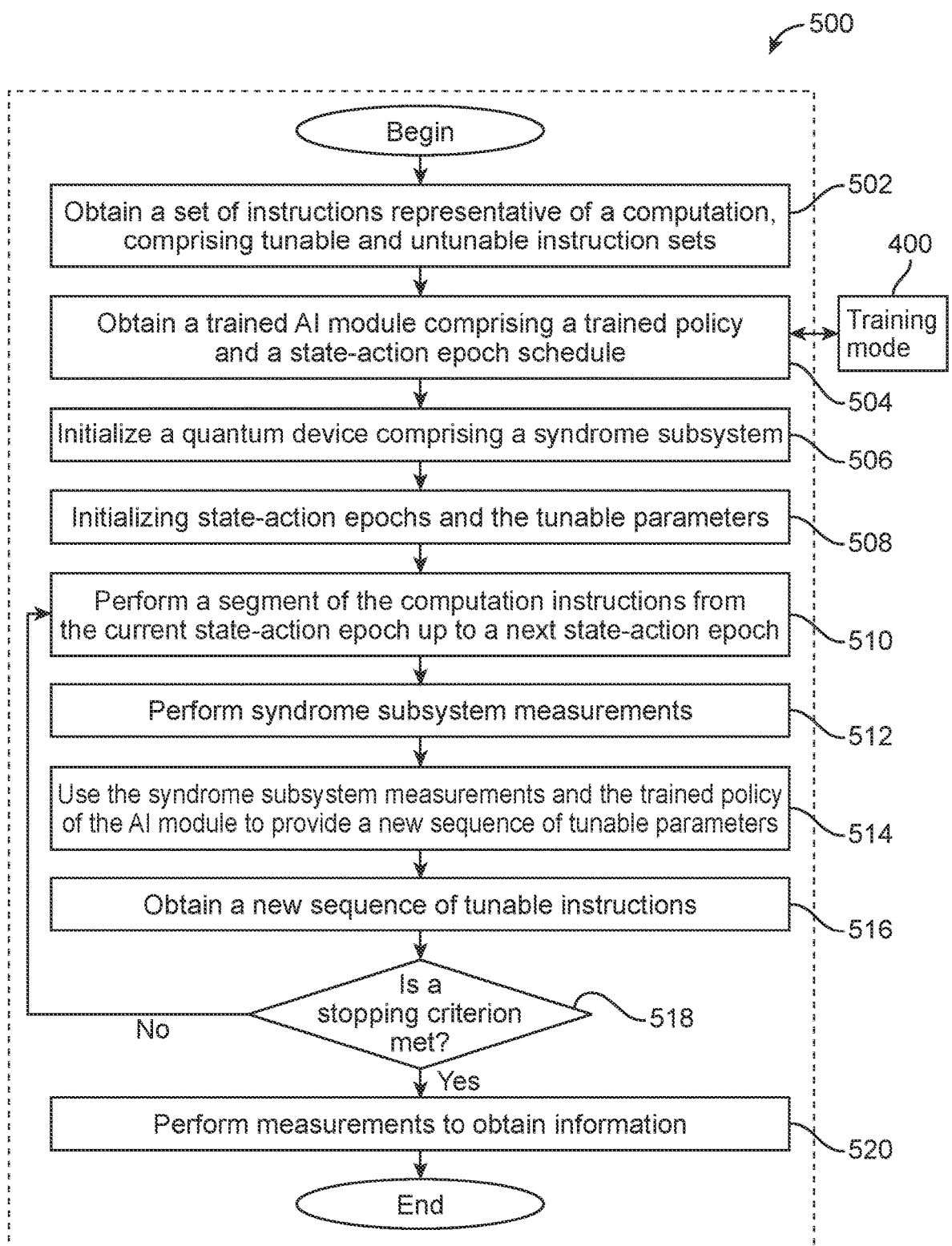
FIG. 5 shows a flowchart for an example of a method for providing inferences from an AI module for implementing a computation, in accordance with some embodiments disclosed herein.

FIG. 5 shows a flowchart for an example of a method 500 for providing inferences from an AI module for implementing a computation.

In a first operation 502, the method 500 may comprise obtaining a set of instructions representative of a computation. The computation may be any computation described herein, such as a quantum computation, a quantum-classical computation, or a classical computation. The computation may comprise tunable and non-tunable (or static) instruction sets.

In a second operation 504, the method 500 may comprise obtaining a trained AI module. The trained AI module may comprise any AI module described herein, such as an ML module or an RL module. For instance, the trained AI module may comprise an AI module obtained from the method 400 described herein with respect to FIG. 4. The trained AI module may comprise a trained policy and an action-epoch schedule (such as the trained policy and action-epoch schedule described herein with respect to method 400 of FIG. 4).

In a third operation 506, the method 500 may comprise initializing a non-classical device. The non-classical device may comprise a syndrome subsystem and a computation subsystem. The non-classical device may comprise any quantum device described herein (for instance, with respect to system 100 of FIG. 1). The syndrome subsystem may comprise any syndrome subsystem described herein (for instance, with respect to system 100 of FIG. 1). The computation subsystem may comprise any computation subsystem described herein (for instance, with respect to system 100 of FIG. 1).

In a fourth operation 508, the method 500 may comprise initializing state-action epochs of the state-action epoch schedule and the tunable parameters.

In a fifth operation 510, the method 500 may comprise performing a segment of the computation instructions from the current state-action epoch up to the next state-action epoch. The computation instructions may comprise tunable and non-tunable (or static) instructions. The tunable instructions may be obtained from the tunable parameters.

In a sixth operation 512, the method 500 may comprise performing measurements of one or more registers. The one or more registers may comprise syndrome subsystem measurements.

In a seventh operation 514, the method 500 may comprise using measurements and the trained policy of the trained AI module to provide a new sequence of tunable parameters.

In an eighth operation 516, the method 500 may comprise obtaining a new sequence of tunable instructions for the computation.

In a ninth operation 518, the method 500 may comprise determining whether a stopping criterion is met. In the event that the stopping criterion is not met, any, at least a subset of, or all of the fifth, sixth, seventh, and eighth operations 510, 512, 514, and 516 may be repeated at least 1, 2, 3, 4, 5, 6, 7, 8, 9, 10, 100 or more times until the stopping criterion is met. In the event that the stopping criterion is met, tenth operation 520 may be performed.

In a tenth operation 520, the method 500 may comprise performing measurements to obtain information (such as classical information) and terminating the computation.

Many variations, alterations, and adaptations based on methods 200, 300, 400, 500, 1300, and 1400 provided herein are possible. For example, the order of the operations of the methods 100, 200, 300, 400, 500, 1300, and 1400 may be changed, some of the operations removed, some of the operations duplicated, and additional operations added as appropriate. Some of the operations may be performed in succession. Some of the operations may be performed in parallel. Some of the operations may be performed once. Some of the operations may be performed more than once. Some of the operations may comprise sub-operations. Some of the operations may be automated and some of the operations may be manual.

Computer Systems

Figure 6:
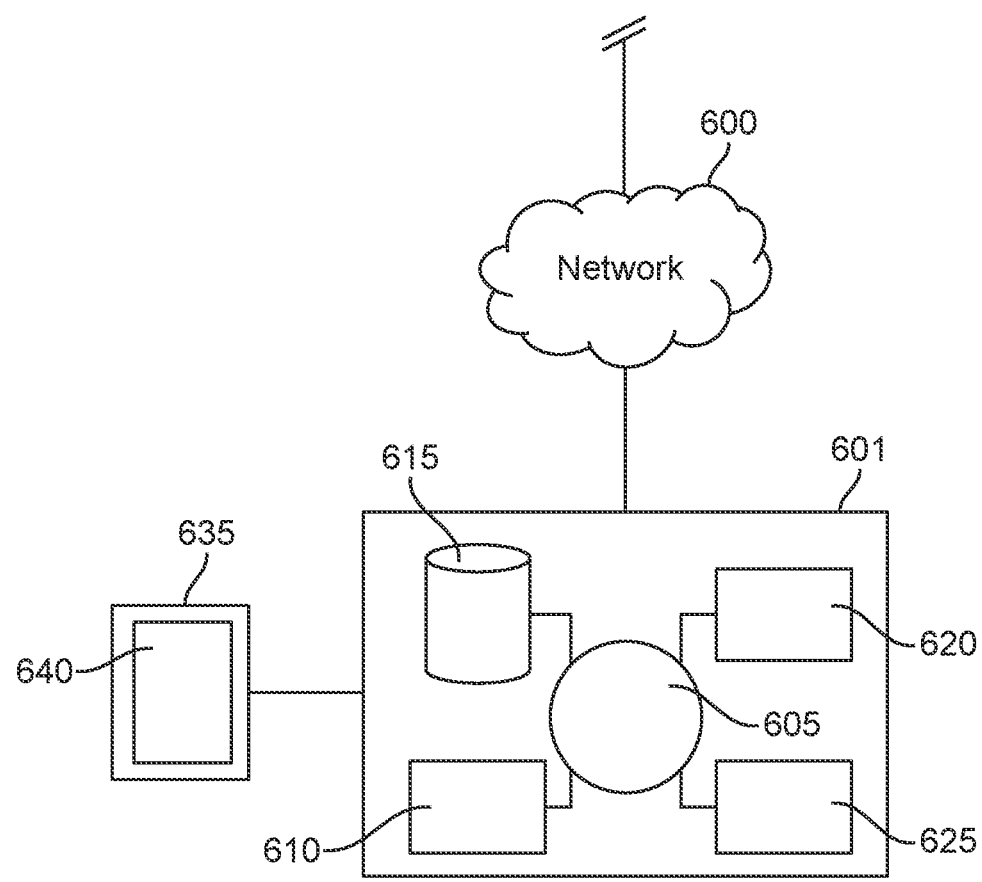
FIG. 6 shows a computer control system that is programmed or otherwise configured to implement methods provided herein, in accordance with some embodiments disclosed herein.

The present disclosure provides computer systems that are programmed to implement methods of the disclosure. FIG. 6 shows a computer system 601 that is programmed or otherwise configured to implement methods of the present disclosure. The computer system 601 can regulate various aspects of methods and systems of the present disclosure.

The computer system 601 can be an electronic device of a user or a computer system that is remotely located with respect to the electronic device. The electronic device can be a mobile electronic device. The computer system 601 includes a central processing unit (CPU, also "processor" and "computer processor" herein) 605, which can be a single core or multi core processor, or a plurality of processors for parallel processing. The computer system 601 also includes memory or memory location 610 (e.g., random-access memory, read-only memory, flash memory), electronic storage unit 615 (e.g., hard disk), communication interface 620 (e.g., network adapter) for communicating with one or more other systems, and peripheral devices 625, such as cache, other memory, data storage and/or electronic display adapters. The memory 610, storage unit 615, interface 620 and peripheral devices 625 are in communication with the CPU 605 through a communication bus (solid lines), such as a motherboard. The storage unit 615 can be a data storage unit (or data repository) for storing data. The computer system 601 can be operatively coupled to a computer network ("network") 630 with the aid of the communication interface 620. The network 630 can be the Internet, an internet and/or extranet, or an intranet and/or extranet that is in communication with the Internet.

The network 630 in some cases is a telecommunication and/or data network. The network 630 can include one or more computer servers, which can enable distributed computing, such as cloud computing. For example, one or more computer servers may enable cloud computing over the network 630 ("the cloud") to perform various aspects of analysis, calculation, and generation of the present disclosure. Such cloud computing may be provided by cloud computing platforms such as, for example, Amazon Web Services (AWS), Microsoft Azure, Google Cloud Platform, and IBM cloud. The network 630, in some cases with the aid of the computer system 601, can implement a peer-to-peer network, which may enable devices coupled to the computer system 601 to behave as a client or a server. 'Cloud' services (including with one or more of the cloud platforms mentioned above) may also be used to provide data storage.

The CPU 605 can execute a sequence of machine-readable instructions, which can be embodied in a program or software. The instructions may be stored in a memory location, such as the memory 610. The instructions can be directed to the CPU 605, which can subsequently program or otherwise configure the CPU 605 to implement methods of the present disclosure. Examples of operations performed by the CPU 605 can include fetch, decode, execute, and writeback.

The CPU 605 can be part of a circuit, such as an integrated circuit. One or more other components of the system 601 can be included in the circuit. In some cases, the circuit is an application specific integrated circuit (ASIC). The CPU 605 may comprise one or more general purpose processors, one or more graphics processing units (GPUs), or a combination thereof.

The storage unit 615 can store files, such as drivers, libraries and saved programs. The storage unit 615 can store user data. The computer system 601 in some cases can include one or more additional data storage units that are external to the computer system 601, such as located on a remote server that is in communication with the computer system 601 through an intranet or the Internet.

The computer system 601 can communicate with one or more remote computer systems through the network 630. For instance, the computer system 601 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 601 via the network 630. The user may control or regulate various aspects of methods and systems of the present disclosure.

Methods as described herein can be implemented by way of machine (e.g., computer processor) executable code stored on an electronic storage location of the computer system 601, such as, for example, on the memory 610 or electronic storage unit 615. The machine executable or machine readable code can be provided in the form of software. During use, the code can be executed by the processor 605. In some cases, the code can be retrieved from the storage unit 615 and stored on the memory 610 for ready access by the processor 605. In some situations, the electronic storage unit 615 can be precluded, and machine-executable instructions are stored on memory 610.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 601, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory, Solid-state memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 601 can include or be in communication with an electronic display 635 that comprises a user interface (UI) 640. Examples of UI's include, without limitation, a graphical user interface (GUI) and web-based user interface.

The computer system 601 can include or be in communication with a non-classical computer (e.g., a quantum computer) 645 for performing, for example, quantum algorithms (e.g., quantum mechanical energy and/or electronic structure calculations). The non-classical computer 1045 may be operatively coupled with the central processing unit 605 and/or the network 630 (e.g., the cloud).

Computer systems of the present disclosure may be as described, for example, in International Application No. PCT/CA2017/050709, U.S. application Ser. No. 15/486,960, U.S. Pat. Nos. 9,537,953 and 9,660,859, each of which is entirely incorporated herein by reference.

Methods and systems of the present disclosure can be implemented by way of one or more algorithms. An algorithm can be implemented by way of software upon execution by the central processing unit 605.

Though described herein with respect to certain systems, such as hybrid or quantum-classical computing or computing hardware, the problems of the present disclosure may be solved using a computing system comprising various types or combinations of systems, such as, for example, one or more classical computers, one or more non-classical computers (such as one or more quantum computers), or a combination of one or more classical computers and one or more non-classical computers.

EXAMPLES

Example 1: AI-Driven QAOA

In the event that a procedure described herein solves a combinatorial optimization problem using QAOA, every instance of the combinatorial optimization problem may be provided by an oracle that computes an objective function. The Hamiltonian representative of the objective function may be programmed into a quantum oracle and calculated coherently by any query to the oracle through the computation. In some embodiments, there may be only 2 state-action epochs: one during the QAOA computation (which may be called the intermediate state-action epoch) and one in the end of a single run of the QAOA computation (which may be called the terminal state-action epoch).

In each state-action epoch, rotation angles $\beta$ and $\gamma$ may be found that may then be used to perform $\exp(-i\gamma H)$ on some computation register and then $\exp(-i\beta X)$ on each qubit of the computation register. In some embodiments, no instantaneous rewards are provided to the AI module in the intermediate state-action epochs, but a reward is provided in the terminal state-action epochs depending on the measurements of the computation registers. In some embodiments, this reward is proportional to $\langle \gamma, \beta | H | \gamma, \beta \rangle$, e.g. an energy, an eigenvalue, etc., such that the size of the reward received by the agent scales with increasing values of the read-out for the objective function.

Example 2: AI-Driven Adiabatic Quantum Computation

Adiabatic quantum computation is a universal quantum computation in which the objective of the computation is to obtain ground states of some target computation subsystem Hamiltonian. In order to achieve this, an adiabatic quantum computation may start with an initial computation subsystem Hamiltonian, a ground state of which may be easy to prepare, and then adiabatically change the computation subsystem Hamiltonian into the final computation subsystem Hamiltonian.

To obtain a correct answer efficiently, it may be important to keep the energy gap between the instantaneous ground state and excited states widely open during the computation. The energy gap may prevent quantum states from non-adiabatic transitions as well as thermal excitations, each of which may cause computational errors. The energy gap may depend on the path through which the computation subsystem Hamiltonian is changed during the computation from the initial Hamiltonian to the final one.

Therefore, it may be desirable to find a path along which the energy gap stays open as much as possible during the computation. In some cases, use of non-stoquastic paths or inhomogeneous transverse fields may prevent the energy gap from closing exponentially fast with respect to the size of the computation register. The computation subsystem Hamiltonian contains tunable parameters and they are prescribed by the AI module.

In some embodiments, the computation subsystem and the syndrome subsystem may be entangled via 2-qubit couplings such as controlled-X gates. At each state-action epoch, the syndrome subsystem may be measured. By using the result of the measurements, the policy of the AI module may provide a next iteration of schedules for the tunable parameters of the computation subsystem up to a next state-action epoch.

Example 3: Reinforcement Learning of a Simulated Annealing Temperature Schedule

Computational optimization procedures such as simulated annealing may typically require careful selection and tweaking of parameters (such as a temperature schedule) and many repeated runs may be required until the optimization procedure converges to a solution. Poor choice of parameters may give rise to fast execution of the optimization procedure but an inaccurate solution, an accurate solution but slow execution of the optimization procedure, or an inaccurate solution and slow execution of the optimization procedure. Disclosed herein are systems and methods that utilize AI procedures to select the parameters to obtain an accurate solution and fast execution of the optimization procedure.

Reinforcement learning (RL) was applied to learn a temperature schedule for simulated annealing to consistently find the ground state. A weak-strong clusters model was applied. The weak-strong clusters model is a small 16-node bipartite graph comprising two fully-connected 8-node graphs. A negative bias was applied to the first graph (h=−0.44) and a stronger positive bias was applied to the second graph (h=1.0). The four outermost nodes of one cluster were coupled to the four outermost nodes of the second cluster with ferromagnetic (J=1) couplings. All couplings, including intra-cluster couplings between nodes in each graph and inter-cluster couplings between the first and second clusters, were set to unit strength (J=1). With this configuration, a global minimum was achieved when both cluster spin values aligned, satisfying the inter-cluster couplings.

Figure 7:
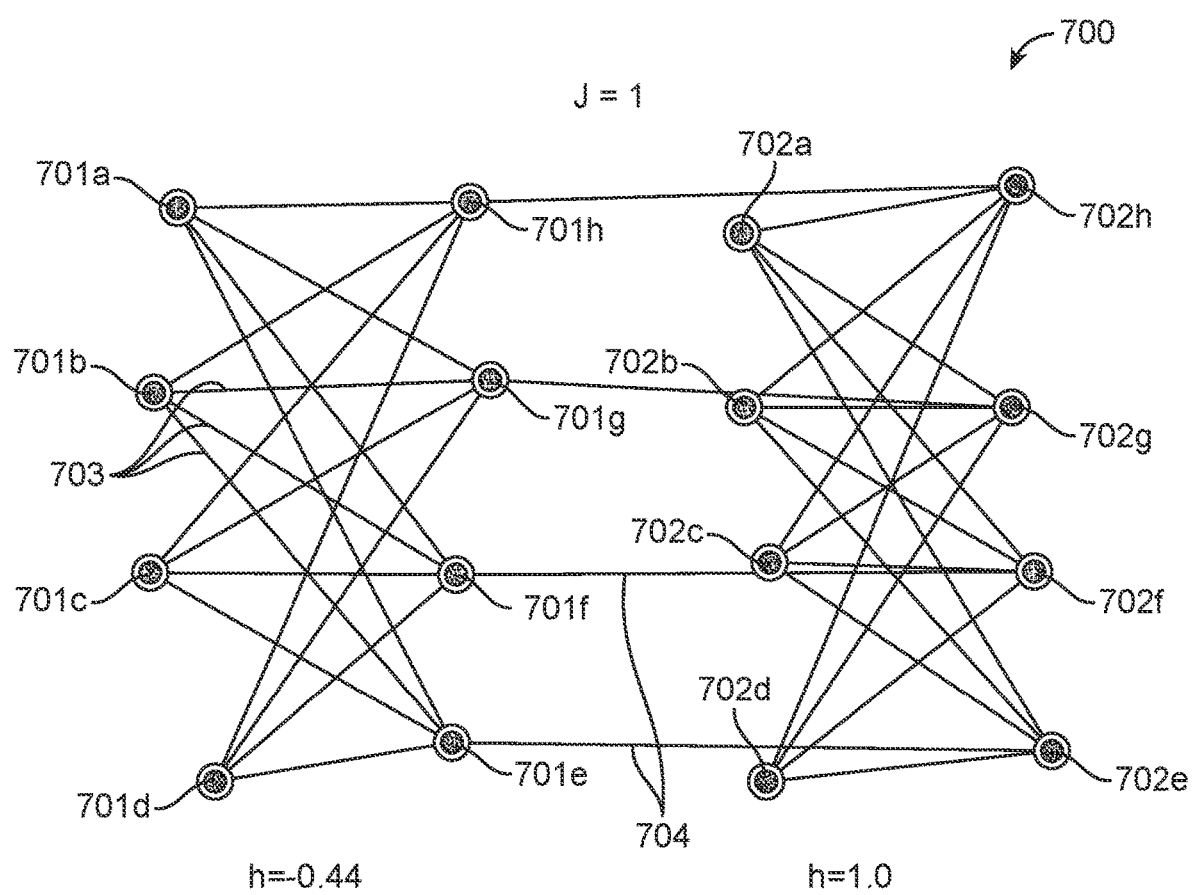
FIG. 7 shows an example of a weak strong clusters model.

FIG. 7 shows an example of a weak strong clusters model. As shown in FIG. 7, the graph comprises two fully connected 8-node graphs in a configuration 700. The first graph may comprise nodes 701a, 701b, 701c, 701d, 701e, 701f, 701g, and 701h. The second graph may comprise nodes 702a, 702b, 702c, 702d, 702e, 702f, 702g, and 702h. A negative bias was applied to the first graph (h=−0.44) and a stronger positive bias was applied to the second graph (h=1.0). FIG. 7 shows interacting nodes within each graph 703. FIG. 7 shows nodes interacting between graphs 704. The model shown in FIG. 7 may comprise nodes which represent, for example, spins, atoms, electrons, etc.

Figure 8:
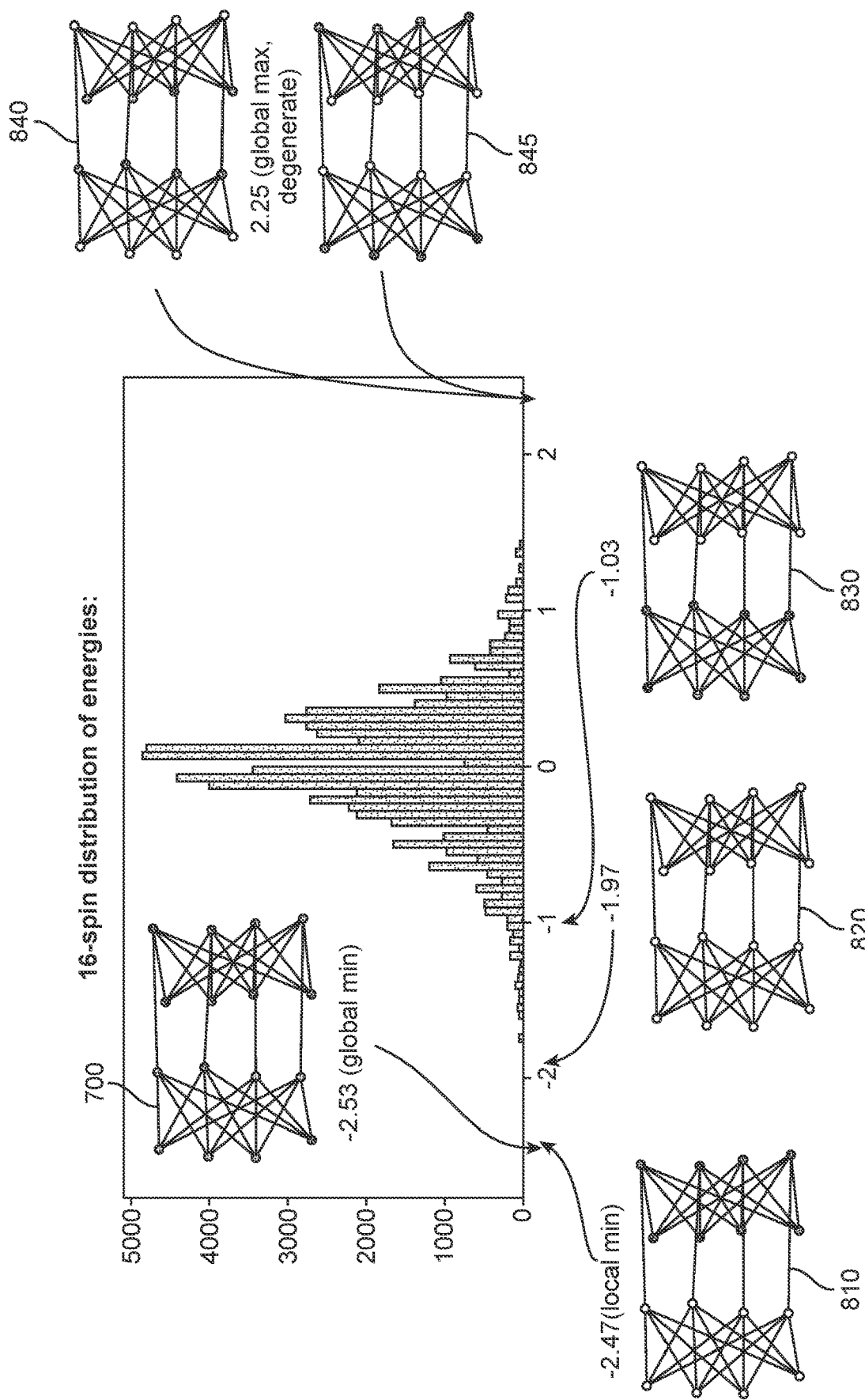
FIG. 8 shows an example of a 16-spin distribution of energy.

FIG. 8 shows an example of a 16-spin distribution of energy. As shown, the weak strong clusters model comprises a local minimum at −2.47 represented by configuration 810. The local minimum has aligned nodes in a first 8-node graph and aligned nodes in a second 8-node graph which are not aligned to the first 8-node graph. The global minimum was found with all 16 nodes aligned, see configuration 700. A global maximum was found with half of spins aligned in each 8-node graph, see configurations 840 and 845. Configurations 820 and 830 are other intermediate energy configurations.

Figure 9:
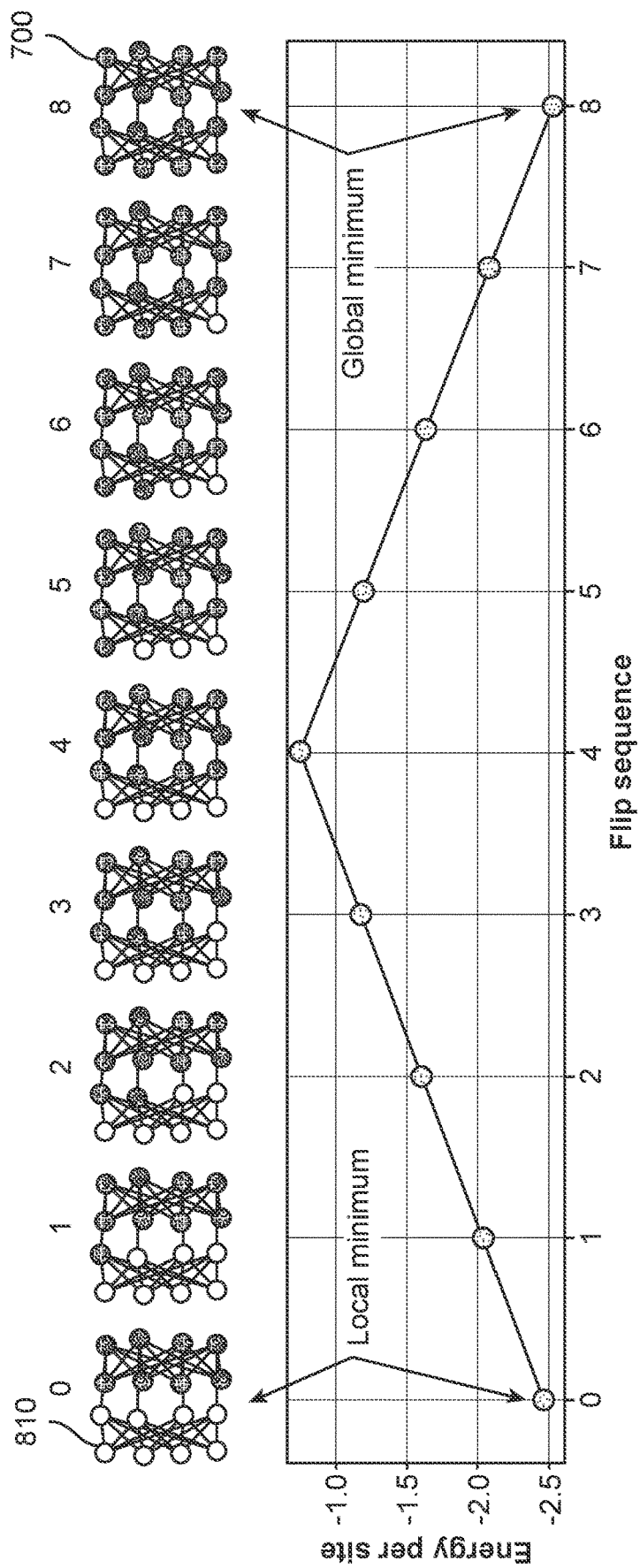
FIG. 9 shows an example of an energy landscape associated with the weak strong clusters model.

FIG. 9 shows an example of an energy landscape associated with the weak strong clusters model. 8 spin flips are required to move along the landscape from the local minimum and the global minimum. As shown, a solver has to traverse a large uphill section of the energy landscape to find a global minimum. For an annealer to find a global minimum, the annealer would need to be started at a higher initial temperature in order to sample the full energy landscape. The temperature is then cooled to find a minimum. The temperature of the system may be changed overtime. The temperature schedule is a representative example of a policy, which may be learned by the reinforcement learning algorithm.

Figure 10:
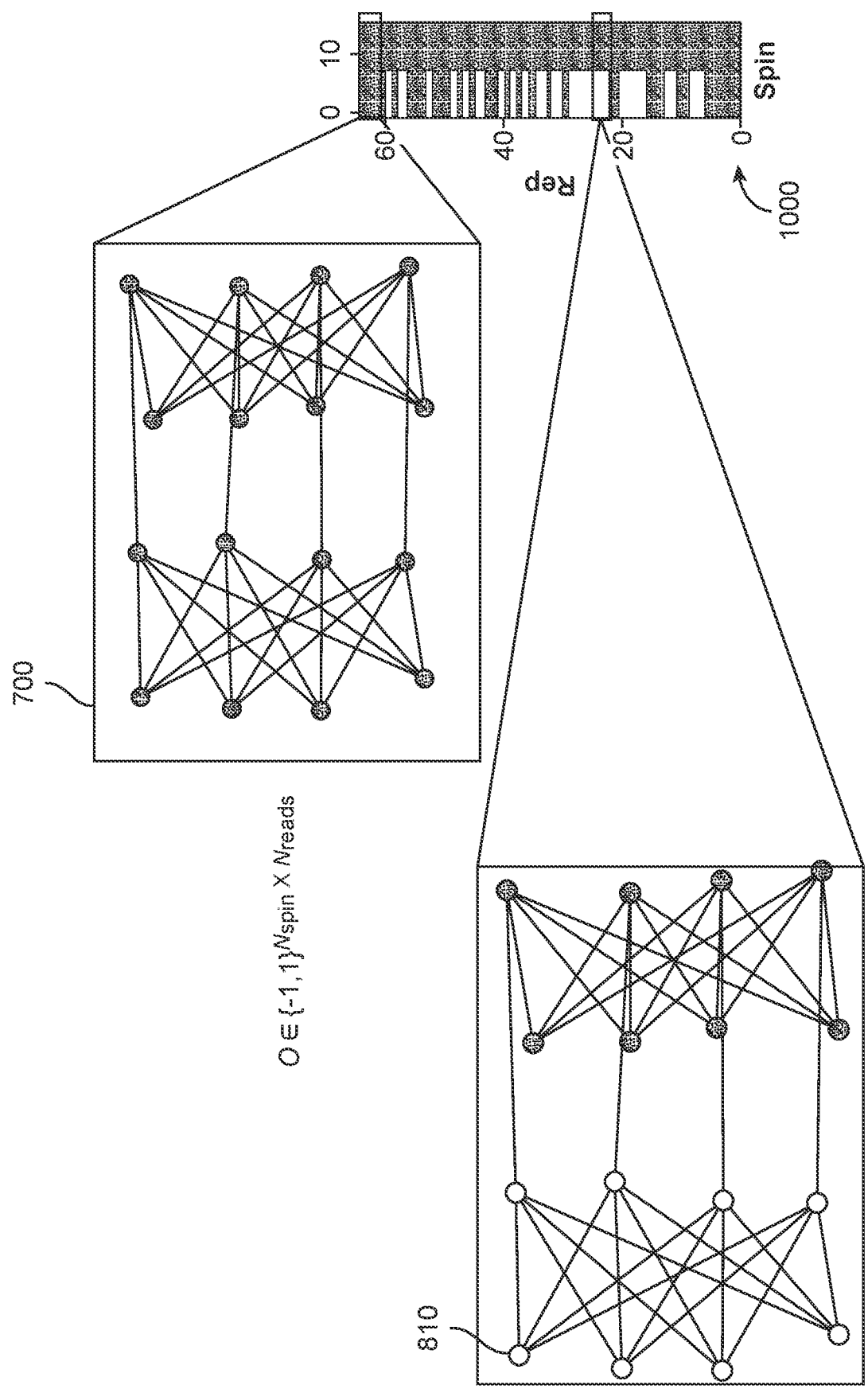
FIG. 10 shows an example of an observation during evolution of the weak strong clusters model.

FIG. 10 shows an example of an observation during evolution of the weak strong clusters model. Here, $N_{spin}$ refers to the number of aligned nodes (or spins) in the graph, $N_{steps}$ refers to the number of steps per episode, $N_{sweeps}$ refers to the number of sweeps per episode, $N_{read}$ and $N_{rep}$ refer to the number of simultaneous anneals, $N_{buffer}$ refers to the size of the buffer (or how many steps to take between updates), and o refers to an observation of the weak strong clusters model.

A neural network was implemented to learn an optimal policy. One set of 512 kernels slid along the Rep dimension, while another set of 512 kernels slid along the Spin dimension. These kernels operated in parallel on the spin values. The output was flattened, concatenated, and fed into a dense layer.

The neural network was implemented to learn to observe the state of the system and to suggest a modification to the system temperature.

Figure 11:
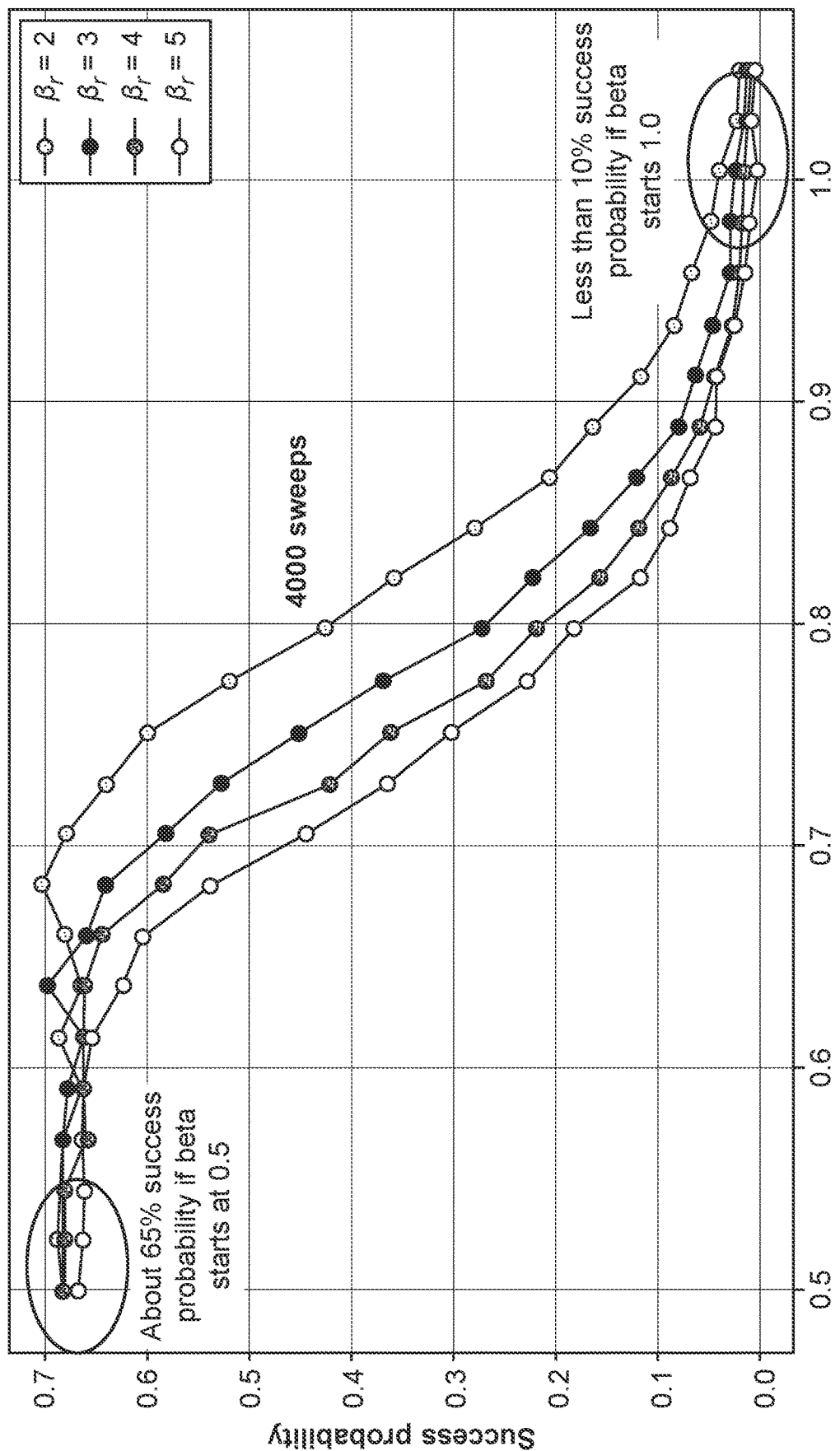
FIG. 11 shows examples of probabilities of successful convergence of simulated annealing given a variety of initial temperatures and final temperatures.

FIG. 11 shows examples of probabilities of successful convergence of simulated annealing given a variety of initial temperatures and final temperatures. As shown, for higher initial temperature (lower beta) there was a higher success probability than for lower initial temperature (higher beta).

Figure 12:
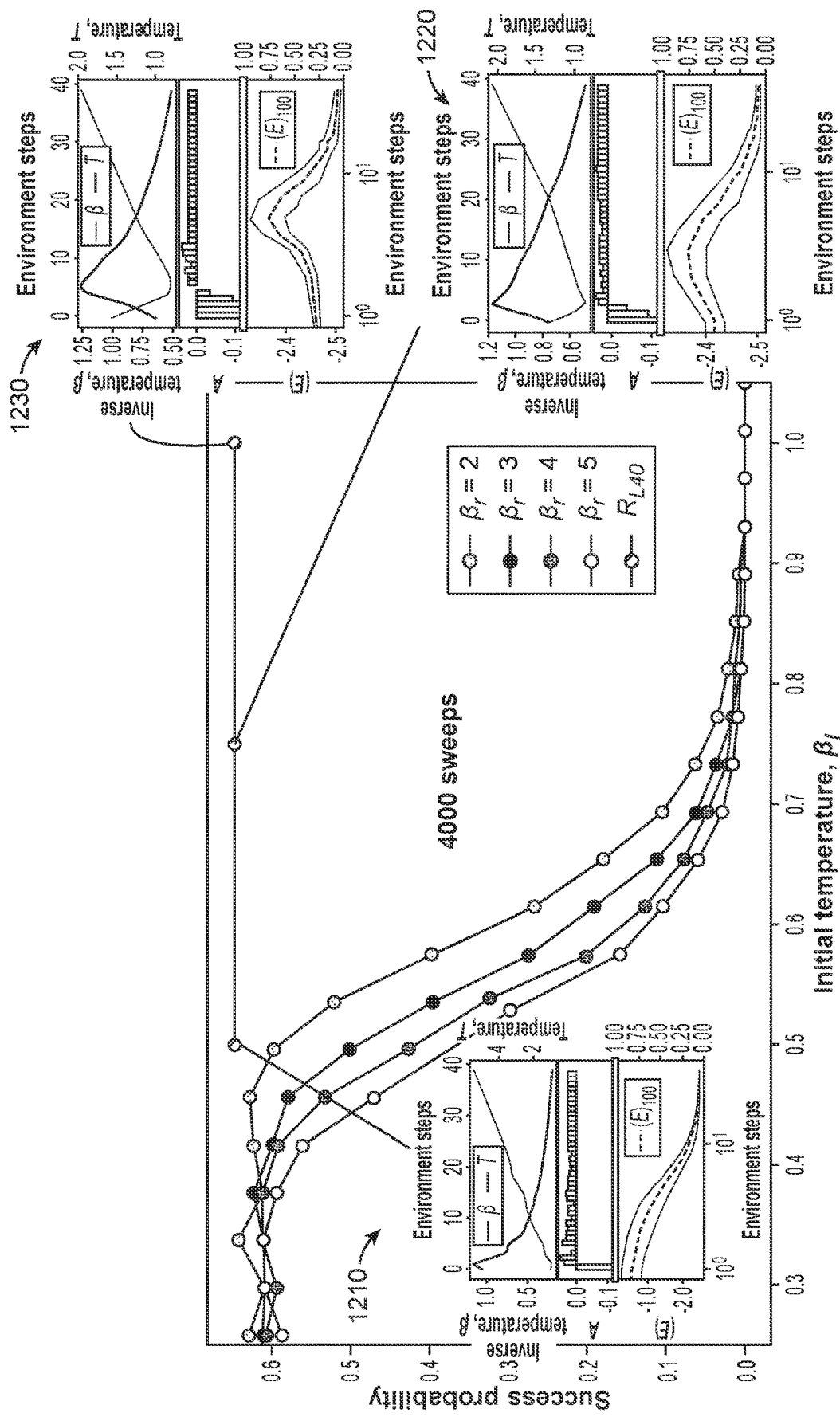
FIG. 12 shows examples of probabilities of successful convergence of simulated annealing given random initial temperatures and final temperatures.

Rewards were implemented to train the neural network to minimize energy. A sparse reward was implemented to reward an agent with the negative of the average final energy of an episode. A dense reward was implemented to reward the agent during every step of the process with the negative average energy difference between the previous state and the new state. FIG. 12 shows temperature schedules which increasing $N_{steps}$ for each example. The insets 1210, 1220, and 1230 show the temperature schedule (upper) and energy evolution (lower) along the temperature schedule.

FIG. 12 shows examples of probabilities of successful convergence of simulated annealing given random initial temperatures and final temperatures. Moving from 1210 to 1220, to 1230 the number of steps $N_{steps}$ in the temperature sweep (the policy) has increased. The number of upward steps in the energy landscape has increased and so has the likelihood of finding the global minimum. As shown, the learning algorithm has learned a temperature sweep which has a higher likelihood of finding the global minimum. In particular, a policy which takes upward steps in the energy landscape is found to be a policy which is more likely to find the global minimum.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A hybrid computing system for performing a computation using artificial intelligence (AI), comprising:
  (a) at least one quantum computer configured to perform said computation comprising one or more tunable parameters and one or more non-tunable parameters and output a report indicative of said computation, said at least one computer comprising:
    (i) one or more registers, wherein said one or more registers comprises one or more qubits, said one or more qubits are configured to perform said computation;
    (ii) a measurement unit configured to measure a state of at least one of said one or more qubits to determine a representation of said state of at least one of said one or more qubits, thereby determining said representation of said computation; and
  (b) at least one AI control unit configured to (1) control said computation, (2) to perform at least one AI procedure to determine said one or more tunable parameters corresponding to said computation, and (3) to direct said one or more tunable parameters to said at least one computer, wherein said measurement unit is configured to provide said representation of said computation to said at least one AI control unit, wherein said measurement unit is further configured to measure said state of at least one of said one or more qubits to obtain syndrome data representative of partial information about a current state of said computation and to provide said syndrome data to said at least one AI control unit.

2. The system of claim 1, wherein said one or more registers comprise computation registers and syndrome registers; wherein said computation registers comprise one or more computation qubits, said one or more computation qubits configured to perform said computation; wherein said syndrome registers comprise one or more syndrome qubits different from said one or more computation qubits, wherein said one or more syndrome qubits are quantum mechanically entangled with said one or more computation qubits and wherein said one or more syndrome qubits are not for performing said computation; and wherein said measurement unit is configured to measure a state of said one or more syndrome qubits to determine a representation of a state of said one or more computation qubits, thereby determining said representation of said computation.

3. The system of claim 1, wherein said at least one quantum computer is configured to perform one or more quantum operations comprising at least one member selected from the group consisting of: preparation of initial states of said one or more qubits; implementation of one or more single qubit quantum gates on said one or more qubits; implementation of one or more multi-qubit quantum gates on said one or more qubits; and adiabatic evolution from an initial to a final Hamiltonian using one or more qubits.

4. The system of claim 1, wherein said computation comprises a quantum computation.

5. The system of claim 4, wherein said quantum computation comprises at least one member selected from the group consisting of: adiabatic quantum computation, quantum approximate optimization algorithm (QAOA), variational quantum algorithm, error correction on a quantum register, and a fault tolerant quantum computation.

6. The system of claim 1, wherein said at least one quantum computer comprises at least one member selected from the group consisting of: an integrated photonic coherent Ising machine computer, a network of optic parametric pulses, adiabatic quantum computer, quantum annealer, quantum gate array, one-way quantum computer, topological quantum computer, quantum Turing machine, superconductor quantum computer, trapped ion quantum computer, trapped neutral atom quantum computer, trapped atom quantum computer, optical lattice, quantum dot computer, spin-based quantum computer, spatial-based quantum computer, Loss-DiVincenzo quantum computer, nuclear magnetic resonance (NMR) based quantum computer, solution-state NMR quantum computer, solid-state NMR quantum computer, solid-state NMR Kane quantum computer, electrons-on-helium quantum computer, cavity-quantum-electrodynamics based quantum computer, molecular magnet quantum computer, fullerene-based quantum computer, linear optical quantum computer, diamond-based quantum computer, nitrogen vacancy (NV) diamond-based quantum computer, Bose-Einstein condensate-based quantum computer, transistor-based quantum computer, and rare-earth metal-ion-doped inorganic crystal based quantum computer.

7. The system of claim 1, wherein said at least one AI procedure comprises at least one member selected from the group consisting of: a machine learning (ML) procedure, a machine learning (ML) training procedure, a machine learning (ML) inference procedure, and reinforcement learning (RL) procedure.

8. The system of claim 1, wherein said at least one AI procedure is configured to modify said one or more tunable parameters during said computation, thereby providing one or more modified tunable parameters; wherein said one or more modified tunable parameters are configured to modify said computation during a course of said computation.

9. The system of claim 1, wherein said at least one AI control unit comprises at least one member selected from the group consisting of: a neural network with one or more AI control unit parameters comprising neural network weights, a tensor processing unit (TPU), a graphical processing unit (GPU), a field-programmable gate array (FPGA), an application-specific integrated circuit (ASIC), and a classical processing system operating at deep cryogenic temperatures within a refrigerator system.

10. The system of claim 1, wherein said at least one AI control unit is in communication with said at least one computer over a network.

11. The system of claim 1, wherein said one or more tunable parameters and said one or more non-tunable parameters define a next segment of said computation comprising an instruction set from a current representation of said computation.

12. The system of claim 1, wherein said one or more tunable parameters comprises at least one member selected from the group consisting of: an initial temperature of said computation, a final temperature of said computation, a temperature schedule of said computation, a schedule of pumping energy of said network, an indication of quantum gates for a segment of said computation, an indication of a local operations and classical communication (LOCC) channel for a segment of said computation.

13. A method for training an artificial intelligence (AI) control unit, comprising:

(a) obtaining (1) one or more instances of one or more non-tunable parameters and (2) one or more tunable parameters and AI control unit parameters;

(b) configuring said AI control unit using said AI control unit parameters;

(c) selecting at least one instance of said one or more non-tunable parameters;

(d) configuring a computer using said at least one instance of said one or more non-tunable parameters and said one or more tunable parameters, wherein a value(s) of said one or more tunable parameters are directed by said AI control unit, and wherein said computer comprises one or more registers;

(e) performing a segment of a computation using said one or more registers of said computer;

(f) performing one or more measurements of at least one of said one or more registers to obtain a representation of said segment of said computation; wherein said performing comprises: if said segment is not a last segment for said computation, said one or more measurements comprise syndrome data; if said segment is said last segment for said computation, said one or more measurements comprise computation data;

(g) repeating (d)-(f) a plurality of times;

(h) outputting a report indicative of each said computation performed said plurality of times;

(i) reconfiguring said AI control unit based on said report by modifying said AI control unit parameters; and (j) repeating (d)-(i) until a stopping criterion is met.

14. A method for performing a computation using a hybrid computing system comprising at least one quantum computer and at least one artificial intelligence (AI) control unit comprising:

(a) obtaining one or more non-tunable parameters;

(b) configuring said at least one quantum computer using said one or more non-tunable parameters;

(c) configuring said at least one quantum computer using one or more tunable parameters, wherein said one or more tunable parameters are directed by said AI control unit;

(d) performing a segment of said computation using one or more registers comprising one or more qubits of said at least one quantum computer;

(e) performing one or more measurements of at least one of said one or more registers comprising one or more qubits to obtain a representation of said segment of said computation;

(f) repeating (c), (d), and (e) until a stopping criterion is met; and (g) outputting a report indicative of said computation.

* * * * *